US012658447B2

(12) United States Patent
Wang et al.

(10) Patent No.: US 12,658,447 B2
(45) Date of Patent: Jun. 16, 2026

(54) STABLE METAL ANODES AND BATTERIES UTILIZING THE SAME

(71) Applicant: The Penn State Research Foundation, University Park, PA (US)

(72) Inventors: Donghai Wang, University Park, PA (US); Yue Gao, University Park, PA (US)

(73) Assignee: The Penn State Research Foundation, University Park (PA)

( * ) Notice: Subject to any disclaimer, the term of this patent is extended or adjusted under 35 U.S.C. 154(b) by 1218 days.

(21) Appl. No.: 17/220,167

(22) Filed: Apr. 1, 2021

(65) Prior Publication Data

US 2021/0313583 A1 Oct. 7, 2021

Related U.S. Application Data

(60) Provisional application No. 63/003,608, filed on Apr. 1, 2020.

(51) Int. Cl.
H01M 4/62 (2006.01)
H01M 4/36 (2006.01)
(Continued)

(52) U.S. Cl.
CPC ........... H01M 4/628 (2013.01); H01M 4/366 (2013.01); H01M 4/382 (2013.01); H01M 4/48 (2013.01);
(Continued)

(58) Field of Classification Search
CPC ........ H01M 4/366; H01M 4/382; H01M 4/48; H01M 4/628; H01M 4/60–608; H01M 10/052; H01M 2004/027
See application file for complete search history.

(56) References Cited

U.S. PATENT DOCUMENTS 5,851,280 A 12/1998 Belmont et al.
9,112,212 B1 * 8/2015 Fasching ............... H01M 4/366
(Continued)

OTHER PUBLICATIONS

Aurbach D (2000) Review of selected electrode-solution interactions which determine the performance of Li and Li ion batteries. J Power Sources 89(2):206-218.
(Continued)

*Primary Examiner* — James Lee
(74) *Attorney, Agent, or Firm* — Meunier Carlin & Curfman LLC

(57) ABSTRACT

Disclosed is an electrochemical cell comprising: an active anode metal electrochemically deposited on a host material functionalized with one or more electrochemically active groups, wherein the active anode metal comprises an electrochemically active surface; b) an electrolyte; and c) a solid electrolyte interphase layer disposed on the electrochemically active surface of the active anode metal and comprising a first metal salt, wherein the first metal salt is a first reaction product of an electrochemical decomposition of at least a portion of one or more electrochemically active groups; wherein a metal cation in the first metal salt and the active anode metal comprise the same metal; and wherein the electrochemical cell is substantially stable for 200-600 plating/stripping cycles at a temperature from about −60° C. to about 45° C.

20 Claims, 39 Drawing Sheets

(51) Int. Cl.

| | | |
|---|---|---|
| *H01M 4/38* | (2006.01) | |
| *H01M 4/48* | (2010.01) | |
| *H01M 4/60* | (2006.01) | |
| *H01M 10/052* | (2010.01) | |
| *H01M 4/02* | (2006.01) | |

(52) U.S. Cl.

CPC ........... *H01M 4/60* (2013.01); *H01M 10/052* (2013.01); *H01M 2004/027* (2013.01)

(56)                    References Cited

U.S. PATENT DOCUMENTS

| | | | | |
|---|---|---|---|---|
| 2002/0197537 | A1* | 12/2002 | Kim | H01M 10/0567 |
| | | | | 429/340 |
| 2013/0260229 | A1* | 10/2013 | Uzun | H01M 10/056 |
| | | | | 429/188 |
| 2016/0261000 | A1* | 9/2016 | Zhang | H01M 10/0568 |
| 2017/0365854 | A1* | 12/2017 | Gopalakrishnannair | |
| | | | | H01M 50/457 |
| 2018/0151884 | A1* | 5/2018 | Yushin | H01M 4/134 |
| 2018/0266003 | A1* | 9/2018 | Brousse | H01G 11/62 |
| 2021/0273212 | A1* | 9/2021 | Kim | H01M 10/0568 |

OTHER PUBLICATIONS

Basile, A., Bhatt, A. I. & O'Mullane, A. P. Stabilizing lithium metal using ionic liquids for long-lived batteries. Nat. Commun. 7, 1-11 (2016).

Bekyarova E, et al. (2009) Chemical Modification of Epitaxial Graphene: Spontaneous Grafting of Aryl Groups. J Am Chem Soc 131(4):1336-1337.

Blöchl PE (1994) Projector augmented-wave method. Phys Rev B 50(24):17953-17979.

Caprioli, F., Decker, F., Marrani, A. G., Beccari, M. & Castro, V. Di. Copper protection by self-assembled monolayers of aromatic thiols in alkaline solutions. Phys. Chem. Chem. Phys. 12, 9230-9238 (2010).

Chen S, et al. (2016) Functional Organosulfide Electrolyte Promotes an Alternate Reaction Pathway to Achieve High Performance in Lithium-Sulfur Batteries. Angew Chemie Int Ed 55(13):4231-4235.

Chen S, et al. (2018) High-Voltage Lithium-Metal Batteries Enabled by Localized High-Concentration Electrolytes. Adv Mater 1706102:1-7.

Cheng XB, Zhang R, Zhao CZ, Zhang Q (2017) Toward Safe Lithium Metal Anode in Rechargeable Batteries: A Review. Chem Rev 117(15):10403-10473.

Choi JW, Aurbach D (2016) Promise and reality of post-lithium-ion batteries with high energy densities. Nat Rev Mater 1(4):16013.

Choi, D. Y. et al. Al-Coated Conductive Fiber Filters for High-Efficiency Electrostatic Filtration: Effects of Electrical and Fiber Structural Properties. Sci. Rep. 8, 1-10 (2018).

Choudhury, S., Mangal, R., Agrawal, A. & Archer, L. A. A highly reversible room-temperature lithium metal battery based on cross-linked hairy nanoparticles. Nat. Commun. 6, 10101 (2015).

Choudhury, Warren A, et al. (2018) Confining electrodeposition of metals in structured electrolytes. Proc Natl Acad Sci 115(26):6620-6625.

Ding, F. et al. Dendrite-free lithium deposition via self-healing electrostatic shield mechanism. J. Am. Chem. Soc. 135, 4450-4456 (2013).

Ding, F. et al. Effects of Carbonate Solvents and Lithium Salts on Morphology and Coulombic Efficiency of Lithium Electrode. J. Electrochem. Soc. 160, A1894-A1901 (2013).

Dokko, K., Nakata, N. & Kanamura, K. High rate discharge capability of single particle electrode of LiCoO2. J. Power Sources 189, 783-785 (2009).

Dudney, N. J. Addition of a thin-film inorganic solid electrolyte (Lipon) as a protective film in lithium batteries with a liquid electrolyte. J. Power Sources 89, 176-179 (2000).

Englert JM, et al. (2011) Covalent bulk functionalization of graphene. Nat Chem 3(4):279-286.

Fan X, et al. (2018) Non-flammable electrolyte enables Li-metal batteries with aggressive cathode chemistries. Nat Nanotechnol 13(8):715-722.

Ferguson GN, et al. (2008) 2-Aminothienopyridazines as Novel Adenosine A 1 Receptor Allosteric Modulators and Antagonists. 6165-6172.

Fleischhammer, M., Waldmann, T., Bisle, G., Hogg, B. I. & Wohlfahrt-Mehrens, M. Interaction of cyclic ageing at high-rate and low temperatures and safety in lithiumion batteries. J. Power Sources 274, 432-439 (2015).

Fleutot S, et al. (2011) Experimental (X-Ray Photoelectron Spectroscopy) and theoretical studies of benzene based organics intercalated into layered double hydroxide. Solid State Sci 13(9):1676-1686.

Gao Y, et al. (2017) General Method of Manipulating Formation, Composition, and Morphology of Solid-Electrolyte Interphases for Stable Li-Alloy Anodes. J Am Chem Soc 139(48):17359-17367.

Gao Y, et al. (2017) Interfacial Chemistry Regulation via a Skin-Grafting Strategy Enables High-Performance Lithium-Metal Batteries. J Am Chem Soc 139(43):15288-15291.

Gao Y, et al. (2018) Salt-Based Organic-Inorganic Nanocomposites: Towards A Stable Lithium Metal/Li 10 GeP 2 S 12 Solid Electrolyte Interface. Angew Chemie Int Ed 57(41):13608-13612.

Gao Y, et al. (2019) Polymer—inorganic solid—electrolyte interphase for stable lithium metal batteries under lean electrolyte conditions. Nat Mater 18(4):384-389.

Grimme S, Antony J, Ehrlich S, Krieg H (2010) A consistent and accurate ab initio parametrization of density functional dispersion correction (DFT-D) for the 94 elements H—Pu. J Chem Phys 132(15):154104.

Han Z, et al. (2013) Ammonia solution strengthened three-dimensional microporous graphene aerogel. Nanoscale 5(12):5462-5467.

Jiao S, et al. (2018) Stable cycling of high-voltage lithium metal batteries in ether electrolytes. Nat Energy:1-8.

Jung, W. et al. An efficient reduced graphene-oxide filter for PM 2.5 removal. J. Mater. Chem. A 6, 16975-16982 (2018).

Khurana R, Schaefer JL, Archer LA, Coates GW (2014) Suppression of lithium dendrite growth using cross-linked polyethylene/poly(ethylene oxide) electrolytes: A new approach for practical lithium-metal polymer batteries. J Am Chem Soc 136(20):7395-7402.

Kim H, et al. (2013) Metallic anodes for next generation secondary batteries. Chem Soc Rev 42(23):9011-34.

Kim, M. S. et al. Langmuir—Blodgett artificial solid-electrolyte interphases for practical lithium metal batteries. Nat. Energy 3, 889-898 (2018).

Kresse G, Furthmüller J (1996) Efficient iterative schemes for ab initio totalenergy calculations using a plane-wave basis set. Phys Rev B—Condens Matter Mater Phys 54(16):11169-11186.

Kresse, G. & Joubert, D. From ultrasoft pseudopotentials to the projector augmented-wave method. Phys. Rev. B 59, 1758-1775 (1999).

Li G, et al. (2018) Stable metal battery anodes enabled by polyethylenimine sponge hosts by way of electrokinetic effects. Nat Energy 3(12):1076-1083.

Li N-W, Yin Y-X, Yang C-P, Guo Y-G (2016) An Artificial Solid Electrolyte Interphase Layer for Stable Lithium Metal Anodes. Adv Mater 28(9):1853-1858.

Li S, et al. (2018) Developing High-Performance Lithium Metal Anode in Liquid Electrolytes: Challenges and Progress. Adv Mater 30(17):1-29.

Li, Y. et al. Atomic structure of sensitive battery materials and interfaces revealed by cryo-electron microscopy. Science 358, 506-510 (2017).

Liang X, et al. (2017) A facile surface chemistry route to a stabilized lithium metal anode. Nat Energy 6(July):17119.

Liang Z, et al. (2016) Composite lithium metal anode by melt infusion of lithium into a 3D conducting scaffold with lithiophilic coating. Proc Natl Acad Sci 113(11):2862-2867.

(56) References Cited

OTHER PUBLICATIONS

Lin D, et al. (2017) Three-dimensional stable lithium metal anode with nanoscale lithium islands embedded in ionically conductive solid matrix. Proc Natl Acad Sci 114(18):4613-4618.

Lin D, Liu Y, Cui Y (2017) Reviving the lithium metal anode for high-energy batteries. Nat Nanotechnol 12(3):194-206.

Lin, D. et al. Fast galvanic lithium corrosion involving a Kirkendall-type mechanism. Nat. Chem. 11, 382-389 (2019).

Lin, D. et al. Layered reduced graphene oxide with nanoscale interlayer gaps as a stable host for lithium metal anodes. Nat. Nanotechnol. 11, 626-632 (2016).

Lin, H.-p et al. Low-Temperature Behavior of Li-Ion Cells. Electrochem. Solid-State Lett. 4, A71 (2002).

Liu K, et al. (2017) Lithium Metal Anodes with an Adaptive "Solid-Liquid" Interfacial Protective Layer. J Am Chem Soc 139(13):4815-4820.

Lopez J, et al. (2018) Effects of Polymer Coatings on Electrodeposited Lithium Metal. J Am Chem Soc 140(37):11735-11744.

Lord, H. L., Zhan, W. & Pawliszyn, J. Fundamentals and Applications of Needle Trap Devices. in Comprehensive Sampling and Sample Preparation 2, 677-697 (Elsevier, 2012).

Lu Y, Korf K, Kambe Y, Tu Z, Archer LA (2014) Ionic-liquid-nanoparticle hybrid electrolytes: Applications in lithium metal batteries. Angew Chemie-Int Ed 53(2):488-492.

Lu Y, Tu Z, Archer LA (2014) Stable lithium electrodeposition in liquid and nanoporous solid electrolytes. Nat Mater 13(10):961-969.

Mandler, D. & Turyan, I. Applications of self-assembled monolayers in electroanalytical chemistry. Electroanalysis 8, 207-213 (1996).

Mukherjee R, et al. (2014) Defect-induced plating of lithium metal within porous graphene networks. Nat Commun 5:1-10.

Nagasubramanian, G. Electrical characteristics of 18650 Li-ion cells at low temperatures. J. Appl. Electrochem. 31, 99-104 (2001).

Pei A, et al. (2018) Lithium metal stripping beneath the solid electrolyte interphase. Proc Natl Acad Sci 115(34):8529-8534.

Peled E, Menkin S (2017) Review—SEI: Past, Present and Future. J Electrochem Soc 164(7):A1703-A1719.

Perdew JP, Burke K, Ernzerhof M (1996) Generalized Gradient Approximation Made Simple. Phys Rev Lett 77(18):3865-3868.

Petzl, M., Kasper, M. & Danzer, M. A. Lithium plating in a commercial lithiumion battery—A low-temperature aging study. J. Power Sources 275, 799-807 (2015).

Plichta, E. J. & Behl, W. K. A low-temperature electrolyte for lithium and lithiumion batteries. J. Power Sources 88, 192-196 (2000).

Qian J, et al. (2015) High rate and stable cycling of lithium metal anode.Nat Commun 6:6362.

Ratnakumar, B. V. et al. Lithium ion batteries for Mars exploration missions. Electrochim. Acta 45, 1513-1517 (2000).

Rodrigues, M.-T. F. et al. A materials perspective on Li-ion batteries at extreme temperatures. Nat. Energy 2, 1-14 (2017).

Rustomji, C. S. et al. Liquefied gas electrolytes for electrochemical energy storage devices. Science 356, eaal4263 (2017).

Salitra G, et al. (2018) High-Performance Cells Containing Lithium Metal Anodes, LiNi 0.6 Co 0.2 Mn 0.2 O 2 (NCM 622) Cathodes, and Fluoroethylene Carbonate-Based Electrolyte Solution with Practical Loading. ACS Appl Mater Interfaces 10(23):19773-19782.

Scrosati, B. & Garche, J. Lithium batteries: Status, prospects and future. J. Power Sources 195, 2419-2430 (2010).

Shervedani, R. K. & Mozaffari, S. A. Copper(II) nanosensor based on a gold cysteamine self-assembled monolayer functionalized with salicylaldehyde. Anal. Chem. 78, 4957-4963 (2006).

Shkrob IA, Marin TW, Zhu Y, Abraham DP (2014) Why bis(fluorosulfonyl)imide is a "magic anion" for electrochemistry. J Phys Chem C 118(34):19661-19671.

Smart, M. C. et al. Improved performance of lithium-ion cells with the use of fluorinated carbonate-based electrolytes. J. Power Sources 119-121, 359-367 (2003).

Smart, M. C. Irreversible Capacities of Graphite in Low-Temperature Electrolytes for Lithium-Ion Batteries. J. Electrochem. Soc. 146, 3963 (1999).

Song, P. et al. Insight in cysteamine adsorption behaviors on the copper surface by electrochemistry and Raman spectroscopy. Electrochim. Acta 89, 503-509 (2013).

Suo L, et al. (2018) Fluorine-donating electrolytes enable highly reversible 5-VclassLi metal batteries. Proc Natl Acad Sci:201712895.

Tarascon JM, Armand M (2001) Issues and challenges facing rechargeable lithium batteries. Nature 414(6861):359-67.

Tarascon, J. M. & Armand, M. Issues and challenges facing rechargeable lithium batteries. Nature 414, 359-67 (2001).

Tippmann S, Walper D, Balboa L, Spier B, Bessler WG (2014) Low-temperature charging of lithium-ion cells part I: Electrochemical modeling and experimental investigation of degradation behavior. J Power Sources 252:305-316.

Tu Z, et al. (2017) Designing Artificial Solid-Electrolyte Interphases for Single-Ion and High-Efficiency Transport in Batteries. Joule 1(2):394-406.

Tung S-O, Ho S, Yang M, Zhang R, Kotov NA (2015) A dendrite-suppressing composite ion conductor from aramid nanofibres. Nat Commun 6:6152.

Uvdal, K., Bodö, P. & Liedberg, B. l-cysteine adsorbed on gold and copper: An X-ray photoelectron spectroscopy study. J. Colloid Interface Sci. 149, 162-173 (1992).

Wang T, Villegas Salvatierra R, Jalilov AS, Tian J, Tour JM (2017) Ultrafast Charging High Capacity Asphalt-Lithium Metal Batteries. ACS Nano 11(11):10761-10767.

Wang, C., Appleby, A. J. & Little, F. E. Low-Temperature Characterization of Lithium-Ion Carbon Anodes via Microperturbation Measurement. J. Electrochem. Soc. 149, A754 (2002).

Wang, F. et al. Chemical Distribution and Bonding of Lithium in Intercalated Graphite: Identification with Optimized Electron Energy Loss Spectroscopy. ACS Nano 5, 1190-1197 (2011).

Wei S, Choudhury S, Tu Z, Zhang K, Archer LA (2018) Electrochemical Interphases for High-Energy Storage Using Reactive Metal Anodes. Acc Chem Res 51(1):80-88.

Wei, S. et al. Stabilizing electrochemical interfaces in viscoelastic liquid electrolytes. Sci. Adv. 4, 1-9 (2018).

William G. Hoover. Canonical dynamics: Equilibrium phase-space distributions William. Phys. Rev. A 31, 1695-1697 (1985).

Xu W, et al. (2014) Lithium metal anodes for rechargeable batteries. Energy Environ Sci 7(2):513-537.

Yan K, et al. (2016) Selective deposition and stable encapsulation of lithium through heterogeneous seeded growth. Nat Energy 1(3):16010.

Yang C-P, Yin Y-X, Zhang S-F, Li N-W, Guo Y-G (2015) Accommodating lithium into 3D current collectors with a submicron skeleton towards long-life lithium metal anodes. Nat Commun 6(May):8058.

Yang, Y. et al. High-Efficiency Lithium-Metal Anode Enabled by Liquefied Gas Electrolytes. Joule 1-15 (2019). doi:10.1016/j.joule.2019.06.008.

Ye H, et al. (2017) Stable Li Plating/Stripping Electrochemistry Realized by a Hybrid Li Reservoir in Spherical Carbon Granules with 3D Conducting Skeletons. J Am Chem Soc 139(16):5916-5922.

Zeng, Z. et al. Non-flammable electrolytes with high salt-to-solvent ratios for Liion and Li-metal batteries. Nat. Energy 3, 674-681 (2018).

Zhang H, et al. (2018) Electrolyte Additives for Lithium Metal Anodes and Rechargeable Lithium Metal Batteries: Progress and Perspectives. Angew Chemie Int Ed 57(46):15002-15027.

Zhang R, et al. (2017) Lithiophilic Sites in Doped Graphene Guide Uniform Lithium Nucleation for Dendrite-Free Lithium Metal Anodes. Angew Chemie Int Ed 56(27):7764-7768.

Zhang SS, Xu K, Allen JL, Jow TR (2002) Effect of propylene carbonate on the low temperature performance of Li-ion cells. J Power Sources 110(1):216-221.

Zhang SS, Xu K, Jow TR (2002) A new approach toward improved low temperature performance of Li-ion battery. Electrochem Commun 4(11):928-932.

Zhang Y, et al. (2017) High-capacity, low-tortuosity, and channel-guided lithium metal anode. Proc Natl Acad Sci 114(14):3584-3589.

(56) References Cited

OTHER PUBLICATIONS

Zhang, S. S., Xu, K. & Jow, T. R. The low temperature performance of Li-ion batteries. J. Power Sources 115, 137-140 (2003).
Zhao, et al. (2017) An anion-immobilized composite electrolyte for dendritefree lithium metal anodes. Proc Natl Acad Sci 114(42):11069-11074.

* cited by examiner 10 mAh cm⁻², 25 °C        16 mAh cm⁻², 25 °C

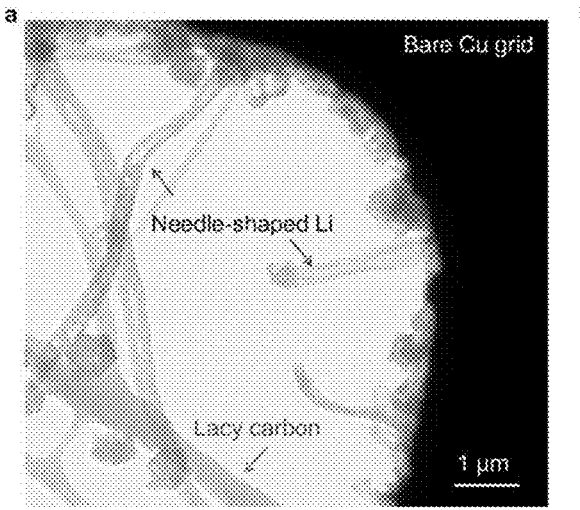
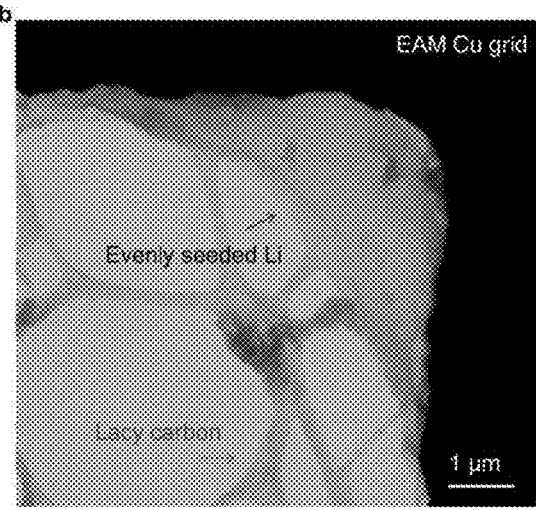
FIGS. 38A-38B
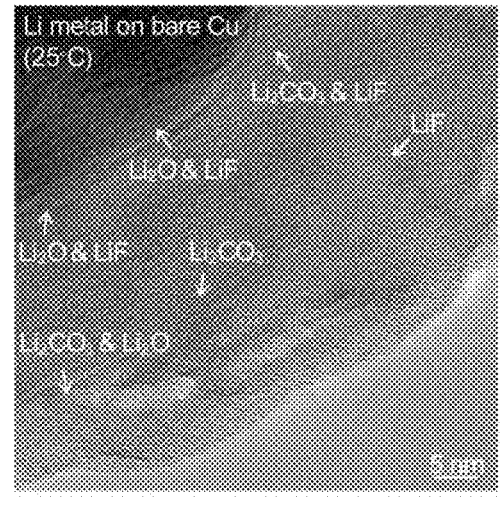
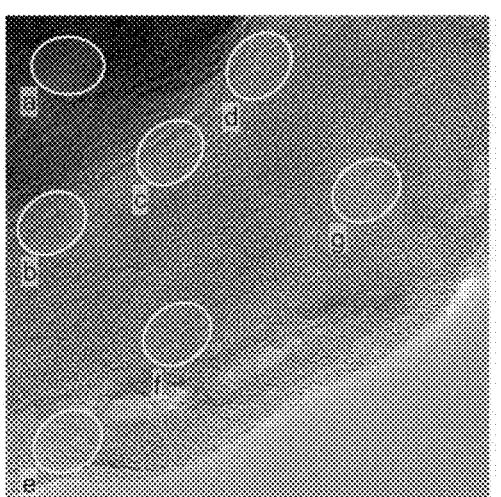
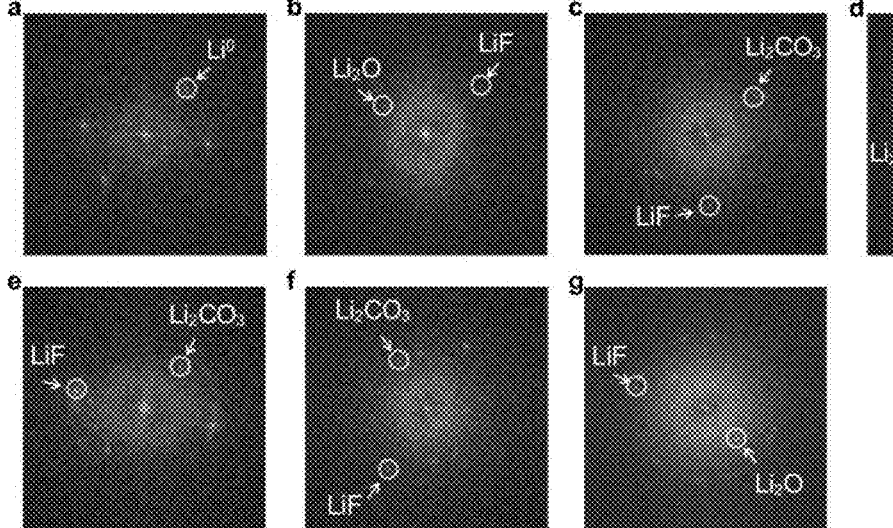
FIGS. 39A-39G

STABLE METAL ANODES AND BATTERIES UTILIZING THE SAME

CROSS-REFERENCE TO RELATED APPLICATIONS

This application claims the benefit of U.S. Provisional Application No. 63/003,608, filed Apr. 1, 2020, the content of which is incorporated herein in its entirety.

STATEMENT OF GOVERNMENT SUPPORT

This invention was made with government support under Grant No. DE-EE0008198 awarded by the Department of Energy. The Government has certain rights in the invention.

TECHNICAL FIELD

This application relates generally to metal batteries with a stable solid-electrolyte interphase.

BACKGROUND

Rechargeable batteries based on metal anodes, including lithium (Li), sodium (Na), and zinc (Zn), show great promise in achieving high energy density. Unfortunately, the electrochemical interface of the metal anodes is not favorable for metal deposition. Metal nucleation is inhomogeneous at the surface, leading to the growth of metal dendrites and the formation of unstable solid-electrolyte interphase (SEI) that is incapable of protecting metals from the side reactions with the electrolyte.

Substantial efforts have been devoted to stabilizing the interface of metal anodes, especially for Li metal. These include the design of artificial protective layers, alternative electrolytes, and sacrificial additives to stabilize the metal-electrolyte interface, the development of mechanically robust coating to block Li dendrite growth, and the use of structured scaffolds to host dendrite-free Li deposition by reducing local current densities. However, the performance of metal anodes remains poor under high-current or low-temperature conditions. This is because the inhomogeneous Li nucleation and unstable SEI problems have not been well addressed, and these problems at the interface are even exacerbated under critical operating conditions, especially at high current densities and low temperatures.

Thus, new approaches to provide for stable metal anodes and batteries utilizing the same and methods of making the same are needed. These needs and other needs at least partially satisfied by the present disclosure.

SUMMARY

The present disclosure is directed to an electrochemical cell comprising: a) an active anode metal electrochemically deposited on a host material functionalized with one or more electrochemically active groups, wherein the active anode metal comprises an electrochemically active surface; b) an electrolyte; and c) a solid electrolyte interphase layer having a thickness from about 50 nm to about 200 nm and disposed on the electrochemically active surface of the active anode metal and comprising a first metal salt, wherein the first metal salt is a first reaction product of an electrochemical decomposition of at least a portion of the one or more electrochemically active groups; wherein a metal cation in the first metal salt and the active anode metal comprise the same metal; and wherein the electrochemical cell is substantially stable for 200-600 plating/stripping cycles at a temperature from about −60° C. to about 45° C.

Also disclosed herein are aspects wherein the functionalization comprises an electrochemically active monolayer. Also disclosed herein are aspects where the monolayer comprises one or more sulfonyl fluoride groups configured electrochemically decompose. In still further aspects, the host material can comprise copper. While in other exemplary aspects, as described herein, the host material can comprise a carbon-based material. In still further exemplary aspects, the carbon-based material can comprise a reduced graphene oxide aerogel. In still further exemplary aspects, the reduced graphene oxide aerogel can be functionalized with benzenesulfonyl fluoride.

Further disclosed herein are aspects where the solid electrolyte interphase layer can comprise one or more layers. In aspects disclosed herein, a composition of the solid electrolyte interphase layer does not substantially change for about 600 cycles conducted at a temperature from about −60° C. to about 45° C.

The present disclosure is further directed to a battery comprising the disclosed electrochemical cell and a cathode material. In still further aspects, disclosed herein batteries exhibit an electrolyte-to-capacity ratio of less than about 15 µL mAh-1. In yet other aspects, the disclosed herein batteries exhibit a coulombic efficiency for a metal deposition greater than about 95% when measured at a predetermined current density.

Further disclosed herein are methods directed to forming electrochemical cells. In such exemplary aspects, the method of forming an electrochemical cell comprising: providing a host material functionalized with one or more electrochemically active groups; providing an electrolyte; and electrochemically depositing the active anode metal on the host material to form the active anode metal comprising an electrochemically active surface; forming a solid electrolyte interphase layer disposed on the electrochemically active surface of the active anode metal and comprising a first metal salt, wherein the first metal salt is a first reaction product of an electrochemical decomposition of at least a portion of one or more electrochemically active groups; wherein the metal cation in the first metal salt and the active anode metal comprise the same metal; and wherein the electrochemical cell is substantially stable for 200-600 plating/stripping cycles at a temperature from about −60° C. to about 45° C.

Also disclosed herein is a method of forming a battery comprising providing any of the disclosed herein electrochemical cells and providing a cathode material.

Additional advantages will be set forth in part in the description which follows, and in part will be obvious from the description or can be learned by practice of the aspects described below. The advantages described below will be realized and attained by means of the chemical compositions, methods, and combinations thereof particularly pointed out in the appended claims. It is to be understood that both the foregoing general description and the following detailed description are exemplary and explanatory only and are not restrictive of the invention, as claimed.

DESCRIPTION OF DRAWINGS

FIG. 1A shows covalently bonded BSF on the rGO aerogel surface. FIG. 1B shows the in-situ generation of a lithiophilic conjugated anion (benzenesulfonate) and LiF on the surface during Li deposition. FIG. 1C shows that Li nucleation preferentially occurs at the conjugated anion sites.

FIG. 2A shows idealized structures of the functionalized rGO aerogels. The conjugated molecules are bonded on the surface, defects, and edges of the rGO aerogels. FIG. 2B depicts a comparison of the binding energy for Li atoms on the functionalized graphene layers, calculated by DFT simulation. FIG. 2C shows a comparison of Li nucleation overpotential on the functionalized rGO aerogels at a high current density of 6 mA $cm^{-2}$. FIG. 2D shows voltage profiles of Li nucleation on the BSF-rGO aerogel surface at 25° C. and –10° C., respectively.

FIG. 5A shows the cyclic volta-mmogram of the BSF-rGO aerogel and bare rGO aerogel electrodes. The scan rate is 10 mV $s^{-1}$. FIG. 5B shows $^{19}F$ NMR spectra of SEI formed on the BSF-rGO aerogel and rGO aerogel in a 0.5 M LiBOB in EC/EMC electrolyte. LiF was exclusively found in the BSF-rGO aerogel sample.

FIG. 6A shows the XPS spectra of the SEI of a BSF-rGO aerogel@Li electrode. FIG. 6B shows concentrations of Li salts in the BSF-rGO aerogel@Li SEI. FIG. 6C shows the XPS spectra of the SEI of a bare rGO aerogel@Li electrode. FIG. 6D shows con-centrations of Li salts in the bare rGO aerogel@Li SEI.

FIGS. 7A and 7B depict SEM images of a cycled BSF-rGO aerogel@Li electrode at 25° C. FIGS. 7C and 7D depict SEM images of a cycled BSF-rGO aerogel@Li electrode at –10° C. FIG. 7F—Li is uniformly deposited on the surface of BSF-rGO aerogel. The electrodes were collected after 50 cycles with a Li deposition amount of 6.0 mAh $cm^{-2}$ at a current density of 6.0 mA $cm^{-2}$.

FIG. 8A shows a side-view SEM image of a BSF-rGO aerogel@Li electrode cycled at 25° C. FIG. 8B shows a side-view SEM image of a BSF-rGO aerogel@Li electrode cycled at –15° C. The electrodes were collected after 50 cycles with a Li deposition amount of 6.0 mAh $cm^{-2}$ at a current density of 6.0 mA $cm^{-2}$.

FIG. 11A shows time-depen-dent Nyquist plots showing impedance evolution of Li|Li cells. FIG. 11B shows efficiency of Li deposition in the Li|rGO aerogel cells with a deposition amount of 6.0 mAh $cm^{-2}$. FIG. 11C shows the cycling stability of Li|LCO cells constantly cycled at 25° C. FIG. 11D shows cycling stability of Li|LCO cells that were firstly cycled at –10° C. and 0° C. for 25 cycles, respectively, and then cycled at 25° C. 1 M LiPF6 in EC/EMC with $LiNO_3$ (0.4%) and LiBOB (2%) electrolyte (40 µl) was used.

FIG. 36A and FIG. 36B shows 6.0 mAh cm$^{-2}$ of Li after 200 cycles. FIGS. 36C-36D show 12 mAh cm$^{-2}$ of Li after 30 cycles. The samples were cycled at a current density of 6.0 mA cm$^{-2}$ and at −15° C.

FIGS. 38A-38B show Li seeding that is directly formed on TEM Cu grids.

FIGS. 39A-39G show a TEM image of the SEI formed on the bare Cu at 25° C. No LiF-rich inner phase was seen in the SEI; an FEC-containing electrolyte (1 M $LiPF_6$ in PC/FEC (8:1)) was used.

FIGS. 47A and 47B show the galvanic currents corresponding to Li corrosion on the EAM Cu (FIG. 47A) and bare Cu (FIG. 47B). A significantly reduced current was observed in the Li|EAM Cu cell. FIGS. 47C-47D show voltage versus time curves displaying the self-discharging of Li anode-free Cu|LiCoO$_2$ cells that incorporate the EAM Cu host (FIG. 47C) and bare Cu host (FIG. 47D). An external current of 0.5 mA cm$^{-2}$ (grey curve) was applied to charge the cell. The fully charged EAM Cu|LiCoO$_2$ cell presented a limited and low self-discharge compared to the rapid failure of the control cell.

FIG. 56A shows a charge capacity of 2.0 mAh cm$^{-2}$ and at a charge current density of 2.67 mA cm$^{-2}$. FIG. 56B shows a voltage profile of Li|LiCoO$_2$ cells in which the temperature was repeatedly switched between −15° C. and 25° C. The changes in the solid-state diffusion of Li ions in the LiCoO$_2$ at low temperatures are mainly responsible for the voltage hysteresis. At low temperatures, the solid-state diffusion process becomes the rate-determining step. There is a large gradient of the Li$^+$ ion concentration from the surface to the center of the LiCoO$_2$ particle, the electrode potential thus drops to the cut-off potential rapidly when x (x in Li$_x$CoO$_2$) reached 1 at the particle surface.

(FIG. 65A), bare Cu at $-15°$ C. (FIG. 65B), and the EAM Cu at $-15°$ C. (FIG. 65C) were monitored.

Figures 1A, 1B, 1C:
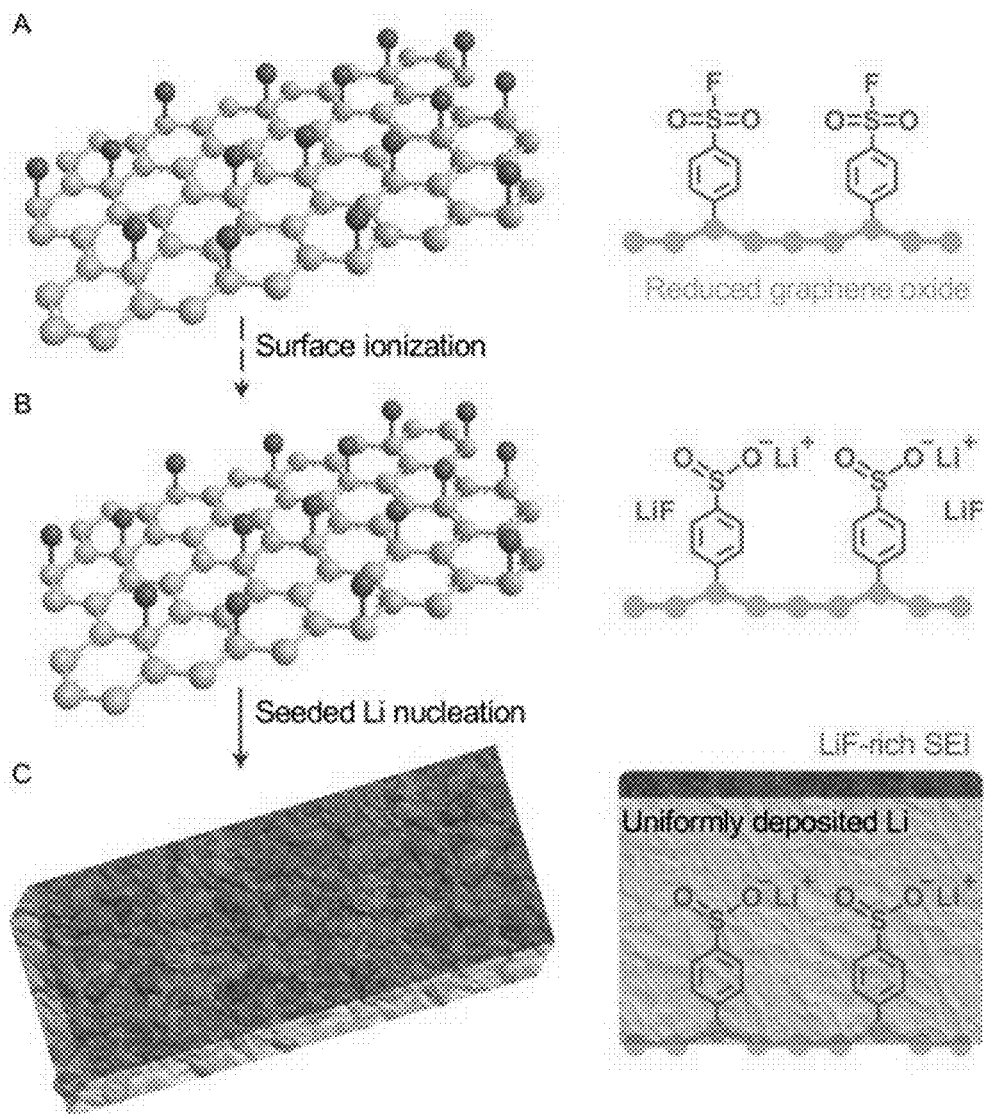
FIGS. 1A-1C depict an illustration of a stable interface for Li deposition using a labile organic molecule, benzenesulfonyl fluoride (BSF).

The accompanying figures, which are incorporated in and constitute a part of this specification, illustrate several aspects described below.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

As used herein, the terms "optional" or "optionally" means that the subsequently described event or circumstance can or cannot occur and that the description includes instances where said event or circumstance occurs and instances where it does not.

It is appreciated that certain features of the disclosure, which are, for clarity, described in the context of separate aspects, can also be provided in combination in a single aspect. Conversely, various features of the disclosure, which are, for brevity, described in the context of a single aspect, can also be provided separately or in any suitable subcombination.

As used in the description and the appended claims, the singular forms "a," "an," and "the" include plural referents unless the context clearly dictates otherwise. Thus, for example, a reference to "a functional group" includes two or more such functional groups, reference to "a battery" includes two or more such batteries and the like.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims, which follow, reference will be made to a number of terms that shall be defined herein.

For the terms "for example" and "such as," and grammatical equivalences thereof, the phrase "and without limitation" is understood to follow unless explicitly stated otherwise.

As used herein, the term "substituted" means that a hydrogen atom is removed and replaced by a substituent. It is contemplated to include all permissible substituents of organic compounds. As used herein, the phrase "optionally substituted" means unsubstituted or substituted. It is to be understood that substitution at a given atom is limited by valency. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein, which satisfy the valencies of the heteroatoms. This disclosure is not intended to be limited in any manner by the permissible substituents of organic compounds. Also, the terms "substitution" or "substituted with" include the implicit proviso that such substitution is in accordance with a permitted valence of the substituted atom and the substituent and that the substitution results in a stable compound, e.g., a compound that does not spontaneously undergo transformation such as by rearrangement, cyclization, elimination, etc. In still further aspects, it is understood that when the disclosure describes a group being substituted, it means that the group is substituted with one or more (i.e., 1, 2, 3, 4, or 5) groups as allowed by valence selected from alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The expressions "ambient temperature" and "room temperature" as used herein are understood in the art and refer generally to a temperature, e.g., a reaction temperature, that is about the temperature of the room in which the reaction is carried out, for example, a temperature from about 20° C. to about 30° C.

The term "aliphatic" as used herein refers to a non-aromatic hydrocarbon group and includes branched and unbranched, alkyl, alkenyl, or alkynyl groups. As used herein, the term "$C_n$-$C_m$ alkyl," employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, teri-butyl, isobutyl, sec-butyl; higher homologs such as 2-methyl-l-butyl, n-pentyl, 3-pentyl, n-hexyl, 1,2,2-trimethylpropyl, heptyl, octyl, nonyl, decyl, dodecyl, tetradecyl, hexadecyl, eicosyl, tetracosyl, and the like. The alkyl group can also be substituted or unsubstituted. Throughout the specification, "alkyl" is generally used to refer to both unsubstituted alkyl groups and substituted alkyl groups; however, substituted alkyl groups are also specifically referred to herein by identifying the specific substituent(s) on the alkyl group. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

For example, the term "halogenated alkyl" specifically refers to an alkyl group that is substituted with one or more halides, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below and the like. When "alkyl" is used in one instance, and a specific term such as "alkylalcohol" is used in another, it is not meant to imply that the term "alkyl" does not also refer to specific terms such as "alkylalcohol" and the like.

As used herein, "$C_n$-$C_m$ alkenyl" refers to an alkyl group having one or more double carbon-carbon bonds and having n to m carbons. Examples of alkenyl groups include, but are not limited to, ethenyl, n-propenyl, isopropenyl, n-butenyl, seobutenyl, and the like. In various aspects, the alkenyl moiety contains 2 to 6, 2 to 4, or 2 to 3 carbon atoms. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, thiol, or phosphonyl, as described below.

As used herein, "$C_n$-$C_m$ alkynyl" refers to an alkyl group having one or more triple carbon-carbon bonds and having n to m carbons. Exemplary alkynyl groups include, but are not limited to, ethynyl, propyn-1-yl, propyn-2-yl, and the like. In various aspects, the alkynyl moiety contains 2 to 6, 2 to 4, or 2 to 3 carbon atoms. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described below.

As used herein, the term "$C_n$-$C_m$ alkylene," employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In various aspects, the alkylene moiety contains 2 to 6, 2 to 4, 2 to 3, 1 to 6, 1 to 4, or 1 to 2 carbon atoms.

As used herein, the term "$C_n$-$C_m$ alkoxy," employed alone or in combination with other terms, refers to a group of formula —O-alkyl, wherein the alkyl group has n to m carbons. Example of alkoxy groups includes methoxy, ethoxy, propoxy (e.g., w-propoxy and isopropoxy), teri-butoxy, and the like. In various aspects, the alkyl group has 1 to 6, 1 to 4, or 1 to 3 carbon atoms.

The terms "amine" or "amino" as used herein are represented by the formula —$NR^1R^2$, where $R^1$ and $R^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —C(O)$NR^1R^2$.

The term "aldehyde" as used herein is represented by the formula —C(O)H. Throughout this specification, "C(O)" or "CO" is a shorthand notation for C=O, which is also referred to herein as a "carbonyl."

The term "carboxylic acid" as used herein is represented by the formula —C(O)OH. A "carboxylate" or "carboxyl" group as used herein is represented by the formula —C(O)$O^-$.

The term "ester" as used herein is represented by the formula —OC(O)$R^1$ or —C(O)O$R^1$, where $R^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $R^1$O$R^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $R^1$C(O)$R^2$, where $R^1$ and $R^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

As used herein, the term "thio" refers to a group of formula —SH.

As used herein, the term "$C_n$-$C_m$ alkylthio" refers to a group of formula —S-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfmyl" refers to a group of formula —S(O)-alkyl, wherein the alkyl group has n to m carbon atoms. In various aspects, the alkyl group has 1 to 6, 1 to 4, or 1 to 3 carbon atoms.

As used herein, the term "$C_n$-$C_m$ alkylsulfonyl" refers to a group of formula —$S(O)_2$-alkyl, wherein the alkyl group has n to m carbon atoms. In various aspects, the alkyl group has 1 to 6, 1 to 4, or 1 to 3 carbon atoms.

As used herein, the term "carbamyl" to a group of formula —$C(O)NH_2$.

As used herein, the term "carbonyl," employed alone or in combination with other terms, refers to a —$C(=O)$— group, which may also be written as $C(O)$.

As used herein, the term "carboxy" refers to a group of formula —$C(O)OH$.

As used herein, "halogen" refers to F, Cl, Br, or I. The term "hydroxyl" as used herein is represented by the formula —OH.

The term "cyano" as used herein is represented by the formula —CN. The term "nitro" as used herein is represented by the formula —$NO_2$.

The term "phosphonyl" is used herein to refer to the phospho-oxo group represented by the formula —$P(O)$ $(OR^1)_2$, where $R^1$ can be absent, hydrogen, an alkyl, alkenyl, alkynyl, aryl, heteroaryl, cycloalkyl, or cycloalkenyl.

The term "silyl" as used herein is represented by the formula —$SiR^1R^2R^3$, where $R^1$, $R^2$, and $R^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —$S(O)_2R^1$, where $R^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —$S(O)_2NH$—.

As used herein, "cycloalkyl" refers to non-aromatic cyclic hydrocarbons, including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3-10}$). Ring-forming carbon atoms of a cycloalkyl group can be optionally substituted by oxo or sulfido (e.g., $C(O)$ or $C(S)$). Cycloalkyl groups also include cycloalkylidenes. Example of cycloalkyl groups includes cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, and the like. In various aspects, cycloalkyl is cyclopropyl, cyclobutyl, cyclopentyl, cyclohexyl, cyclopentyl, or adamantyl.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example of heterocycloalkyl groups includes pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., $C(O)$, $S(O)$, $C(S)$, or $S(O)_2$, etc.). The heterocycloalkyl group can be attached through a ring-forming carbon atom or a ring-forming heteroatom. In various aspects, the heterocycloalkyl group contains 0 to 3 double bonds.

The term "cycloalkenyl," as used herein, is a non-aromatic carbon-based ring composed of at least three carbon atoms and containing at least one double bond, i.e., $C=C$. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In various aspects, aryl groups have from 6 to about 20 carbon atoms, from 6 to about 15 carbon atoms, or from 6 to about 10 carbon atoms. In various aspects, the aryl group is a substituted or unsubstituted phenyl.

As used herein, "heteroaryl" refers to a monocyclic or polycyclic aromatic heterocycle having at least one heteroatom ring member selected from sulfur, oxygen, phosphorus, and nitrogen. In various aspects, the heteroaryl ring has 1, 2, 3, or 4 heteroatom ring members independently selected from nitrogen, sulfur, and oxygen. In various aspects, any ring-forming N in a heteroaryl moiety can be an N-oxide. In various aspects, the heteroaryl has 5-10 ring atoms and 1, 2, 3 or 4 heteroatom ring members independently selected from nitrogen, sulfur, and oxygen. In various aspects, the heteroaryl has 5-6 ring atoms and 1 or 2 heteroatom ring members independently selected from nitrogen, sulfur, and oxygen. In various aspects, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl, and pyridazinyl.

The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

"R$^1$," "R$^2$," "R$^3$," "R$^n$," etc., where n is some integer, as used herein can, independently, possess one or more of the groups listed above. For example, if R$^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within the second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value and/or to "about" another particular value. When such a range is expressed, another aspect includes from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint and independently of the other endpoint. Unless stated otherwise, the term "about" means within 5% (e.g., within 2% or 1%) of the particular value modified by the term "about."

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight, component Y, X and Y are present at a weight ratio of 2:5 and are present in such ratio regardless of whether additional components are contained in the mixture.

A weight percent (wt. %) of a component, unless specifically stated to the contrary, is based on the total weight of the formulation or composition in which the component is included.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items.

It will be understood that, although the terms "first," "second," etc., may be used herein to describe various elements, components, regions, layers and/or sections. These elements, components, regions, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

As used herein, the term "substantially" means that the subsequently described event or circumstance completely occurs or that the subsequently described event or circumstance generally, typically, or approximately occurs.

Still further, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is then about 1% by weight, e.g., less than about 0.5% by weight, less than about 0.1% by weight, less than about 0.05% by weight, or less than about 0.01% by weight of the stated material, based on the total weight of the composition.

In other aspects, as used herein, the term "substantially free," when used in the context of a surface substantially free of defects, for example, is intended to refer to a surface that has less than about 5% of defects, less than about 4.5% of defects, less than about 4% of defects, less than about 3.5% of defects, less than about 3% of defects, less than about 2.5% of defects, less than about 2% of defects, less than about 1.5% of defects, less than about 1% of defects, less than about 0.5% of defects, less than about 0.1% of defects, less than about 0.05% of defects, or less than about 0.01% of defects of the total surface.

While aspects of the present invention can be described and claimed in a particular statutory class, such as the system statutory class, this is for convenience only and one of ordinary skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred in any respect. This holds for any possible non-express basis for interpretation, including matters of logic with respect to arrangement of steps or operational flow, plain meaning derived from grammatical organization or punctuation, or the number or type of aspects described in the specification.

The present invention may be understood more readily by reference to the following detailed description of various aspects of the invention and the examples included therein and to the Figures and their previous and following description.

Electrochemical Cell

As described above, in some aspects disclosed herein is an electrochemical cell comprising: a) an active anode metal electrochemically deposited on a host material functionalized with one or more electrochemically active groups, wherein the active anode metal comprises an electrochemically active surface; b) an electrolyte; and c) a solid electrolyte interphase layer disposed on the electrochemically active surface of the active anode metal and comprising a first metal salt, wherein the first metal salt is a first reaction product of an electrochemical decomposition of at least a portion of one or more electrochemically active groups; wherein a metal cation in the first metal salt and the active anode metal comprise the same metal; and wherein the electrochemical cell is substantially stable for 200-600 plating/stripping cycles at a temperature from about −60° C. to about 45° C.

In yet further aspects, the cell is substantially stable for about 200, about 300, about 400, about 500, or about 600 plating/stripping cycles a temperature from about −60° C. to about 45° C., including exemplary values of about −55° C., about −50° C., about −45° C., about −40° C., about −35° C., about −30° C., about −25° C., about −20° C., about −15° C., about −10° C., about −5° C., about 0° C., about 5° C., about 10° C., about 15° C., about 20° C., about 25° C., about 30° C., about 35° C., and about 40° C.

In certain aspects and as disclosed herein, the functionalization can comprise an electrochemically active monolayer. Where in some aspects, the electrochemically active monolayer comprises a self-assembled monolayer. It is understood that the monolayer can comprise any functional groups that are capable to electrochemically decompose. In certain aspects, the monolayer can comprise one or more sulfonyl fluoride groups configured electrochemically decompose. It is further understood that nay known in the art compositions having sulfonyl fluoride groups can be utilized. The compositions can comprise, for example, and without limitation, functionalized aryls or heteroaryls. In some exemplary aspects, the monolayer can comprise benzedisulfonyl fluoride.

In still further aspects, the host material can comprise any known in the art materials. For example, the host material can comprise copper or graphite-based materials.

In certain exemplary aspects, the host material comprises copper. In such exemplary aspects, it can be presented as a foil, grid, wire, filament, or any combination thereof.

In yet other exemplary aspects, the host material comprises a carbon-based material. The carbon-based materials can comprise carbon black, graphene, reduced graphene oxide, graphene oxide, graphite, or any combination thereof. It is understood that the carbon-based materials can also be functionalized by any known in the art functional groups that can be decomposed electrochemically.

In yet further aspects, the host material can comprise the carbon-based material that is functionalized with one or more sulfonyl fluoride groups. In still further aspects, the carbon-based material can comprise a reduced graphene oxide aerogel. In still further exemplary aspects, wherein the reduced graphene oxide aerogel can be functionalized with benzenesulfonyl fluoride.

In still further aspects, the electrochemically active surface of the active anode metals described herein is substantially free of dendrites.

In certain aspects, the first metal salt is a metal fluoride salt. In yet further aspects, the functionalized host material further can further comprise a second reaction product of the electrochemical decomposition of at least a portion of one or more electrochemically active groups, wherein the second reaction product comprises a metalophilic anion. In certain exemplary and unlimiting aspects, the metalophilic anion comprises benzenesulfonate. However, it is understood that the metalophilic anion can comprise any anion that is formed from the decomposition of the electrochemically active groups.

In still further aspects, the active anode metal can be electrochemically deposited at a current density of about 0.1 mA cm$^{-2}$ to about 15 mA cm$^{-2}$, including exemplary values of about 0.5 mA cm$^{-2}$, about 1 mA cm$^{-2}$, about 2 mA cm$^{-2}$, about 3 mA cm$^{-2}$, about 4 mA cm$^{-2}$, about 5 mA cm$^{-2}$, about 6 mA cm$^{-2}$, about 7 mA cm$^{-2}$, about 8 mA cm$^{-2}$, about 9 mA cm$^{-2}$, about 10 mA cm$^{-2}$, about 11 mA cm$^{-2}$, about 12 mA cm$^{-2}$ about 13 mA cm$^{-2}$, and about 14 mA cm$^{-2}$. In yet further aspects, the active anode metal can be electrochemically deposited at a temperature form about −60° C. to about 45° C., including exemplary values of −55° C., about −50° C., about −45° C., about −40° C., about −35° C., about −30° C., about −25° C., about −20° C., about −15° C., about −10° C., about −5° C., about 0° C., about 5° C., about 10° C., about 15° C., about 20° C., about 25° C., about 30° C., about 35° C., and about 40° C.

In certain aspects, the solid electrolyte interphase layer disclosed herein can comprise one or more layers. In such exemplary aspects, the one or more layers of the solid electrolyte interphase layer can comprise an inner metal fluoride-rich inner phase, an amorphous outer layer, and an amorphous intermediate layer. In yet further exemplary aspects, the metal fluoride can also be embedded in the amorphous intermediate layer. It is understood that the metal fluoride can be present in the intermediate layer in any form, shape, and size. In yet some exemplary aspects, the metal fluoride is present in the intermediate layer comprises nanocrystals.

In still further aspects, the outer layer and the intermediate layer can have the same or different composition for SEI on rGO. In some aspects, the outer layer and the intermediate layer are the same. Yet, in still further aspects, the outer layer and the intermediate layer are different. However, it is understood that in such exemplary aspects, the inner layer comprising metal fluoride is still present. It is further understood that in such aspects, the inner layer is a metal fluoride-rich layer as compared to other layers. In still further aspects, the metal fluoride can be absent in the intermediate layer.

It is further understood that since the SEI forms in part as a result of decomposition of at last a portion of the electrolyte, the one or more layers of solid electrolyte interphase can further comprise one or more metal salts having an anion different from fluoride. In still further aspects, the first metal salt can be present in an amount from about 10 wt % to about 60 wt %, including exemplary values of about 15 wt %, about 20 wt %, about 25 wt %, about 30 wt %, about 35 wt %, about 40 wt %, about 45 wt %, about 50 wt %, and about 55 wt %.

In still further aspects, a composition of the solid electrolyte interphase layer does not substantially change for about 600 cycles conducted at a temperature from about $-60°$ C. to about 45° C. In yet other aspects, the composition of the solid electrolyte interphase layer does not substantially change for about 200, about 300, about 400, about 500, or about 600 plating/stripping cycles at a temperature of about $-60°$ C., about $-55°$ C., about $-50°$ C., about $-45°$ C., about $-40°$ C., about $-35°$ C., about $-30°$ C., about $-25°$ C., about $-20°$ C., about $-15°$ C., about $-10°$ C., about $-5°$ C., about 0° C., about 5° C., about 10° C., about 15° C., about 20° C., about 25° C., about 30° C., about 35° C., about 40° C., or about 45° C.

In still further aspects, the solid electrolyte layer can have a thickness from about 50 nm to about 200 nm, including exemplary values of about 70 nm, about 100 nm, about 120 nm, about 150 nm, and about 170 nm.

In yet further aspects, the active anode metal and the cation of the first metal salt can comprise any electrochemically active metal suitable for the desired application. In yet further aspects, the active anode metal and the cation of the first metal salt can comprise any metals that can provide a desired stable voltage for a predetermined time. In yet further aspects, the active anode metal and the cation of the first metal salt can comprise lithium, sodium, or zinc.

In still further aspects, any known in the art electrolytes suitable for the desired application can be utilized. For example, the suitable non-aqueous electrolyte includes a non-aqueous solvent such as, for example, carbonated, N-methyl acetamide, acetonitrile, symmetric sulfones, sulfolane, polyethylene glycols, 1,3-dioxolanes, glymes, siloxanes, ethylene oxide grafted sulfolanes, polyethylene glycols, 1,3-dioxolanes, glymes, siloxanes, ethylene oxide grafted siloxanes, or a combination thereof. A suitable non-aqueous electrolyte further includes one or more salts such as, for example, lithium chloride (LiCl), lithium hexafluorophosphate ($LiPF_6$), lithium bis(trifluoromethanesulfonyl)imide (LiTFSI), lithium bis(fluorosulfonyl)imide (LiFSI), lithium tetrafluoroborate ($LiBF_4$), lithium methanesulfonate ($LiCH_3SO_3$), lithium trifluoromethanesulfonate ($LiDF_3SO_3$), lithium hexafluoroarsenate ($LiAsF_6$), lithium trifluoroantimonate ($LiSbF_6$), lithium perchlorate ($LiClO_4$), sodium perchlorate ($NaClO_4$), zinc trifluoromethanesulfonate ($Zn(F_3SO_3)_2$), $Li[BF_2(C_2O_4)]$, $Li[PF_2(C_2O_4)_2]$, $Li[N(CF_3SO_2)_2]$, $Li[C(CF_3SO_2)_3]$, lithium bis(oxalato)borate (LiBOB), or a combination thereof.

Batteries

The present disclosure is further directed to a battery comprising the disclosed electrochemical cell and a cathode material.

It is understood that any known in the art cathode materials suitable for the desired application can be used. In certain, exemplary and unlimiting aspects, the cathode active materials can comprise Li metal oxides such as $LiMO_2$ (M=Ni, Co, Mn, and other transition metal), $LiMPO_4$(M=Fe, Mn, Co, and other transition metal), metal oxide, a sulfur-based cathode, and the like.

In still further aspects, the disclosed herein batteries can provide substantially stable operation for about 200 to about 1,000 plating/stripping cycles at a temperature from about $-60°$ C. to about 45° C., including exemplary values of about 300, about 400, about 500, about 600, about 700, about 800, and about 900 plating/stripping cycles at a temperature of about $-55°$ C., about $-50°$ C., about $-45°$ C., about $-40°$ C., about $-35°$ C., about $-30°$ C., about $-25°$ C., about $-20°$ C., about $-15°$ C., about $-10°$ C., about $-5°$ C., about 0° C., about 5° C., about 10° C., about 15° C., about 20° C., about 25° C., about 30° C., about 35° C., and about 40° C.

In still further aspects, the disclosed herein batteries exhibit capacity retention greater than about 80%, greater than about 85%, greater than about 90%, greater than about 95%, or greater than about 99%.

In still further aspects, disclosed herein batteries exhibit an electrolyte-to-capacity ratio of less than about 15 μL $mAh^{-1}$, less than about 14 μL mAh-1, about 13 μL $mAh^-$, about 12 μL $mAh^-$, about 11 μL $mAh^{-1}$, about 10 μL $mAh^{-1}$, about 9 μL $mAh^{-1}$, about 8 μL $mAh^{-1}$, about 7 μL $mAh^{-1}$, about 5 μL $mAh^{-1}$, about 4 μL $mAh^{-1}$, about 3 μL $mAh^{-1}$, about 2 μL $mAh^{-1}$, or less than about 1 μL $mAh^{-1}$.

In yet other aspects, the disclosed herein batteries exhibit a coulombic efficiency for a metal deposition greater than about 80%, greater than about 85%, greater than about 90%, greater than about 95%, greater than about 96%, greater than about 97%, greater than about 98%, or greater than about 99% when measured at a predetermined current density. In yet further aspects, the predetermined current density is from about 0.1 mAh $cm^{-2}$ to about 15 mAh $cm^{-2}$, including exemplary values of about 0.5 mA $cm^{-2}$, about 1 mA $cm^{-2}$, about 2 mA $cm^{-2}$, about 3 mA $cm^{-2}$, about 4 mA $cm^{-2}$, about 5 mA $cm^{-2}$, about 6 mA $cm^{-2}$, about 7 mA $cm^{-2}$, about 8 mA $cm^{-2}$, about 9 mA $cm^{-2}$, about 10 mA $cm^{-2}$, about 11 mA $cm^{-2}$, about 12 mA $cm^{-2}$, about 13 mA $cm^{-2}$, and about 14 mA $cm^{-2}$.

Methods

Further disclosed herein are methods directed to forming electrochemical cells. In such exemplary aspects, the method of forming an electrochemical cell comprising: providing a host material functionalized with one or more electrochemically active groups; providing an electrolyte; and electrochemically depositing the active anode metal on the host material to form the active anode metal comprising an electrochemically active surface; forming a solid electrolyte interphase layer disposed on the electrochemically active surface of the active anode metal and comprising a first metal salt, wherein the first metal salt is a first reaction product of an electrochemical decomposition of at least a portion of one or more electrochemically active groups; wherein the metal cation in the first metal salt and the active anode metal comprise the same metal; and wherein the electrochemical cell is substantially stable for 200-600 plating/stripping cycles at a temperature from about $-60°$ C. to about 45° C.

Also disclosed herein is a method of forming a battery comprising providing any of the disclosed herein electrochemical cells and providing a cathode material.

By way of non-limiting illustration, examples of certain aspects of the present disclosure are given below.

EXAMPLES

The following examples are put forth so as to provide those of ordinary skill in the art with a complete disclosure and description of how the compounds, compositions, articles, devices and/or methods claimed herein are made and evaluated and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is degrees C. or is at ambient temperature, and pressure is at or near atmospheric. Some additional examples can be found in Y. Gao "Stable metal anodes enabled by a labile organic molecule bonded to a reduced graphene oxide aerogel," *Proceeding of the National Academy of Sciences of the United States of America (PNAS)*, 2020, 117 (48) and in Y. Gao "Low-temperature and high-rate-charging lithium batteries enabled by an electrochemically active monolayer-regulated interface," *Nature Energy*, 5, 534-542 (2020), the contents of which are incorporated herein in whole entirety.

Example 1

The current example depicts a molecular approach for regulating the electrochemical interface of metal anodes, which enables even Li deposition and stable SEI formation in a conventional electrolyte. In this example, a labile organic molecule, benzenesulfonyl fluoride (BSF), was bonded to a reduced graphene oxide (rGO) aerogel surface as the Li anode host (FIG. 1A). During Li deposition, BSF molecules can electrochemically decompose at the interface and generate benzenesulfonate anions bonded to the rGO aerogel (FIG. 1B). Without wishing to be bound by any theory, it is hypothesized that the conjugated anions can have a strong binding affinity for Li, thus serving as lithio-philic sites to induce homogeneous nucleation of Li. Again, without wishing to be bound by any particular theory, it was further hypothesized that the BSF molecules could contrib-ute LiF to the SEI layer, which can further facilitate Li surface passivation (FIG. 1C). FIG. 1C shows that Li nucleation preferentially occurs at the conjugated anion sites owing to the strong Li binding affinity, which leads to uniform Li deposition. In addition, the LiF is formed in the SEI layer, and it passivates the Li surface. In this example, a high-efficiency (99.2%) Li deposition was achieved at a Li deposition amount of 6.0 mAh cm$^{-2}$ and a current density of 6.0 mA cm$^{-2}$. It was found, as evidenced by the low nucleation overpotentials at high current density (6.0 mA cm$^{-2}$) or at low temperature (−10° C.), that the barrier to Li nucleation can be reduced. A 400-cycle life with a capacity retention of at least 83.6% was achieved for a Li|LiCoO$_2$ (LCO) cell in a conventional carbonate electrolyte. It was further found that in the presence of the labile organic molecule-based interface, the Li|LCO cell can be stably cycled at a low operating temperature (−10° C.).

Materials

Chemicals

All chemical reagents were supplied by Sigma Aldrich and Alfa Aesar and used without further purification. Bat-tery-grade lithium (Li) salts and solvents, including lithium hexafluorophosphate (LiPF6), lithium bis(oxalate)borate (LiBOB), lithium nitrate (LiNO3), sodium perchlorate (Na-ClO4), ethylene carbonate (EC), and ethyl methyl carbonate (EMC) were purchased from BASF. Zinc trifluoromethane-sulfonate (Zn(CF3SO3)2), acetonitrile, and diglyme were purified using 4 Å molecular sieves and used for electrolyte preparation. LiCoO2 cathode materials and Li foils were purchased from MTI.

Preparation of Graphene Oxide Solutions

The graphene oxide solutions were prepared by following a modified Hummers method. To fully exfoliate graphite powders, 6 g of graphite powder was added in a heated (80° C.) aqueous solution of sulfuric acid (50 mL, 95-98%), potassium persulfate (5 g), and phosphorus pentoxide (5 g). The mixture was stirred at 80° C. for 6 h. After that, 200 ml of distilled water was slowly added, followed by a filtering and washing process. The resulting pre-oxidized graphite powders were dried at 60° C. in the air overnight. The dried powders were then slowly added to a cold (0° C.) solution of sulfuric acid (240 mL, 95-98%) with an ice bath. 24 g of potassium permanganate powder was then added. The tem-perature was maintained below 10° C. in this process. After the addition process was complete, the mixture was stirred at 35° C. for 2 h. 200 ml of distilled water was added, and the mixture was stirred at 45° C. for another 2 h. Finally, an aqueous hydrogen peroxide solution (600 ml, 2%) was added to the solution for 15 min, followed by filtering and washing with hydrochloric acid (10%) three times. The resulting graphene oxide solution was diluted and subjected to dialysis against deionized water for one week.

Synthesis of the BSF-rGO Aerogels

The rGO aerogels were prepared by a hydrothermal synthesis approach. In general, an aqueous solution of graphene oxide (2 mg ml$^{-1}$) was sealed in a Teflon-lined autoclave reactor and then hydrothermally heated at 180° C. for 20 h. After cooling to room temperature, the rGO hydrogel was obtained and was immediately hydrothermally treated with an aqueous solution of ammonia (14 v/v %) at 90° C. for 1 h. The resulting rGO aerogel was then dried using a free dryer at −45° C. and in a vacuum oven at 100° C. To perform the modification reaction of rGO aerogels, the dried rGO aerogels were immersed in a solution of 50 mmol (4-fluorosulfonyl)benzenediazonium tetrafluoroborate and 0.1 mol tetrabutylammonium hexafluorophosphate in degassed acetonitrile under an argon atmosphere. The reac-tion was carried out at room temperature in the absence of light for 36 h. The product was rinsed with acetonitrile 6 times, immersed in acetonitrile overnight, and dried in a vacuum chamber at 100° C. before use.

Sample Preparations for NMR and XPS Measurements

Samples for $^{19}$F NMR tests were prepared by immersing the cycled BSF-rGO and rGO electrodes in 1.5 ml D$_2$O for 1 h. The solution was centrifuged, and the supernatant was used for NMR experiments. To perform the XPS measure-ments, electrode samples were rinsed with EMC two times, dried in a vacuum chamber, and immediately transferred to the instrument by using an air-controlled vessel filled with argon gas.

Characterization

XPS measurements were carried out on a PHI VersaProbe II Scanning XPS Microprobe. A vacuum transfer vessel was used to load samples in an argon-filled glove box and transfer samples into the XPS instrument. SEM images were captured on a Nova NanoSEM 630 instrument. CV analysis was performed on a Nuvant EZStat Pro instrument. EIS was measured using a Metrohm Autolab potentiostat (PGSTAT128N) between 1 and 100000 Hz at 25° C. $^{19}$F NMR tests were conducted on a Bruker AV-3-HD-500 instrument.

Electrochemical Testing

Electrochemical tests of battery cells were conducted on Landt battery testers using CR 2016 coin cells under gal-vanostatic charge-discharge conditions at different currents. To measure the efficiency of metal deposition, a 6.0 mAh cm$^{-2}$ Li was pre-deposited on the BSF-rGO aerogel electrode, and the amount of stripped Li was measured to calculate the efficiency. The counter Li electrode was replaced with fresh Li after every 100 cycles due to Li dendrite growth on its surface. To prepare the Li|LCO cells, LCO cathodes were fabricated by mixing LCO powders, conductive carbon, and polyvinylidene fluoride binder at a mass ratio of 85:5:10 in anhydrous N-methyl-2-pyrrolidone. The slurry was cast onto Al foil, and the electrode was dried in a vacuum chamber. LCO cathodes were pre-delithiated to 4.2 V at a current density of 0.2 mA cm$^{-2}$ and then paired with the BSF-rGO aerogel@Li anodes. It was found that such treatment can help exclude the gassing issue caused by the SEI formation of 4V cathode material.

DFT Calculation of Li Binding Energy

For calculating metals' binding energy (Li, Na, Zn) on graphene and the BSF-graphene layer, spin-polarized first-principles DFT calculations were performed using the Vienna ab initio simulation package (VASP) with the plane wave basis sets. The DFT calculations used projector augmented wave (PAW) pseudo-potentials and Perdew-Burke-Ernzerhof (PBE) exchange-correlation functional with an energy cutoff of 600 eV. For an estimate of the dispersion interactions, Grimme's DFT dispersion correction (DFT-D3) was used. The model graphene layer consists of 72-carbon atoms with hydrogen-capped zigzag edges. The lattice constant of a primitive unit cell of graphene in this calculation is 2.46 Å. The adatom-graphene was modeled by adding one metal atom to the hollow, top, or edge sites on the graphene surface, which corresponds to a coverage of 1 adatom per 72 C atoms. The BSF-graphene was generated by adding one benzenesulfonyl group to the top site of the graphene surface. The Brillouin zone was sampled with a 4×1×4⌈-centered k-point mesh and Gaussian smearing with a width of σ=0.2 eV used for the occupancies of the electronic levels. For each binding site of the adatom graphene and the BSF-graphene, the ionic coordinates of all atoms were relaxed in all directions. For the top site, which is set directly above a carbon atom, the metal atom was relaxed along the z-direction while remaining fixed in the x- and y-directions.

Results and Discussion

Figures 2A, 2B, 2C, 2D:
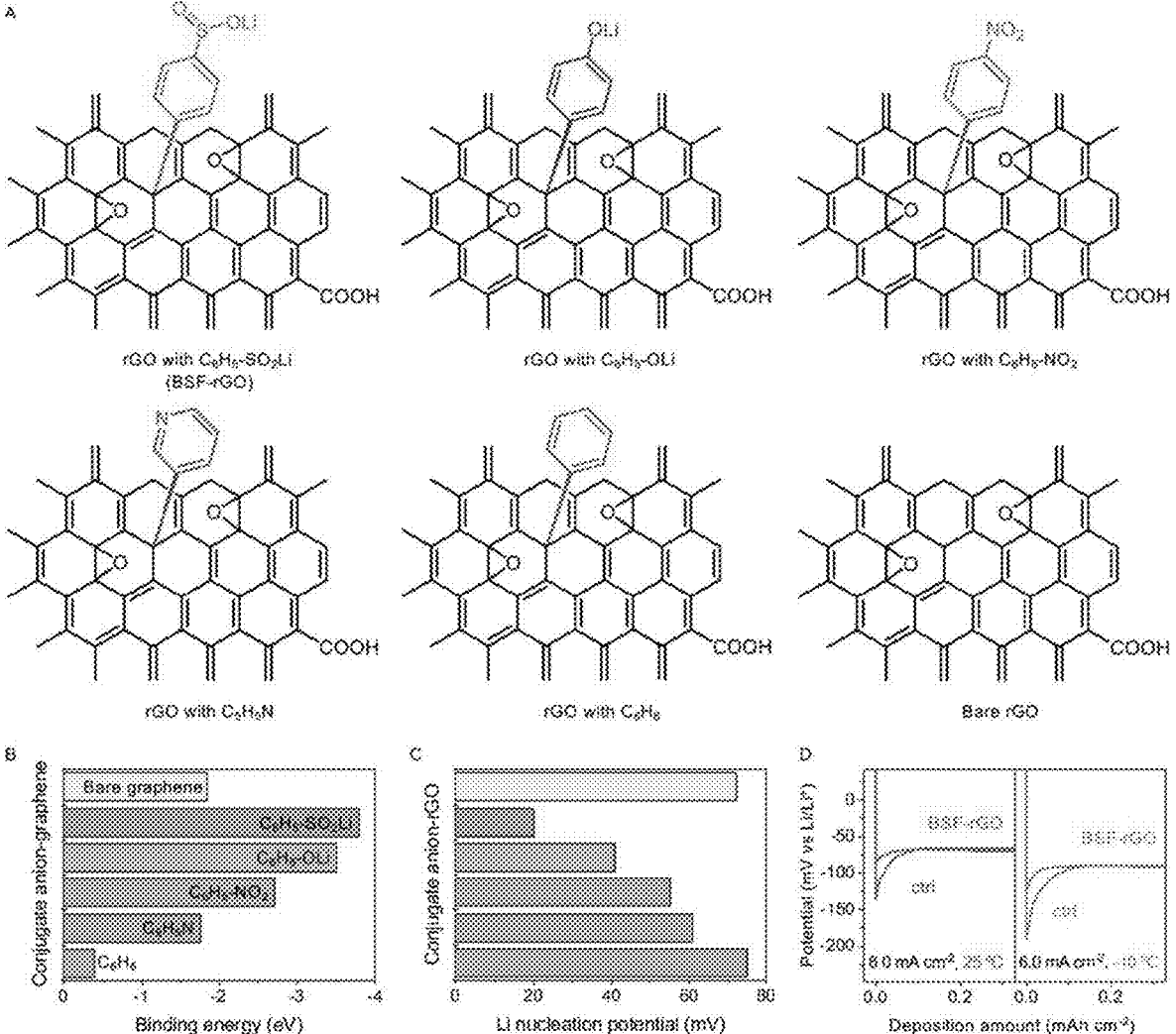
FIGS. 2A-2D depict functionalization of the rGO aerogel surface by conjugated molecules for stabilizing the Li-electrolyte interface.

It was found that Li nucleation can be regulated by BSF-rGO aerogel. Without wishing to be bound by any theory, it was assumed that to achieve a stable Li deposition, a Li-binding surface is needed for homogeneous Li nucleation. Thus, various conjugated organic molecules as preferred Li nucleation sites were screened, including benzenesulfonate, phenolate, nitrobenzene, pyridine, and benzene (FIG. 2A). FIG. 2A shows idealized structures of the functionalized rGO aerogels. The conjugated molecules are bonded on the surface, defects, and edges of the rGO aerogels.

These molecules were bonded to the surface, defects, and edge sites of an rGO aerogel via an electron-transfer reaction with diazonium salts. It was found that the as-prepared rGO aerogels have interconnected macropore-channels. An rGO aerogel cylinder was formed. The cylinder was then cut into round chips with a thickness of 100 μm using a microtome.

The high-resolution XPS spectra of the as-prepared rGO aerogel, prepared by hydrothermal synthesis was collected to evaluate the final structure and C—C/C═C from aromatic rings (the peak at 284.6 eV in the C 1s spectrum), C—O from hydroxyl groups (peaks at 286.1 eV in the C 1s spectrum and 532.9 eV in the O 1s spectrum), —COOH from hydroxyl groups (peaks at 289.2 eV in the C 1s spectrum and 531.1 eV in the O 1s spectrum), and C—N (peaks at 286.1 eV in the C 1s spectrum (overlapped with the C—O) and 399.6 eV in the N 1s spectrum) were observed (the XPS spectrum is not shown).

Figures 3, 4, 5A, 5B:
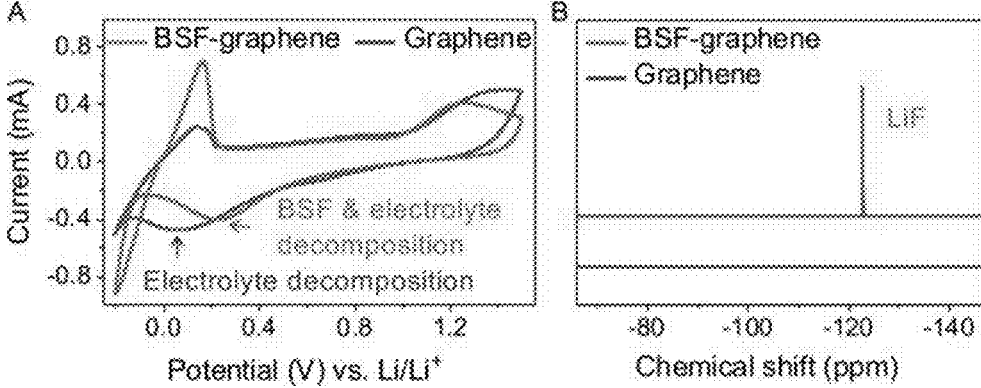
FIG. 3 shows a synthesis of (4-fluorosulfonyl)benezene-diazonium tetrafluoroborate (compound 2) for the rGO modification.
FIG. 4 shows a synthesis of BSF-rGO aerogels via an electron transfer reaction between diazonium salts and rGO aerogels.
FIGS. 5A-5B depict the electrochemical activity of the BSF on the rGO aerogel.

FIG. 3 shows the synthetic scheme for functionalizing rGO aerogels with 4-fluorosulfonyl)benzenediazonium tetrafluoroborate. 3-Aminobenezenesulfonyl fluoride (7.0 g, 40 mmol) was added to a cold solution of tetrafluoroboric acid (HBF$_4$) (48 wt. % in H$_2$O, 20 mL). The mixture was stirred in an ice bath for 30 min. A cold solution of sodium nitrite (NaNO$_2$) (3.5 g, 51 mmol in 6 ml H$_2$O) was added dropwise to the mixture. The reaction mixture was further stirred for 15 min at 0° C. The ice bath was next removed, followed by another 15 min stirring at room temperature. To collect the product, 50 ml cold ethanol was added to the mixture, and the precipitate was filtered and washed with 10 ml cold anhydrous ethanol and 10 ml cold anhydrous diethyl ether, respectively, six times for each. Yield: 6.4 g (58%); $^1$H NMR (400 MHz, dimethyl sulfoxide-d6) [ppm]: δ 8.67 (s, 2H), 8.11 (m, 2H), 7.89 (m, 4H); $^{19}$F NMR (CDCl$_3$): δ 66.23 (s, 1F); EI (+) (m/z): [M]+ calculated for C$_6$H$_4$BF$_5$N$_2$O$_2$S: 273.97; found: 274.

FIG. 4 depicts a schematic of BSF-rGO aerogel synthesis via an electron transfer reaction between diazonium salts and rGO aerogels. BSF-rGO aerogels were synthesized via a free radical reaction between the diazonium salt-terminated benzenesulfonyl fluoride (compound 2) and the rGO aerogel. 3-(Aminomethyl)pyridine, 4-hydroxybenzylamine, benzylamine, and 4-nitrobenzylamine were used as the starting materials, respectively, to synthesize diazonium salt-terminated pyridine (C$_5$H$_5$N) (corresponding to the brown anion in FIG. 2A), diazonium salt-terminated phenol (C$_6$H$_5$—OH) (corresponding to the purple anion in FIG. 2A), diazonium salt-terminated benzene (C$_6$H$_6$) (corresponding to the blue anion in FIG. 2A), diazonium salt-terminated nitrobenzene (C$_6$H$_5$—NO$_2$) (corresponding to the green anion in FIG. 2A) using the same approach. The XPS spectra of the BSF-rGO aerogel were also collected to evaluate the final structure. In addition to the rGO aerogel peaks, the peaks of covalently bonded benzenesulfonyl fluoride were found in the XPS spectra. These include —SO$_2$—F (peaks at 688.7 eV in the F 1s spectrum and 169.6 and 168.4 eV in the S 2p spectrum) and C—C/C═C (the peak at 284.6 eV in the C 1s spectrum).

The XPS spectra of different functionalized rGO aerogels were also measured (the XPS spectra are not shown). In addition to the rGO aerogel peaks, the peaks of the surface bonded groups were found. In the spectra of the phenolate-modified rGO aerogel, the C═C (the peak at 284.6 eV in the C 1s spectrum), C—O (peaks at 533.0 eV in the O 1s spectrum and 286.1 eV in the C 1s spectrum) were assigned to the phenolate group; in the spectra of the benzene-modified rGO aerogel, the C═C (the peak at 284.6 eV in the C 1s spectrum) were attributed to the benzene group; in the spectra of the nitrobenzene-modified rGO aerogel, the C═C (the peak at 284.6 eV in the C 1s spectrum), C—NaO$_2$ (peaks at 402.6 eV in the N 1s spectrum and 286.3 eV in the C 1s spectrum) were assigned to the nitrobenzene group; and in the spectra of the pyridine-modified rGO aerogel, the C═C (the peak at 284.6 eV in the C 1s spectrum), C—N (pyridine) (peaks at 400.3 eV in the N 1s spectrum and 286.2 eV in the C 1s spectrum) were assigned to the pyridine group.

The Li binding energy was then compared with Li nucleation overpotential of the organic molecule-functionalized rGO aerogel hosts. By using a density functional theory (DFT) simulation, the BSF-derived anion, benzenesulfonate, was calculated to have a high Li binding energy of −3.79 eV, superior to that of the bare graphene layer (−1.84 eV) and other candidate molecules (FIG. 2B).

Calculations of the binding energies between the conjugated benzenesulfonate anion and metal ions such as Li⁺, Na⁺, and Zn²⁺ were performed as well. The binding energies between the conjugated benzenesulfonate anion ($C_6H_5^-$ $SO_2^-$) and metal ions (Li⁺, Na⁺, and Zn²⁺) were calculated. DFT calculations for Li⁺ and Na⁺ were based on Jaguar with basis set 6-311G₊₊ and theory B3LYP, and the calculation for Zn₂₊ was based on Jaguar with basis set LACV3P₊₊ and theory B3LYP. The conjugated benzenesulfonate anion was found to have strong binding energies with Li⁺, Na⁺, and Zn²⁺.

Additional calculations of the binding energies between the conjugated benzenesulfonate anion and metal atoms such as Li, Na, Zn were also done (the calculations are not shown). The binding energies between the conjugated benzenesulfonate anion ($C_6H_5^-$ SO²⁻) and metal atoms (Li, Na, and Zn) were calculated. DFT calculations for the Li atom and Na atom were based on Jaguar with basis set 6-311G₊₊ and theory B3LYP, and the calculation for Zn atom was based on Jaguar with basis set LACV3P₊₊ and theory B3LYP. The conjugate benzenesulfonate anion was found to have strong binding energies with Li and Na atoms, while it has a relatively weak binding energy with Zn atoms. The calculations have shown the relative stability of the binding sites of the conjugate benzenesulfonate anion bonded-graphene. Additional calculations were performed to evaluate the binding energy between benzenesulfonate anion bonded-graphene binding site c and Li atom. Also, DFT calculation was performed to evaluate the binding energies of Li atom on the graphene aerogel surface bonded with phenolate, nitrobenzene, pyridine, and benzene, respectively.

It was shown that in these examples, a low Li nucleation overpotential of ~20 mV on BSF-rGO aerogel was recorded, which is much lower than the ~72 mV found with the bare rGO aerogel and other molecules (FIG. 2C). The DFT calculations have shown that the benzenesulfonate anion bonded-graphene layer has a stronger affinity for Na and Zn than the graphene layer, as evidenced by the higher binding energies to Na atoms and Zn atoms.

FIG. 2D shows the voltage profiles of Li deposition on the BSF-rGO aerogel and the bare rGO aerogel. 1 M lithium hexafluorophosphate (LiPF₆) in ethylene carbonate (EC)/ethyl methyl carbonate (EMC) electrolyte was used for these measurements. At a high-current-density (6.0 mA cm⁻²), the barrier to Li deposition in the control cell increased progressively, as evidenced by the higher Li nucleation overpotential of ~101 mV. When the temperate falls to −10° C., the overpotential grew to ~193 mV due to slower kinetics. While on the other hand, the BSF-regulated Li nucleation had much lower overpotentials of ~33 mV at 25° C. and ~121 mV at −10° C., which, without wishing to be bound by any theory, has indicated the effective regulation of Li deposition. In addition, the BSF-rGO aerogel has a strong affinity for both Na and Zn, lowering the nucleation overpotentials under high-current-density and low-temperature conditions. The strong affinity of BSF-rGO aerogel for both Na and Zn was supported by the XPS spectra (not shown). In addition to the rGO aerogel peaks, the peaks of covalently bonded benzenesulfonyl fluoride were found in the XPS spectra. These include —SO₂—F (peaks at 688.7 eV in the F 1s spectrum and 169.6 and 168.4 eV in the S 2p spectrum) and C—C/C═C (the peak at 284.6 eV in the C 1s spectrum). After electrochemically scanning the BSF-rGO aerogel and rGO aerogel electrodes from 0 to 1 V in a 0.5 M LiBOB in EC/EMC electrolyte, the decomposition of the covalently bonded benzenesulfonyl fluoride was probed by studying the high-resolution XPS spectra of the electrodes. In the spectra of BSF-rGO, aerogel electrode peaks were found at 167.5 and 166.3 eV in the S 2p spectrum, and a peak was found at 56.2 in the Li 1s spectrum. These can be assigned to the Li—SO₂— group (3). Most importantly, LiF (peaks at 684.6 eV in the F 1s spectrum and 57.6 eV in the Li 1s spectrum) was observed in the SEI layer of the BSF-rGO aerogel electrode, which is absent in the SEI layer of the rGO aerogel electrode. Since fluorine comes exclusively from the benzenesulfonyl fluoride groups in this system, the benzenesulfonyl fluoride group can contribute LiF salt to the SEI by its electrochemical decomposition.

Stable SEI Enabled by the BSF-rGO Aerogel

In addition to regulating Li nucleation, BSF molecules can also contribute LiF to the SEI layer. The electrochemical activity of BSF-rGO aerogel was first investigated by cyclic voltammetry. The SEI formation peak of the bare rGO aerogel was observed from 0.25 to −0.1 V vs. Li/Li⁺ (FIG. 5A). For the BSF-rGO aerogel, the peak shifted positively by ~0.17 V, indicating, without wishing by any theory, that BSF is involved in SEI formation and BSF decomposition occurs before that of the electrolyte. The decomposition products were analyzed by nuclear magnetic resonance (NMR) and X-ray photoelectron spectroscopy (XPS). The BSF-rGO aerogel electrode was scanned from 1.5 to 0.05 V over two cycles at 1 mV s⁻¹. 0.5 M lithium bis(oxalate) borate (LiBOB) in EC/EMC electrolyte was used to exclude the generation of F-containing species. In the decomposition products, LiF was found in the ¹⁹F NMR spectrum (FIG. 5B), and LiF and benzenesulfonate ($C_6H_5$—$SO_2$—) were also observed in the XPS spectra (not shown). All electrodes were operated in a 1 M LiPF₆ in EC/EMC electrolyte for 50 cycles.

Figures 6A, 6B, 6C, 6D:
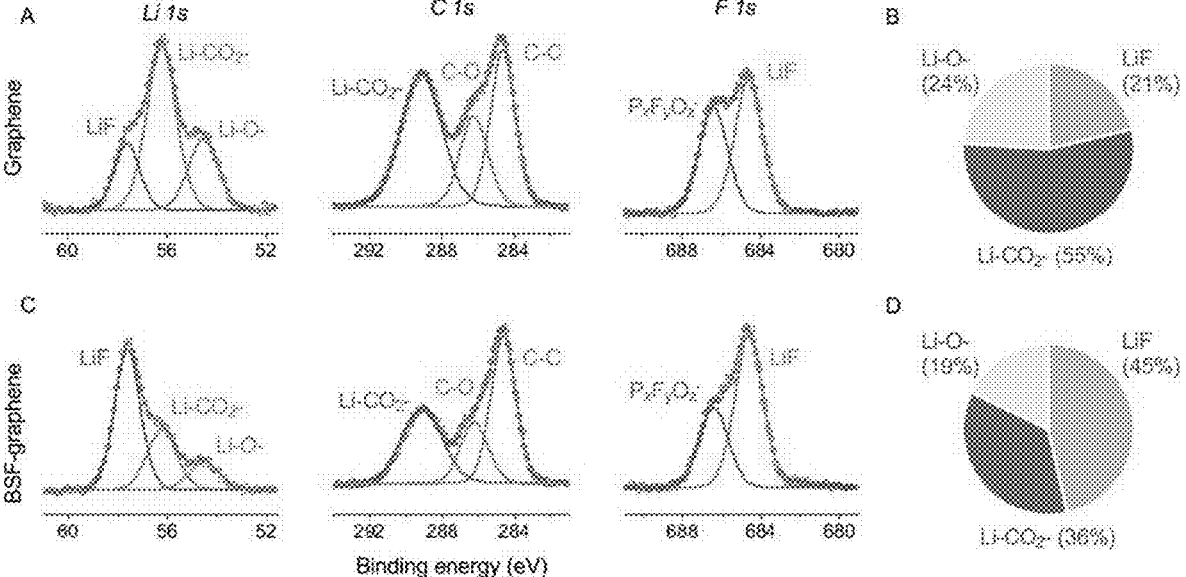
FIGS. 6A-6D depict the composition of the SEI on the BSF-rGO aerogel@Li electrode.

Without wishing to be bound by any theory, it was hypothesized that BSF molecules can decompose and generate LiF and benzenesulfonate during the Li deposition. SEI composition was further studied by conducting XPS on the rGO aerogel electrodes after 50 cycles in a 1 M LiPF₆ in EC/EMC electrolyte. As depicted in FIG. 6A, the SEI on the bare rGO aerogel@Li electrode mainly consists of Li—CO₂— salts (peaks at 56.2 eV in the Li 1s spectrum and 289.1 eV in the C 1s spectrum), Li—O— species (the peak at 54.5 eV in the Li 1s spectrum), LiF salts (peaks at 684.6 eV in the F 1s spectrum and 57.6 eV in the Li 1s spectrum), $P_xF_yO_z$— species (the peak at 686.2 eV in the F 1s spectrum and 136.7 eV in the P 2p spectrum, and organic species including C—C(the peak at 284.6 eV in the C 1s spectrum) and C—O (the peak at 286.2 eV in the C 1s spectrum). Calculation of all the Li salt concentrations in the SEI determines that the dominant salt of the conventional SEI is Li—CO₂— (45 at. %), and the LiF concentration is only 21 at. % (FIG. 6B). The XPS spectra of the SEI on the BSF-rGO aerogel are shown in FIG. 6C. The SEI contains a higher concentration of LiF (45 at. %) and a lower concentration of Li—CO₂— (36%), verifying that LiF is added by decomposition of BSF.

Meanwhile, the Li—CO₂— content in all the C-containing species is very low, indicating that the formation of Li—CO₂— by the electrolyte is dramatically suppressed (FIG. 6D). It was found that the use of BSF-rGO aerogel increases the concentration of LiF and suppresses the Li—CO₂— formation dramatically. All the electrodes were cycled in a 1 M LiPF₆ in EC/EMC electrolyte for 50 cycles.

Uniform Li Deposition on the BSF-rGO Aerogel

Figures 7A, 7B, 7C, 7D, 7E, 7F:
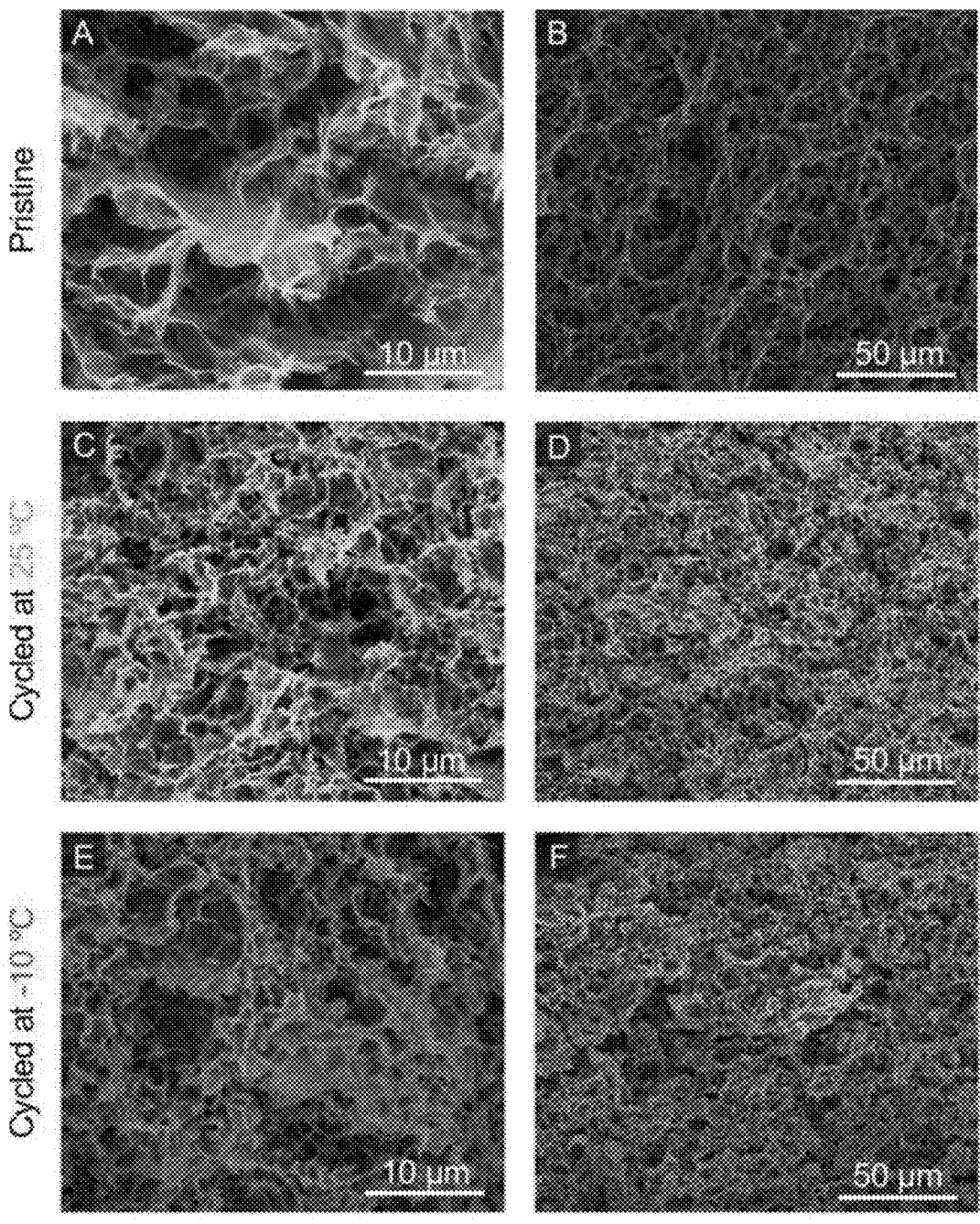
FIGS. 7A-7F depict the morphology of Li deposition on the BSF-rGO aerogel at room and low temperatures.
Figures 8A, 8B:
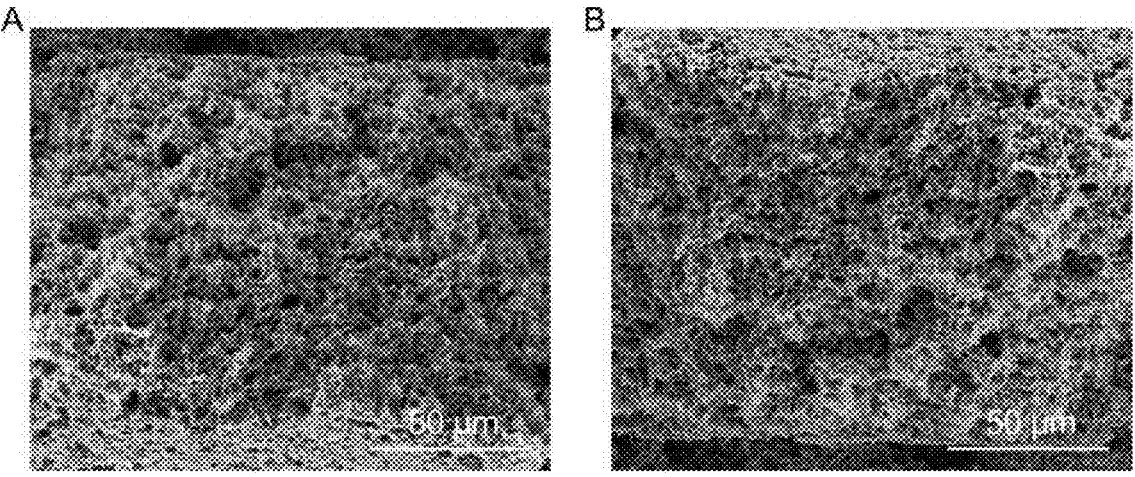
FIGS. 8A-8B depict morphological observation of Li deposition on the BSF-rGO aerogels at different tempera-tures.
Figures 9A, 9B, 9C, 9D:
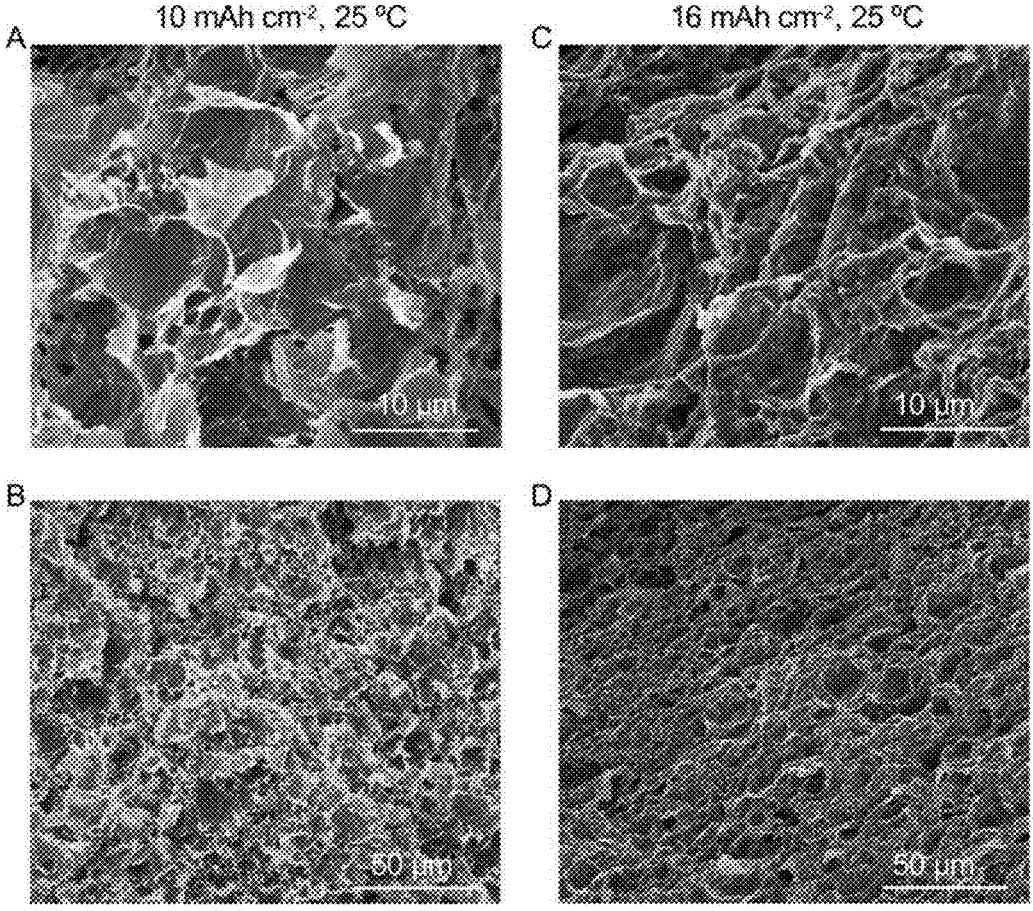
FIGS. 9A-9D show SEM images of a BSF-rGO aerogel@Li electrode with a Li deposition amount of 10 mAh $cm^{-2}$ (FIG. 9A and FIG. 9B) and 16 mAh $cm^{-2}$ (C and D) at 25° C. The electrodes were collected after 50 cycles at a current density of 6.0 mA $cm^{-2}$.
Figures 10A, 10B, 10C, 10D:
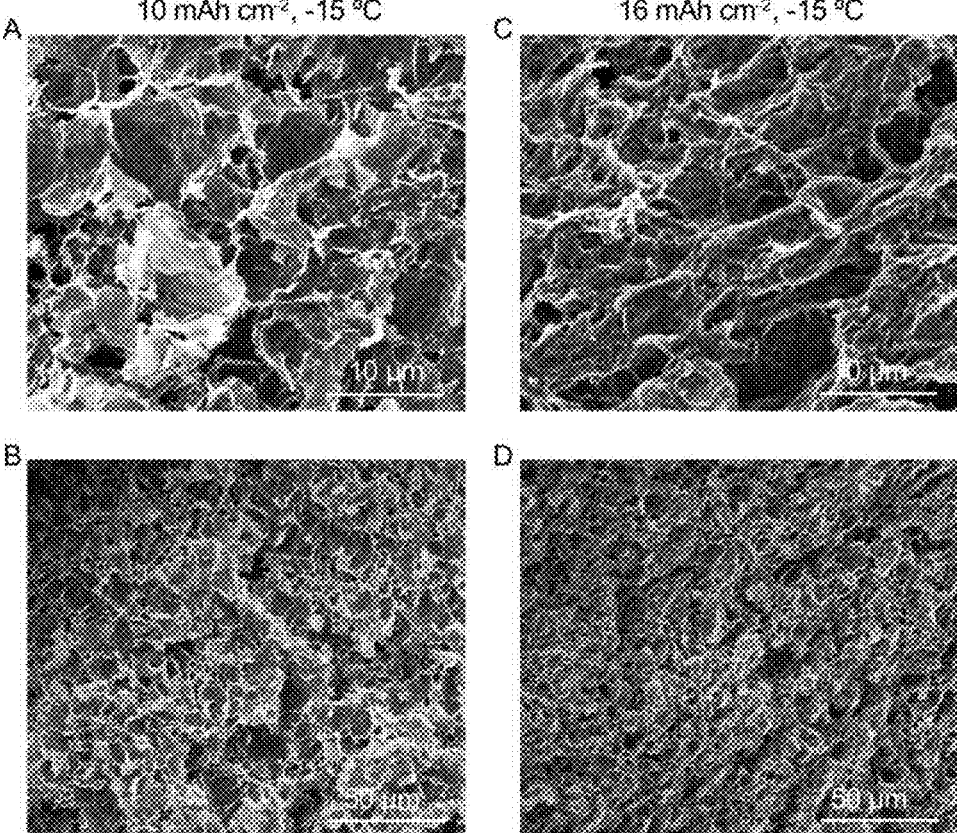
FIGS. 10A-10D show SEM images of a BSF-rGO aerogel@Li electrode with a Li deposition amount of 10 mAh $cm^{-2}$ (FIGS. 10A and 23B) and 16 mAh $cm^{-2}$ (FIGS. 10C and 23D) at –15° C. The electrodes were collected after 50 cycles at a current density of 6.0 mA $cm^{-2}$.

The morphology of BSF-regulated Li deposition was probed at a current density of 6.0 mA cm$^{-2}$ by scanning electron microscopy (SEM). The pristine BSF-rGO aerogel has interconnected macropore-channels (FIGS. 7A and 7B), a specific surface area of ~300 m$^2$ g$^{-1}$, and void space of ~96.6 vol. %. FIGS. 7C and 7D show the top-view SEM images of the BSF-rGO aerogel that accommodates 6.0 mAh cm$^{-2}$ Li and after 50 cycles at 25° C. It was found that Li grew uniformly on the BSF-rGO aerogel surface in a dendrite-free way. The electrode thicknesses before and after the Li deposition were ~100 and 106 μm, respectively, showing no discernable increase (FIGS. 8A-8B). Dendrite-free Li deposition was also realized when Li deposition amounts were 12 and 16 mAh cm$^{-2}$ (FIGS. 9-10). In addition, Li deposition was performed at –10° C., at which Li dendrite growth is typically intensified. Encouragingly, the use of BSF enabled stable and dendrite-free Li deposition owing to the relatively controlled Li nucleation and stabilized SEI (FIGS. 7E and 7F).

Stable Cycling of BSF-rGO Aerogel@Li Anodes

Figures 11A, 11B, 11C, 11D:
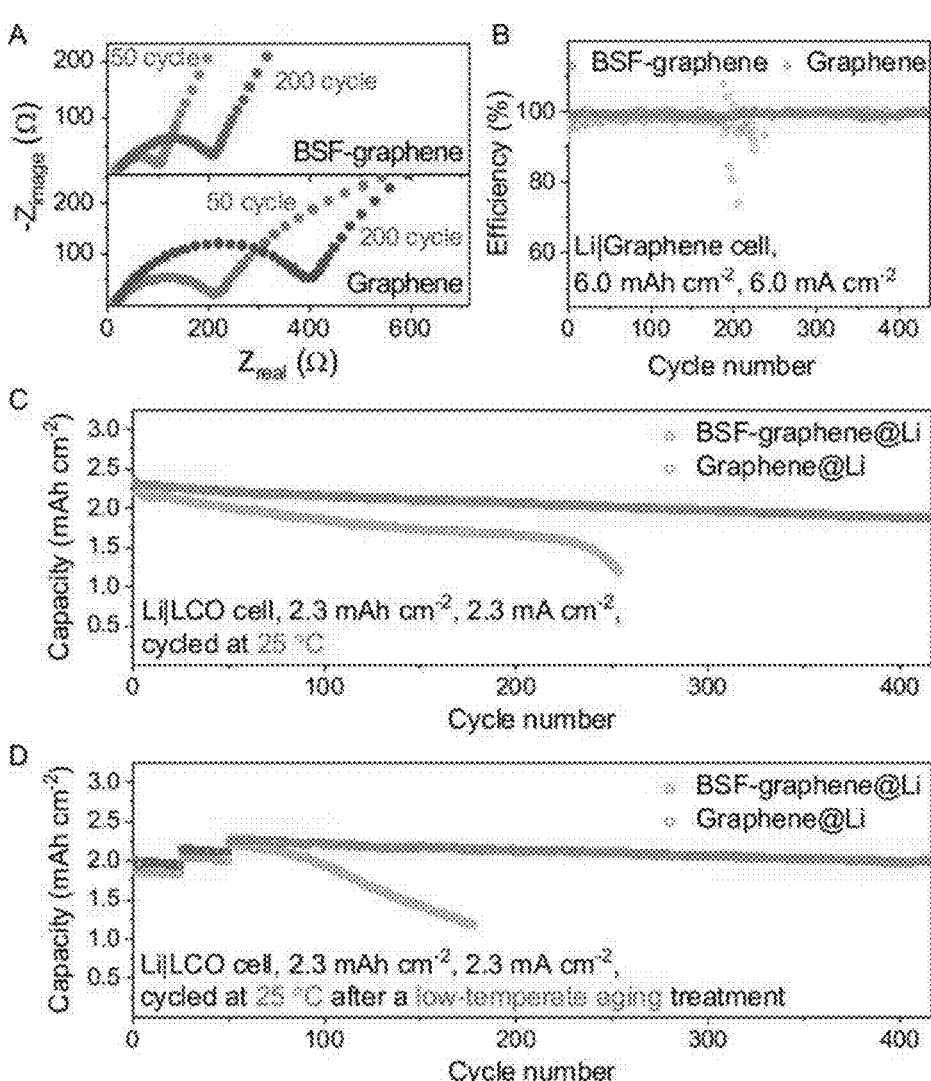
FIGS. 11A-11D show the electrochemical performance of BSF-rGO aerogel@Li anodes.
Figure 12:
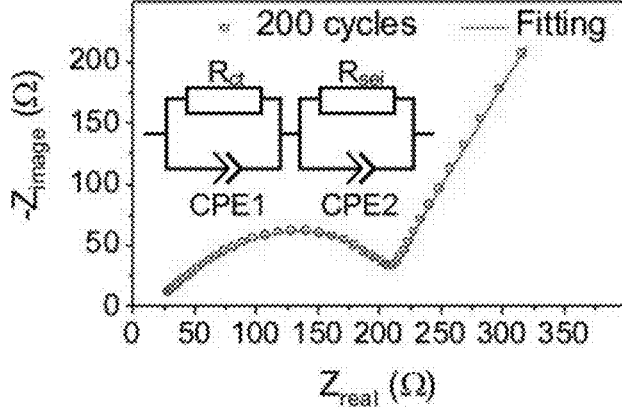
FIG. 12 shows the impedance spectrum of a Li|Li sym-metric cell incorporating BSF-rGO aerogel@Li electrodes after 200 cycles.

The electrochemical performance of BSF-rGO aerogel@Li anodes was investigated. The Li deposition stability was monitored by the evolution of impedance in a symmetric Li|Li cell incorporating a 1 M LiPF6 in EC/EMC with lithium nitrate (LiNO$_3$) (0.4%) and LiBOB (2%) electrolyte. It was found that for the cell incorporating BSF-rGO aerogel@Li, the charge-transfer resistance increased slightly, from 102 to 225Ω from the 50th to the 200th cycle, while that of the bare rGO aerogel@Li increased from 216 to 422Ω (FIG. 11A and FIG. 12). The equivalent circuit is shown in FIG. 12 was used for fitting the EIS curve of the symmetric Li|Li symmetric cell incorporating BSF-rGO aerogel@Li electrodes after 200 cycles. The low resistance of ~140Ω was attributed to the SEI layer, indicating a stable interface during Li deposition.

Figures 13A, 13B:
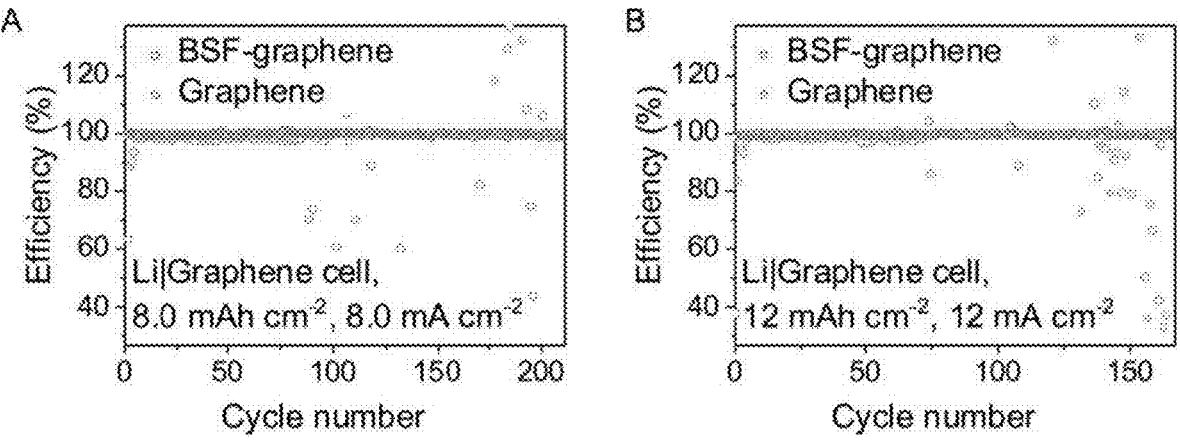
FIGS. 13A-13B show the efficiency of Li deposition in half cells using BSF-rGO aerogel (red) and rGO aerogel (grey) electrodes at a deposition amount of 8.0 mAh $cm^{-2}$ (FIG. 13A) and 12 mAh $cm^{-2}$ (FIG. 13B).

The limited resistance increase is attributed to suppressed SEI reformation. The Li deposition efficiency was measured in a Li|BSF-rGO aerogel cell at a deposition amount of 6.0 mAh cm$^{-2}$ and a current density of 6.0 mA cm$^{-2}$. Average efficiency of 99.2% was measured in 400 cycles (FIG. 11B), in contrast to fluctuating efficiencies with the bare rGO aerogel. When higher Li deposition amounts of 8.0 and 12.0 mAh cm$^{-2}$ were applied, the average efficiencies reached 99.1% and 89.8%, respectively (FIGS. 13A-13B).

Figures 14A, 14B:
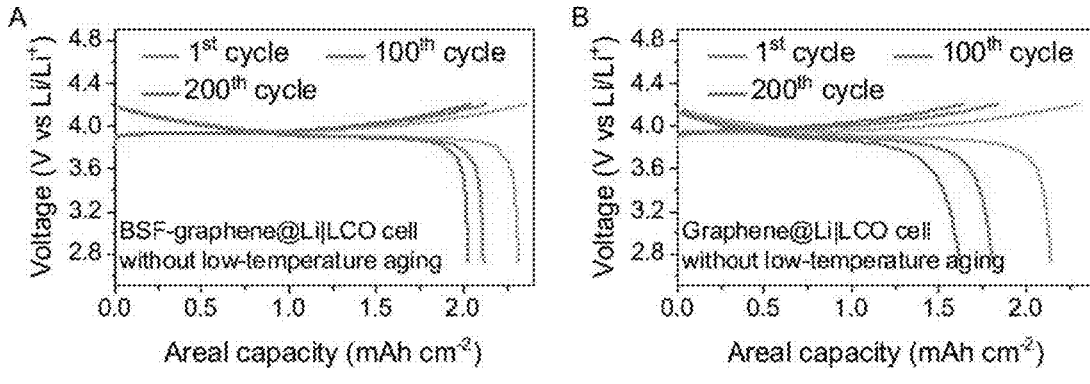
FIGS. 14A-14B show voltage profiles of a BSF-rGO@Li|LCO cell (FIG. 14A) and a rGO@Li|LCO cell (FIG. 14B) cycled at 25° C. without the low-temperature aging treatment.
Figures 15A, 15B:
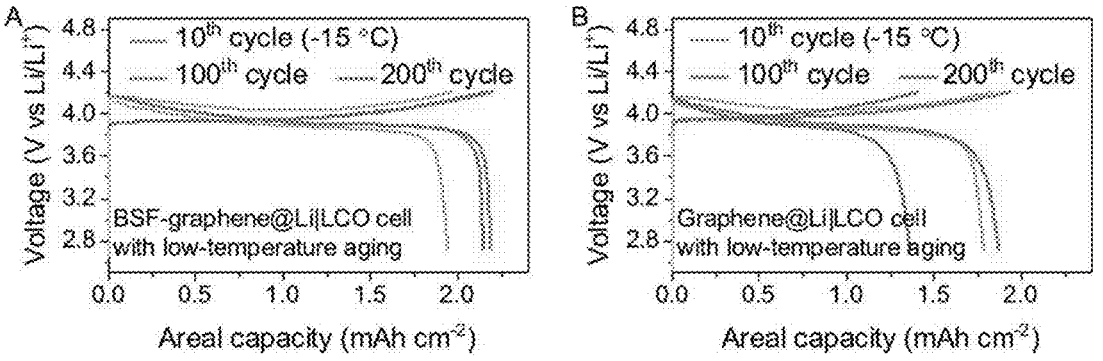
FIGS. 15A-15B show voltage profiles of a BSF-rGO@Li|LCO cell (FIG. 15A) and a rGO@Li|LCO cell (FIG. 15B). The cells were cycled at 25° C. before under-going a low-temperature aging treatment after 50 initial cycles. The $10^{th}$ cycle curves (grey) were obtained at –15° C.

The cycling stability of Li metal batteries was next investigated. LCO cathodes with a capacity of 2.3 mAh cm$^{-2}$ were pre-delithiated and paired with BSF-rGO aerogel@Li anodes with 12.0 mAh cm$^{-2}$ of Li. 1 M LiPF6 in EC/EMC with LiNO$_3$ and LiBOB electrolyte was used. The cell incorporating a BSF-rGO aerogel@Li anode had a capacity retention of 83.6% over 400 cycles (FIG. 11C) and presented stable voltage profiles upon cycling (FIG. 14A). In contrast, a control cell incorporating a bare rGO aerogel@Li anode showed a capacity retention of only 50% after 240 cycles with strong cell polarization (FIG. 14B). Following these experiments, the Li|LCO cells were aged at low temperatures to further examine the Li anode's stability under harsh conditions. The cells were first cycled at –10° C. and 0° C. for 25 cycles, respectively, and then constantly cycled at 25° C. With the low-temperature aging process, the cycle life of the Li|LCO cell was markedly shortened. The control cell showed gradual capacity fading (FIG. 11D and FIG. 15A), with a 50% capacity retention after 173 cycles. In contrast, with the BSF-rGO aerogel@Li anode, the cell had a capacity retention of 85.3% after 400 cycles (FIG. 11D) and showed stable voltage profiles (FIG. 15B). Notably, the performance was comparable to that of cells that were not aged (FIG. 11C). Li|LCO cells with areal capacities of 3.1 and 1.0 mAh cm$^{-2}$ delivered 200-cycle and 700-cycle lives, respectively (FIGS. 16-17). These experiments clearly show that the BSF-rGO aerogel's use provides stable electrodeposition and a stabilized SEI for Li metal anodes.

Figures 16A, 16B, 16C:
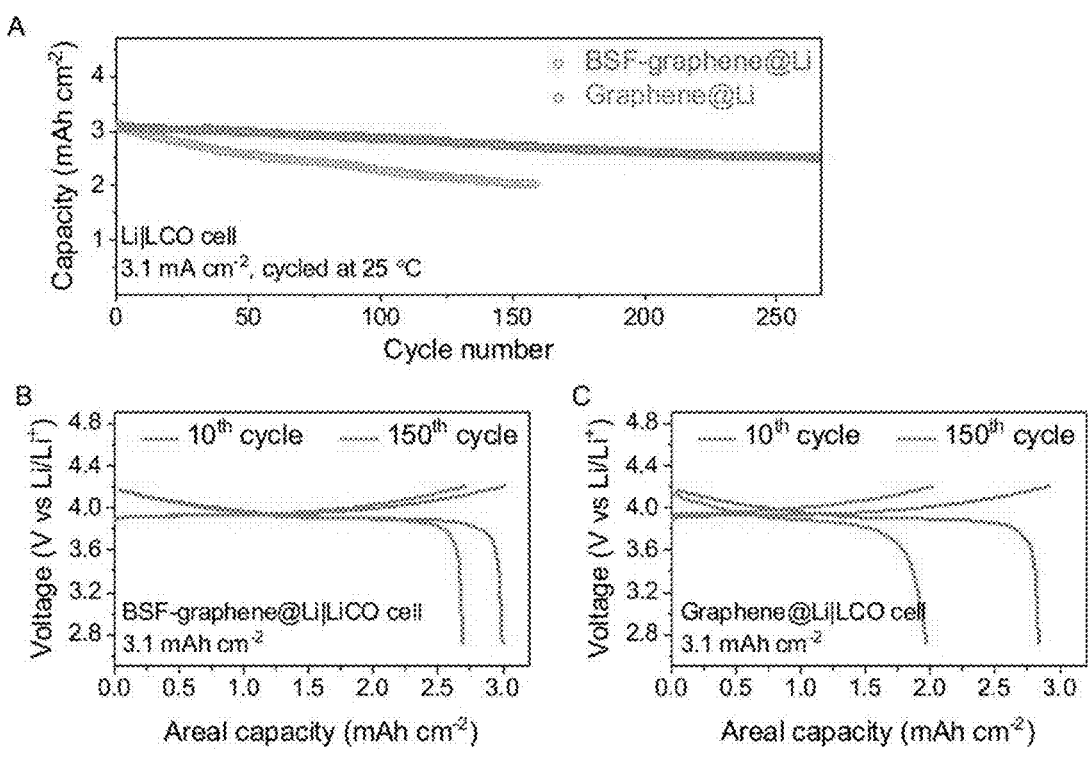
FIGS. 16A-16C show cycling stability of Li|LCO cells with an areal capacity of 3.1 mAh $cm^{-2}$.
Figures 17A, 17B, 17C:
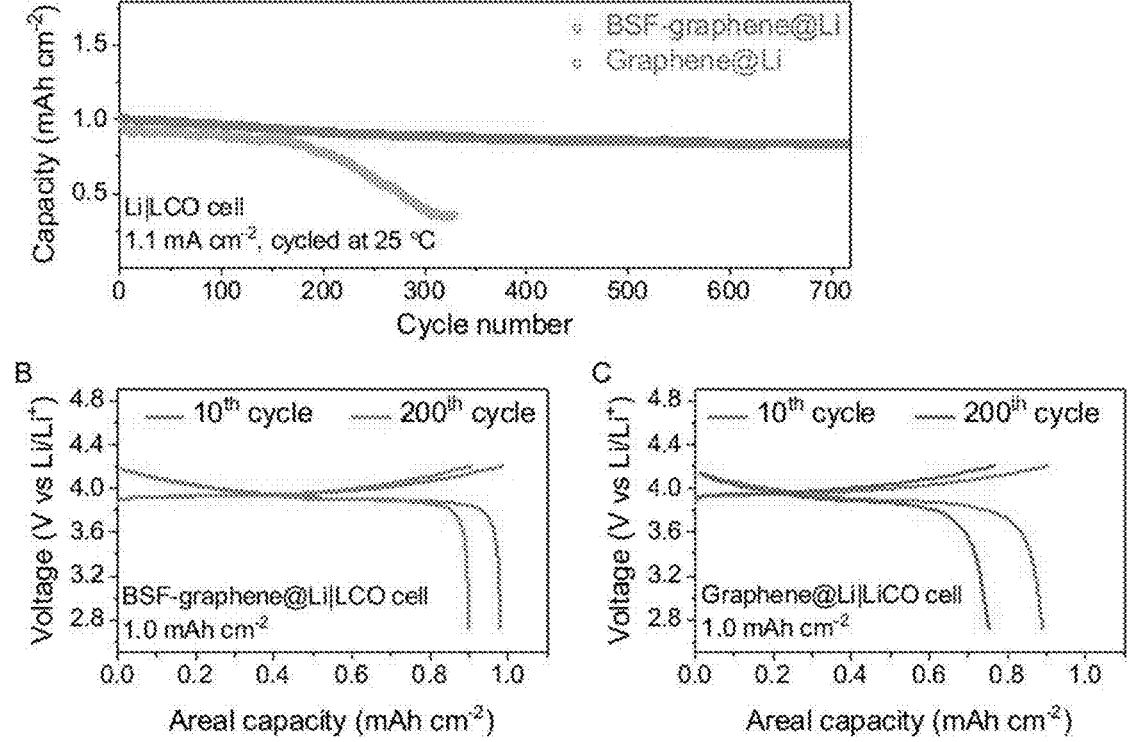
FIGS. 17A-17C show cycling stability of Li|LCO cells with an areal capacity of 1.0 mAh $cm^{-2}$.

FIGS. 16A-16C show cycling stability of Li|LCO cells with an areal capacity of 3.1 mAh cm$^{-2}$. The cells were tested at a constant temperature of 25° C. 1 M LiFP6 in EC/EMC with LiNO3 (0.4%) and LiBOB (2%) electrolyte (40 μl) was used. A Li|LCO cell with an areal capacity of 3.1 mAh cm$^{-2}$ has a capacity retention of 81.6% after 250 cycles (FIG. 16A) and stable voltage profiles without remarkably increased polarization (FIG. 16B). In contrast, the control cell incorporating a bare rGO aerogel@Li anode displays a capacity retention of only 63.6% after 160 cycles (FIG. 29A and severely increased polarization (FIG. 16C). The cells were cycled at a current density of 2.3 mA cm$^{-2}$. FIGS. 17A-17C show cycling stability of Li|LCO cells with an areal capacity of 1.0 mAh cm$^{-2}$. The cells were tested at a constant temperature of 25° C. 1 M LiFP$_6$ in EC/EMC with LiNO$_3$ (0.4%) and LiBOB (2%) electrolyte (40 μl) was used. A Li|LCO cell with an areal capacity of 1.0 mAh cm$^{-2}$ shows a capacity retention of 84.0% in 700 cycles (FIG. 17A) and stable voltage profiles (FIG. 17B). In contrast, the control cell using a bare rGO aerogel@Li anode has a capacity retention of 41.2% after 300 cycles (FIG. 17A and severe polarization FIG. 17C). The cells were cycled at a current density of 2.3 mA cm$^{-2}$.

In addition, this approach was applied for Na and Zn metal anodes. By analogy to its reactions at the Li surface, BSF generates benzenesulfonate and NaF/ZnF$_2$ on the Na and Zn metal surfaces, respectively. Na and Zn deposition also showed high efficiencies (FIGS. 18-19) and low nucleation overpotentials (FIGS. 20-21).

To analyze sodium behavior in the disclosed cells, the electrodes were operated in a 1 M NaClO$_4$ in diglyme electrolyte for 50 cycles. To identify the formation of NaF in the Na deposition, an XPS study was performed on the surface of a BSF-rGO aerogel electrode after Na deposition and plating for 50 cycles. 1 M NaClO$_4$ in diglyme electrolyte was used because, in that case, fluorine is exclusively from the benzenesulfonyl fluoride group. NaF signals in the SEI layer of the BSF-rGO aerogel electrode were observed, including peaks at 684.6 eV in the F 1s spectrum and 1071.5 eV in the Na 1s spectrum (overlapped with NaCl and Na—O) (the XPS spectra are not shown).

Figure 18:
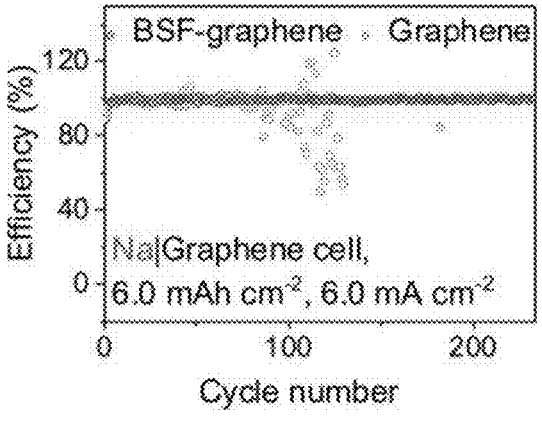
FIG. 18 shows efficiency of Na deposition in half cells using BSF-rGO aerogel (green) and rGO aerogel (grey) electrodes at a deposition amount of 6.0 mAh $cm^{-2}$. 1 M $NaClO_4$ in diglyme with $LiNO_3$ (0.4%) and LiBOB (2%) electrolyte was used.

In contrast, no F signals were found in the spectra of the bare rGO aerogel electrode. The peak of NaCl and Na—O in the Na 1s spectrum was at 1071.9 eV. The remaining peaks are consistent in the spectra of the BSF-rGO aerogel electrode and the control electrode. Detailed interpretation is as follows: peaks at 284.6 eV in the C 1s spectra can be assigned to C—C; peaks at 287.7 eV in the C 1s spectra and 530.1 eV in the O 1s spectra were attributed to C—O; peaks at 532.6 eV in the O 1s spectra belong to Na—O. As shown in FIG. 18, the average efficiency of 98.8% was found after 230 cycles for Na deposition in a BSF-rGO aerogel at a deposition amount of 6.0 mAh cm$^{-2}$ and a current density of 6.0 mA cm$^{-2}$ (FIG. 18). This is in marked contrast to the short-cycle-life Na deposition in the bare rGO aerogel with fluctuating efficiencies.

Figure 20:
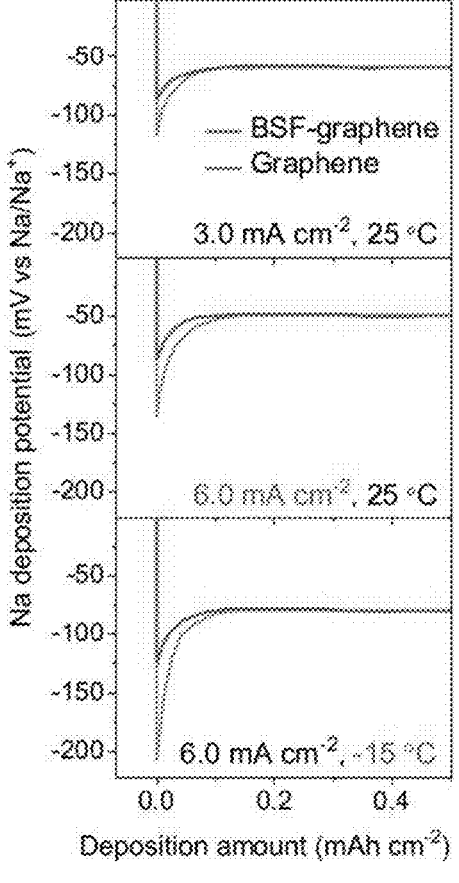
FIG. 20 shows Na deposition overpotentials of BSF-rGO aerogel and rGO aerogel electrodes at current densities of 3.0 and 6.0 mA $cm^{-2}$ at 25° C. and –15° C., respectively. 1 M $NaClO_4$ in diglyme electrolyte was used.
Figure 21:
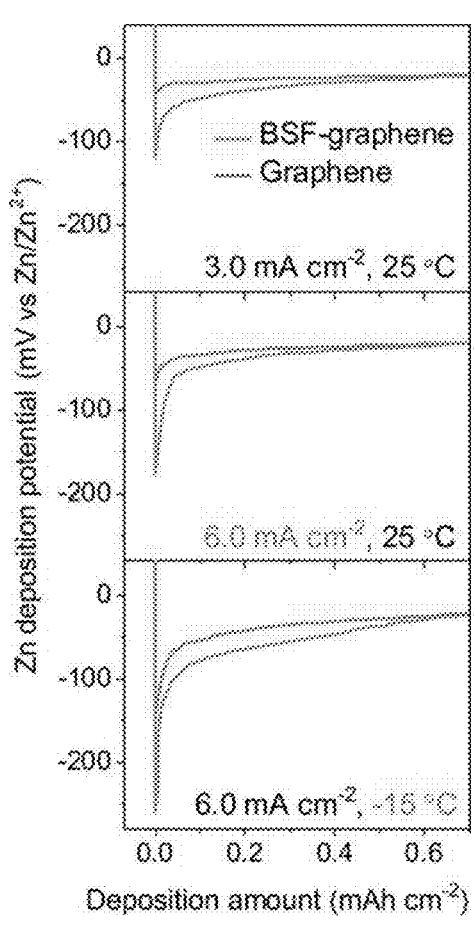
FIG. 21 shows Zn deposition overpotentials of BSF-rGO aerogel and rGO aerogel electrodes at current densities of 3.0 and 6.0 mA $cm^{-2}$ at 25° C. and –15° C., respectively. 1 M $Zn(CF_3SO_3)_2$ in acetonitrile electrolyte was used.

The Na nucleation behavior on the surface of BSF-rGO aerogel was studied by measuring the Na deposition overpotentials at different current densities and temperatures, and the results are shown in FIG. 20. At a current density of 3.0 mA cm–2 and room temperature (25° C.), BSF-rGO aerogel and bare rGO aerogel electrodes present overpotentials of 28 and 49 mV, respectively. When using a current density of 6.0 mA cm$_{-2}$, the overpotentials were 37 and 85 mV, respectively. At a current density of 6.0 mA cm_2 and low temperature (–15° C.), the overpotentials of BSF-rGO aerogel and bare rGO aerogel electrodes were 45 and 128 mV, respectively. 1 M NaClO$_4$ in diglyme electrolyte was used. The significantly reduced overpotential for Na deposition is attributed to the strong affinity of the BSF-rGO aerogel for Na.

Figure 19:
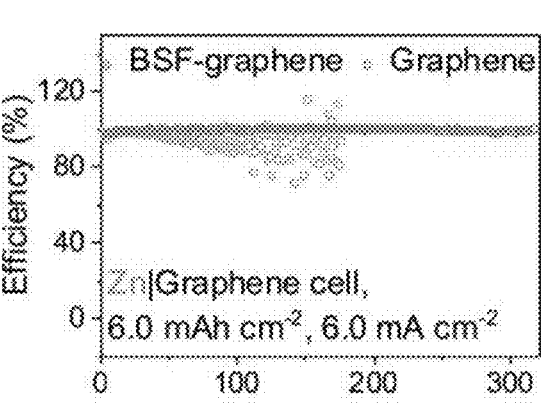
FIG. 19 shows efficiency of Zn deposition in half cells using BSF-rGO aerogel (green) and rGO aerogel (grey) electrodes at a deposition amount of 6.0 mAh $cm^{-2}$. 1 M $Zn(CF_3SO_3)_2$ in acetonitrile electrolyte was used.

To analyze Zn behavior in the disclosed cells, the electrodes were operated in a 1 M Zn(CF$_3$SO$_3$)$_2$ in acetonitrile electrolyte for 50 cycles. To probe the formation of ZnF$_2$ in the Zn deposition, an XPS study was performed on the surface of a BSF-rGO aerogel electrode after Zn deposition and plating for 50 cycles (the spectrum is not shown). 1 M 1 M Zn(CF$_3$SO$_3$)$_2$ in acetonitrile electrolyte was used, in which fluorine can come only from the benzenesulfonyl fluoride group. ZnF$_2$ (peaks at 684.5 eV in the F 1s spectrum and 1022.0 eV in the Zn 1s spectrum) and benzenesulfonate (C$_6$H$_5$—SO$_2^-$) anion (peaks at 167.7 and 170.2 eV in the S 2p spectra) were observed in the SEI layer of the BSF-rGO aerogel electrode. In contrast, no ZnF$_2$ signals were found in the spectra of the bare rGO aerogel electrode. The remaining peaks are consistent in the spectra of the BSF-rGO aerogel electrode and the control electrode. Detailed interpretation is as follows: peaks at 284.6 eV in the C 1s spectra were assigned to C—C; peaks at 286.3 eV in the C 1s spectra and 400.7 eV in the N 1s spectra can be attributed to C≡N; peaks at 688.2 eV in the F 1s spectra and 292.5 eV in the C 1s spectra belong to CF$_3$; peaks at 169.0 and 170.2 eV in the S 2p spectra and 1022.7 eV in the Zn 1s spectra were attributed to Zn—SO$_2$—. AS shown in FIG. 19 an average efficiency of 99.1% was found after 310 cycles for Zn deposition in a BSF-rGO aerogel at a deposition amount of 6.0 mAh cm$^{-2}$ and a current density of 6.0 mA cm$^{-2}$. This is in marked contrast to the short-cycle-life Zn deposition in the bare rGO aerogel with fluctuating efficiencies. The Zn nucleation behavior on the surface of BSF-rGO aerogel was studied by measuring the Zn deposition overpotentials at different current densities, and temperatures and results are shown in FIG. 21. At a current density of 3.0 mA cm$^{-2}$ and room temperature (25° C.), BSF-rGO aerogel and bare rGO aerogel electrodes present overpotentials of 10 and 43 mV, respectively. When using a current density of 6.0 mA cm$^{-2}$, the overpotentials were 21 and 69 mV, respectively. At a current density of 6.0 mA cm$^{-2}$ and low temperature (–15° C.), the overpotentials of BSF-rGO aerogel and bare rGO aerogel electrodes were 35 and 101 mV, respectively. 1 M Zn(CF$_3$SO$_3$)$_2$ in acetonitrile electrolyte was used. The significantly reduced overpotential for Zn deposition is attributed to the strong affinity of BSF-rGO aerogel towards Zn.

Example 2

Figures 22A, 22B, 23:
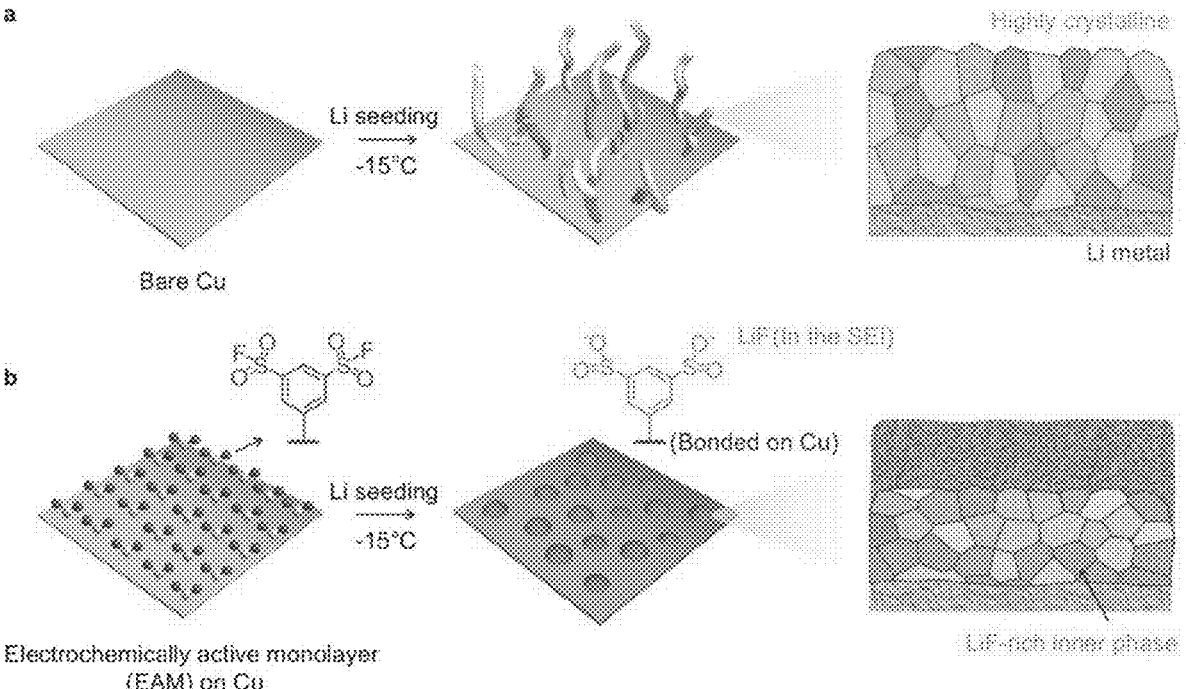
FIGS. 22A-22B illustrate a stable low-temperature SEI regulated by an electrochemically active monolayer (EAM) on Cu.
FIG. 23 shows a synthetic scheme of a self-assembled monolayer of 5-((2-mercaptoethyl)carba-moyl)benzene-1,3-disulfonyl difluoride (compound 1) on Cu substrate surface. The Cu foil, foam, and grid were used as the substrates.

In this example, an interface manipulation approach to stabilize Li metal anodes at low temperatures, in which the SEI structure and Li nucleation are regulated by a self-assembled monolayer of 1,3-benzenedisulfonyl fluoride on the surface of copper (Cu) current collectors is reported. It was found that the electrochemically active monolayer (EAM) can alter the interfacial chemical environment by in situ forming LiF nuclei on the Li metal surface. The pathway and dynamics of electrolyte decomposition at the interface are consequently changed, leading to the formation of a structurally and compositionally different SEI with enhanced passivation. It was further found that the EAM can form a lithiophilic anion, such as benzenesulfonate, on Cu, which can induce guided Li nucleation and growth in the presence of a low interfacial Li-ion concentration. It was demonstrated that at –15° C., a multilayer SEI can be formed. In such exemplary aspects, the SEI can contain a LiF-rich inner phase and an amorphous outer layer (FIG. 22B). FIG. 22A shows low-temperature Li deposition on a Cu substrate, associated with needle-shaped Li growth and unstable SEI. At –15° C., Li dendrites aggressively grow; and the SEI layer is highly crystalline and inhomogeneous. FIG. 22B shows evenly seeded Li with a stable SEI layer on the EAM Cu, which has a self-assembled monolayer of electrochemically active 1,3-benzenedisulfonyl fluoride (purple) on the surface. After Li deposition, EAM-derived LiF salts act as nuclei to induce the formation of a LiF-rich inner phase of SE, and EAM-derived benzenesulfonate groups (red) are bonded on the Cu surface. The SEI displays a multilayered structure with a LiF-rich inner phase and an amorphous outer layer.

It was found that such SEI is different from a conventional low-temperature SEI that displays a highly crystalline and Li$_2$CO$_3$-dominant structure. These features were confirmed by cryogenic transmission electron microscopy (cryo-TEM) with scanning transmission electron microscopy (STEM) and electron energy-loss spectroscopy (EELS), high-resolution and depth-profiling X-ray photoelectron spectroscopy (XPS), and molecular dynamics simulation. With the EAM-regulated SE, stable Li deposition was realized in a wide temperature range from –60° C. to 45° C. The galvanic Li corrosion of Li metal anodes and self-discharge of full cells were effectively suppressed. A Li|LiCoO$_2$ cell displayed a 200-cycle life under low-temperature (–15° C.), high-capacity (2.0 mAh cm$_{-2}$), and high-rate-charging (45 min of recharge time) conditions. The Li|LiCoO$_2$ cells also presented stable reversible capacities when the temperature was repeatedly switched between –15° C. and 25° C.

Chemicals

All reagents and solvents for material preparation were purchased from Sigma-Aldrich and used without further purification.

Battery Materials

LiCoO$_2$ powders and Li metal chips were purchased from MTI. Battery-grade electrolytes, including lithium hexafluorophosphate (LiPF6), propylene carbonate (PC), ethylene carbonate (EC), ethyl methyl carbonate (EMC), fluoroethylene carbonate (FEC), lithium bis(oxalate)borate (LiBOB), were purchased from BASF. Lithium tetrafluoroborate (LiBF4), Tris(2,3,5,6-tetrafluorophenyl)borane (TTFB), lithium nitrate (LiNO3), and deuterated PC were supplied by Sigma-Aldrich. Ethyl 2,2,2-trifluoroethyl carbonate (ET-FEC) was synthesized following the literature. Raw bare Cu hosts with micron-sized (45 μm) pores were supplied by Xiamen Tmax Battery Equipments Limited. The electrolyte was further dried using 4 Å molecular sieves before use.

Synthesis of the EAM Cu

The EAM Cu host, foil, and grid were prepared by forming a self-assembled monolayer of 5-((2-mercaptoethyl)carbamoyl)benzene-1,3-disulfonyl difluoride on the Cu surface. To prepare the 5-((2-mercaptoethyl)carbamoyl) benzene-1,3-disulfonyl difluoride molecule, a dichloromethane solution (50 ml) of 3,5-bis(fluorosulfonyl)benzoic acid (343 mg, 1.2 mmol), sulfuryl chloride (243 mg, 1.8 mmol), and triethylamine (12 mg, 0.12 mmol) was refluxed for 30 min, following the dropwise addition of cysteamine (77 mg, 1.0 mmol). The solution was further refluxed for 1 h, and the solvents were then removed by rotary evaporation. The mixture was immediately dissolved in 100 ml anhydrous ethanol. The Cu substrates with a clean surface were immersed in the ethanol solution of thiols for 6 h under nitrogen. After that, the achieved Cu substrates were rinsed with anhydrous ethanol 3 times and dried under vacuum for use. To clean the Cu surface, Cu substrates were washed with acetone under sonication for 30 min, then rapidly rinsed in a nitric acid solution (6.5%) for 10 s and immersed in a chloric acid (3.7%) for 10 min, washed with deionized water 6 times, and finally dried under nitrogen.

Preparation of Electrodes and Electrolytes

The Li@host electrodes were prepared by electrochemically depositing 10 mAh cm$^{-2}$ of Li on the as-prepared EAM Cu host at a current density of 2.0 mA cm$^{-2}$ and at −15° C. To fabricate the LiCoO$_2$ cathode electrodes, LiCoO$_2$ powders, polyvinylidene fluoride, and conductive carbon (80: 14:6) were mixed in anhydrous dimethylformamide. The slurry was cast on an aluminum foil and dried at 100° C. under vacuum for 24 h. A 1 M LiPF$_6$ in PC/FEC (8:1, v/v) electrolyte was used for Li deposition morphology and SEI characterizations, NMR experiments, and galvanic Li corrosion tests. A 1 M LiPF$_6$ in PC/FEC/ethyl 2,2,2-trifluoroethyl carbonate (ETFEC)$_{12}$ (8:1:1, v/v/v) with 10 wt. % tris(pentafluorophenyl)borane (TPFPB), 5 wt. % lithium tetrafluoroborate (LiBF4), and 0.5 wt. % lithium nitrate (LiNO$_3$) electrolyte was used to cycle the Li|LiCoO$_2$ cells and the Li|Cu cells for Li deposition efficiency and impedance measurements. The electrolyte amount was ~15 µl mAh$^{-1}$. Celgard 3501 membranes were used as separators.

Electrochemical Test

The batteries (CR2016 coin cells) were tested under galvanostatic charge-discharge conditions. To measure the Li deposition efficiency in the Li|Cu host cells, a 6.0 mAh cm$^{-2}$ of Li on the host at a current density of 6.0 mA cm$^{-2}$ was disposed, and then Li was stripped at a current density of 1.0 mA cm$^{-2}$. The efficiency was measured by the amount of the stripped Li. The Li|LiCoO$_2$ cells were prepared by pairing pre-delithiated LiCoO$_2$ cathodes with Li@host anodes. As-prepared LiCoO$_2$ electrodes were charged to 4.2 V at a current density of 0.5 mA cm$^{-2}$ and at −15° C., and 10 mAh cm$^{-2}$ of Li was deposited onto the Cu host at a current density of 1.0 mA cm$^{-2}$ and at −15° C. The gas generation at the cathode can be excluded in this way. The galvanic Li corrosion current was measured in the Li|Cu foil cell. The Cu electrode (1.13 cm$^{-2}$) was held at 0 V and monitored the generated current. Electrochemical impedance spectroscopy tests for Li|Cu cells were conducted between 0.1 and 100000 Hz on a Nuvant EZStat Pro instrument. All the cells were held at the designed operation temperature (−15° C. and 25° C.) immediately once assembled.

Cryo-TEM Experiment

To prepare SEI samples, Li seeds were deposited on the EAM Cu grid and the bare Cu grid, respectively, at −15° C. The grids placed on stainless steel spacers were used as working electrodes in Li|Cu grid cells. A constant current of 6.0 mA cm$^{-2}$ (based on the area of the stainless steel) was applied for 160 s. The grids were collected afterward in an argon-filled glovebox, gently rinsed with PC solvent 2 times, and dried under vacuum. The grid samples were then loaded on a cryo-TEM holder and inserted into the microscope. TEM images were captured on a dual spherical aberration-corrected FEI Titan G2 60-300 STEM at an accelerating voltage of 200 kV.

Characterization

XPS samples were analyzed on a PHI VersaProbe II Scanning XPS Microprobe. A vacuum transfer vessel was used to transfer the samples from the glovebox into the instrument. SEM images were captured on a Nova Nano- SEM 630 instrument. The XPS and SEM samples were washed with PC solvent 2 times and dried under vacuum. NMR experiments were conducted on a Bruker AV-3-HD-500 instrument. The amounts of LiPF$_6$, deuterated PC, and FEC were monitored independently using $^{19}$F, $^2$H, and $^1$H NMR. The electrolyte solvents were collected from the cells using chloroform (6 times, 4.2 ml in total). The solutions were transferred into NMR tubes in the glovebox. The electrolyte samples before cycling were also prepared using this procedure to reduce errors. Instrument parameters for all NMR tests were exactly the same in order to quantify the electrolyte amount with the absolute integrals of NMR peaks. The average integral of three parallel samples was used to calculate the electrolyte retention.

Modeling of SEI Chemistry

The AIMD calculations were performed in the density functional theory (DFT) framework using the generalized gradient approximation. The projector-augmented wave (PAW) formalism was used as implemented in the Vienna Ab initio Simulation Package (VASP). An interface between the electrolyte and Li (100) surface was stimulated using a computational supercell (14×14×30 Å) that is composed of 440 atoms with periodic boundary conditions along all directions. To represent the Li on the bare Cu (FIG. 50A), an interface between the PC:FEC electrolyte (composed of 283 atoms) and 10 layers of Li (100) (composed of 160 atoms) was built. To represent the Li on the EAM Cu (FIG. 50A), the PC:FEC electrolyte (composed of 380 atoms), 5 layers of Li (100), and a LiF nanoparticle composed of 38 atoms sitting were presented at the interface between the electrolyte and Li surface. Cu substrates are not considered as a part of the simulations, given that they are out of the scale accessible with modern computational resources. Besides, AIMD simulations were also used to study the decomposition rate of each electrolyte component. PAW pseudopotentials supplied by VASP were employed, and the exchange correlation is described by the Perdew-Burke-Ernzerhof functional. The plane-wave energy cutoff was set at 600 eV, and the Brillouin zone was sampled at the gamma point. The initial electrolyte configurations were prepared by setting the PC, FEC, and LiPF$_6$ molecules at random positions and orientations; the concentrations of each compound are determined by experimental volume ratios. Each system was equilibrated at −15° C. and 25° C. in the canonical ensemble (NVT) for at least 20 ps with a time step of 1 fs. The condition of constant-temperature was imposed by using a Nose-Hoover thermostat.

Li Nucleation and Growth on the EAM Cu

A self-assembled monolayer of 1,3-benzenedisulfonyl fluoride was bond on Cu substrates via a thiol-Cu reaction. The synthesis was depicted in FIG. 23.

The high resolution XPS of the EAM Cu, as-cleaned Cu (and raw Cu was measured. The high-resolution XPS of electrochemically inactive self-assembled monolayers, including C$_6$H$_5$—CF$_3$ on Cu, C$_6$H$_5$—SO$_3$Li on Cu, and CH$_3$(CH$_2$)$_{12}$CH$_2$— on Cu, was also measured. The spectra are not shown, but the following peaks were found on the surface of the raw Cu sample: Cu—O peaks (934.5 eV in the Cu 2p spectrum) and the corresponding satellite peaks (~942 eV in the Cu 2p spectrum). These peaks disappeared after the cleaning treatment. On the surface of the EAM Cu sample, the following peaks were observed: —C$_6$H$_3$— (SO$_2$F)$_2$ (peaks at 169.9 and 170.8 eV in the S 2p spectrum and 689.0 eV in the F 1s spectrum), —NH—CO— (the peak at 399.7 eV in the N 1s spectrum), and Cu—S—C (peaks at 935.0 eV in the Cu 2p spectrum and 162.2 and 163.4 eV in the S 2p spectrum). The —C$_6$H$_3$—(SO$_2$F)$_2$, —NH—CO, and Cu—S—C were found to be in an atomic ratio of 1:1:1. The XPS measurements of $C_6H_5$—$CF_3$ on Cu have shown —S—C (peaks at 935.0 eV in the Cu 2p spectrum and 162.2 and 163.4 eV in the S 2p spectrum), C—F (the peak at 687.0 eV in the F 1s spectrum). The XPS measurements of $C_6H_5$—$SO_3Li$ on Cu have shown Cu—S—C (peaks at 935.0 eV in the Cu 2p spectrum and 162.2 and 163.4 eV in the S 2p spectrum), —$C_6H_4$—$SO_2Li$ (peaks at 170.2 and 171.4 eV in the S 2p spectrum and 55.6 eV in the Li 1s spectrum) and —NH—CO— (the peak at 399.8 eV in the N 1s spectrum). The XPS measurements of $CH_3(CH_2)_{12}CH_2$— on Cu have shown Cu—S—C (peaks at 935.0 eV in the Cu 2p spectrum and 162.4 and 163.6 eV in the S 2p spectrum).

Figures 24A, 24B, 24C:
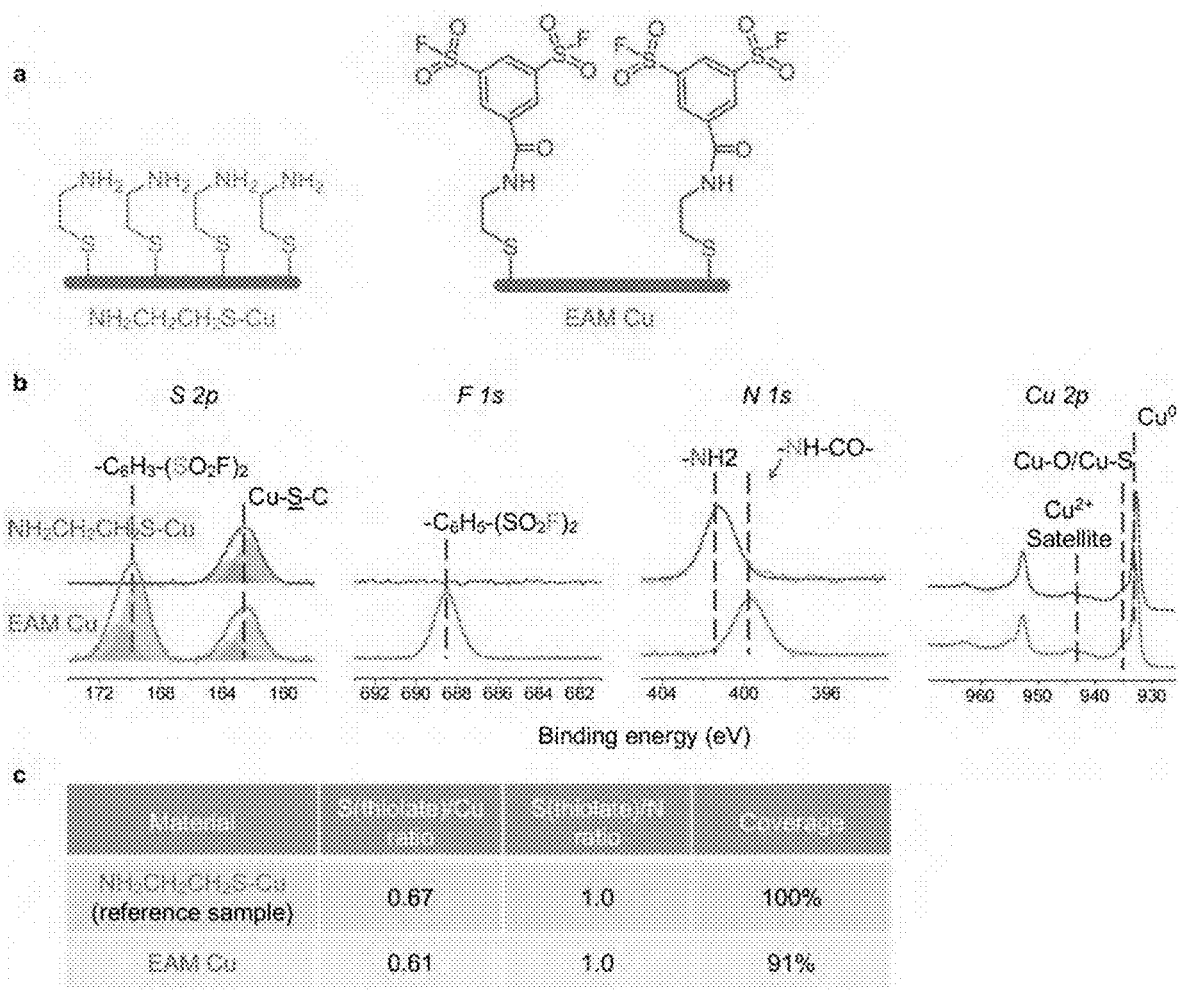
FIGS. 24A-24C show surface coverage of the self-as-sembled monolayer on the EAM Cu by XPS measurement.

High surface coverage of ~91% on Cu was realized (FIGS. 24A-24C), and the Cu surface remains electronically conductive. More specifically, FIGS. 24A-24C show a surface coverage of the self-assembled monolayer on the EAM Cu by XPS measurement. FIG. 24A shows the EAM Cu structure and a reference sample, self-assembled monolayer of cysteamine on Cu ($NH_2CH_2CH_2S$—Cu). FIG. 24B shows high-resolution XPS spectra of the $NH_2CH_2CH_2S$—Cu sample. FIG. 24C shows surface coverage of the self-assembled monolayer on Cu calculated by the S(thiolate)/Cu ratio. To determine the coverage of 5-((2-mercaptoethyl)carbamoyl)benzene-1,3-disulfonyl difluoride on the Cu surface, the S/Cu ratio to a reference sample was compared, a self-assembled monolayer of cysteamine on Cu ($NH_2CH_2CH_2S$—Cu) (FIG. 24A). The XPS spectra of the $NH_2CH_2CH_2S$—Cu were shown in FIG. 24B. Cu—S—C peaks were found at 162.2 and 163.4 eV in the S 2p spectrum and 935.0 eV in the Cu 2p spectrum. The NH2- peak was seen at 401.2 eV in the N 1s spectrum. The S (thiolate) ratio to $Cu_0$ is 0.67, which was normalized as 100% coverage. The S(thiolate)/Cu ratio for the EAM Cu sample is 0.61, indicating a 91% surface coverage.

Figure 25:
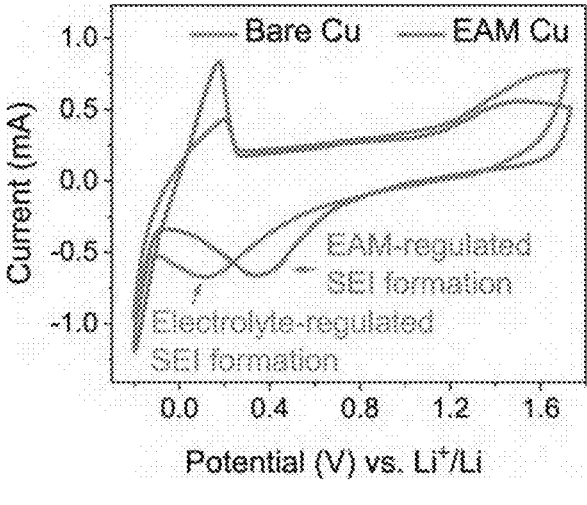
FIG. 25 shows cyclic voltammetry of the EAM Cu and bare Cu electrodes, respectively, in a 1 M $LiPF_6$ in PC electrolyte.

The in-situ generation of benzenesulfonate and LiF was confirmed by cyclic voltammetry, XPS, and $^{19}F$ nuclear magnetic resonance (NMR) (FIG. 25). As shown in FIG. 25 cyclic voltammetry of the EAM Cu and bare Cu electrodes, respectively, in a 1 M $LiPF_6$ in PC electrolyte, was conducted. The scan rate is 10 mV s$^{-1}$ in a range of 1.7 to −0.2 V vs. Li$^+$/Li. When bare Cu was used as the working electrode, a major SEI formation peak was observed from 0.5 to −0.1 V vs. Li$^+$/Li. When the EAM Cu was applied, SEI formation shifted by ~0.25 V in the positive direction, indicating the formation of a chemically different SEI layer and the altered pathway and dynamics related to SEI formation. The changes were attributed to the decomposition of EAM and its effect on the subsequent electrolyte decomposition. Simultaneously XPS and $^{19}F$ NMR measurements were conducted to evaluate the formation of LiF and —$C_6H_3$—$(SO_2Li)_2$ on the EAM Cu surface by the electrochemical decomposition of —$C_6H_3$—$(SO_2F)_2$ groups. It was found that F is exclusively derived from —$C_6H_3$—$(SO_2F)_2$ groups. The EAM Cu electrode was electrochemically scanned from 1.5 to 0.05 V two cycles at 1 mV s$^{-1}$. A 0.5 M (LiBOB) in EC/EMC electrolyte was used, in which F-based species are only derived from —$C_6H_3$—$(SO_2F)_2$ groups. XPS was then performed on the surface of the EAM Cu sample after the scanning. The peak obtained at 684.6 in the F 1s spectrum was assigned to LiF, and peaks obtained at 168.5 and 169.7 eV in the S 2p spectrum were assigned to correspond to —$C_6H_3$—$(SO_2Li)_2$. It was found that the —$C_6H_3$—$(SO_2F)_2$ (the peak at 169.6 and 170.8 eV in the S 2p spectrum) disappeared, indicating a complete conversion to —$C_6H_3$—$(SO_2Li)_2$ groups. These peaks were absent in the spectrum taken on the bare Cu sample. The decomposition products were dissolved in deuterated dimethylsulfoxide (d6-DMSO) and conducted the $^{19}F$ NMR test. LiF peak was found at −123.2 ppm. No LiF signals were found in the spectrum of the control sample. These results confirmed the formation of LiF and —$C_6H_3$—$(SO_2Li)_2$ on the EAM Cu surface during Li deposition.

The Li deposition morphology on the EAM Cu was probed using scanning electron microscopy (SEM). At a current density of 6.0 mA cm$^{-2}$ and −15° C., the Li seeds formed on a bare Cu foil have a needle-shaped morphology (FIG. 26A), which are smaller than those formed at 25° C. (FIGS. 26A-26F).

Figures 26A, 26B, 26C, 26D, 26E, 26F:
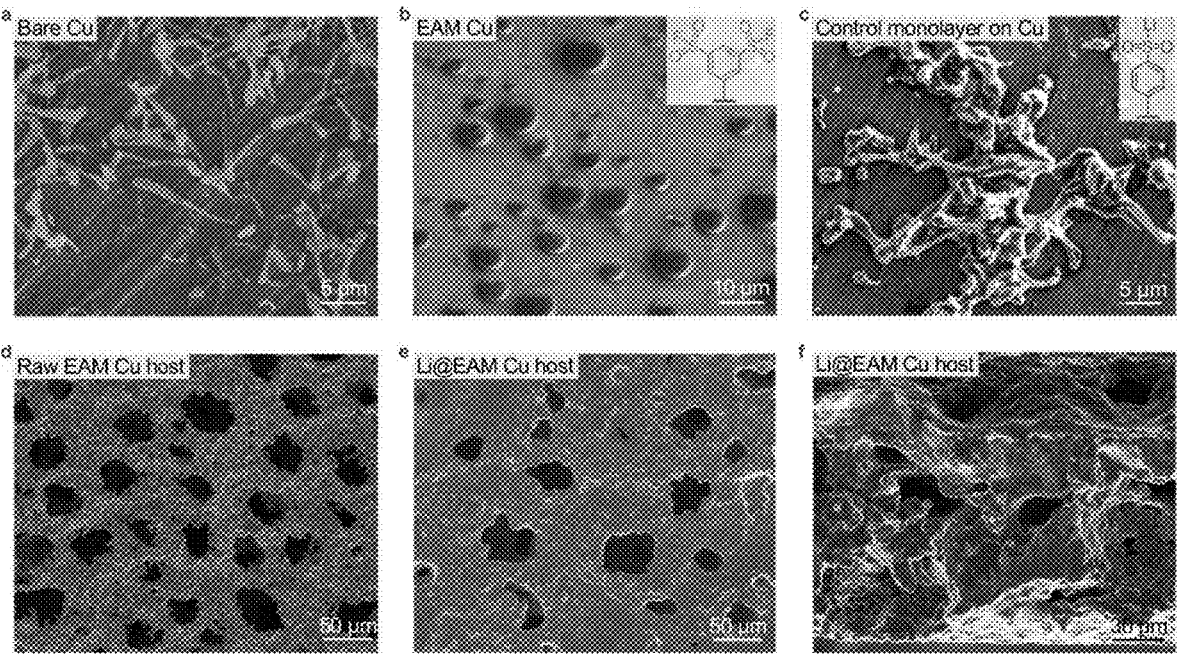
FIGS. 26A-26F show Li nucleation and growth regulated by the EAM Cu.

FIGS. 26A-26C show SEM images of Li nuclei deposited on the bare Cu (FIG. 26A), EAM Cu (FIG. 26B), and control Cu modified by an electrochemically inactive monolayer (FIG. 26C). FIGS. 26D-26F show SEM images of three-dimensional EAM Cu hosts before (FIG. 26D) and after (FIGS. 26E and F) Li deposition after 30 cycles. The deposition amount is 6.0 mAh cm$^{-2}$. All the samples were cycled at a current density of 6.0 mA cm$^{-2}$ and at −15° C.

Figure 27:
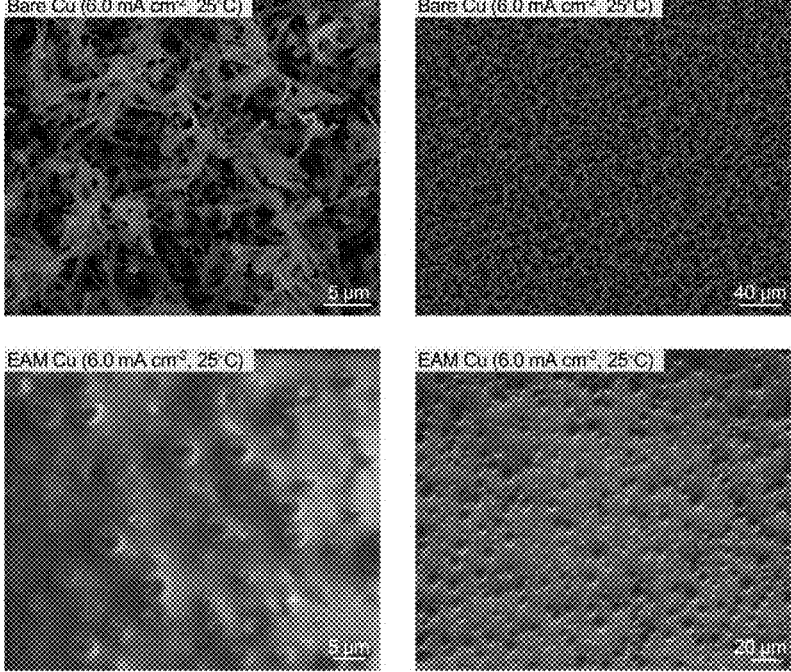
FIG. 27 shows SEM images of Li deposition on the Cu foil at a high current density of 6.0 mA $cm^{-2}$ and at 25° C.

FIG. 27 shows SEM images of Li deposition on the Cu foil at a high current density of 6.0 mA cm$^{-2}$ and at 25° C. Needle-shaped Li was found on the surface of bare Cu foil (Bare Cu). Island-shaped Li was seen on the surface of the EAM Cu foil (EAM Cu). The Li deposition amounts are 0.13 mAh cm$^{-2}$. It was noted that the deposited Li does not cover the entire surface.

Without wishing to be bound by any theory, this finding was assumed to indicate that the growth of Li dendrite is exaggerated at low temperatures. Contrastingly, guided by EAM, Li seeds are uniform and show an island-shaped morphology (FIG. 26B).

Figure 28:
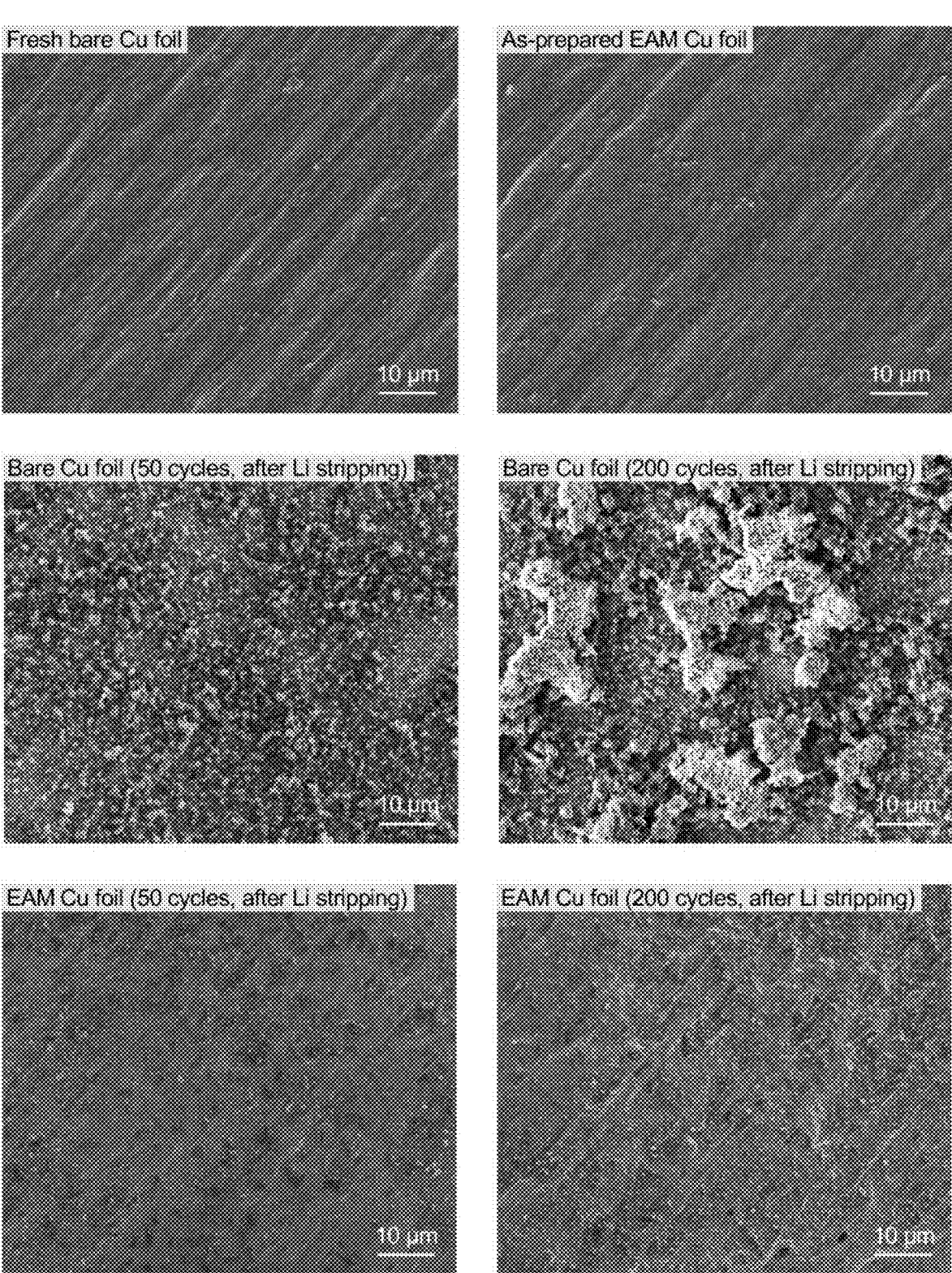
FIG. 28 shows SEM images of the EAM Cu and bare Cu foil after Li stripping. At –15° C., Li deposition and strip-ping were operated at a current density of 6.0 and 0.5 mA $cm^{-2}$, respectively.

After Li stripping, no clear SEI residues and dead Li were seen on EAM Cu, indicating excellent SEI stability and highly reversible Li plating and stripping (FIG. 28). In contrast, a large amount of waste SEI and dead Li on the bare Cu surface, probably because of excessive SEI reformation and Li dendrite growth. Uniform Li seeding was also realized at different currents and temperatures, including 6.0 mA cm$^{-2}$ and 25° C. (FIG. 27), 1.0 mA cm$^{-2}$, and −15° C. (FIG. 29) and 2.0 mA cm$^{-2}$ and 25° C. (FIG. 30).

Figure 29:
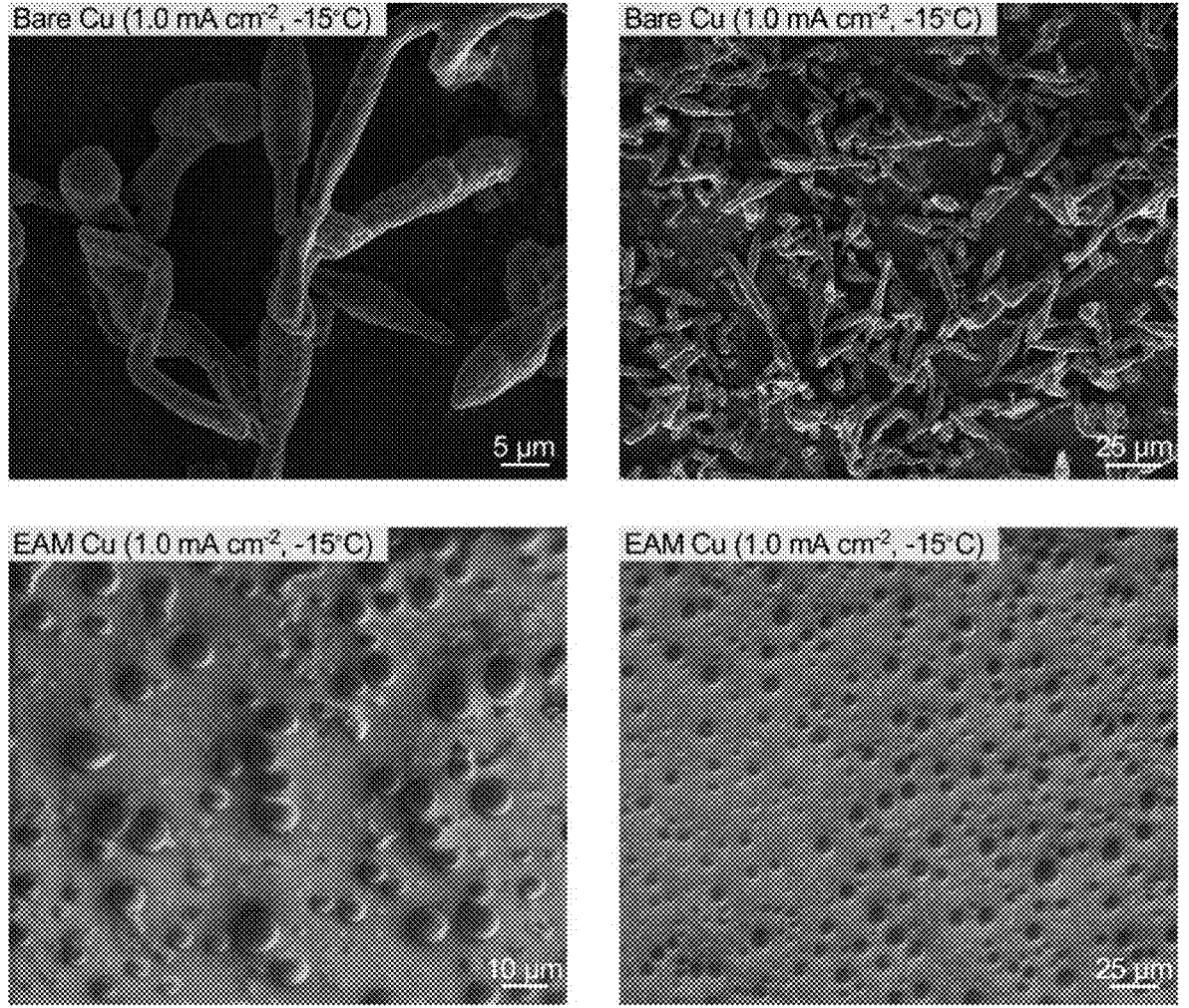
FIG. 29 shows SEM images of Li deposition on Cu foil at a low current density of 1.0 mA $cm^{-2}$ and at –15° C.
Figure 30:
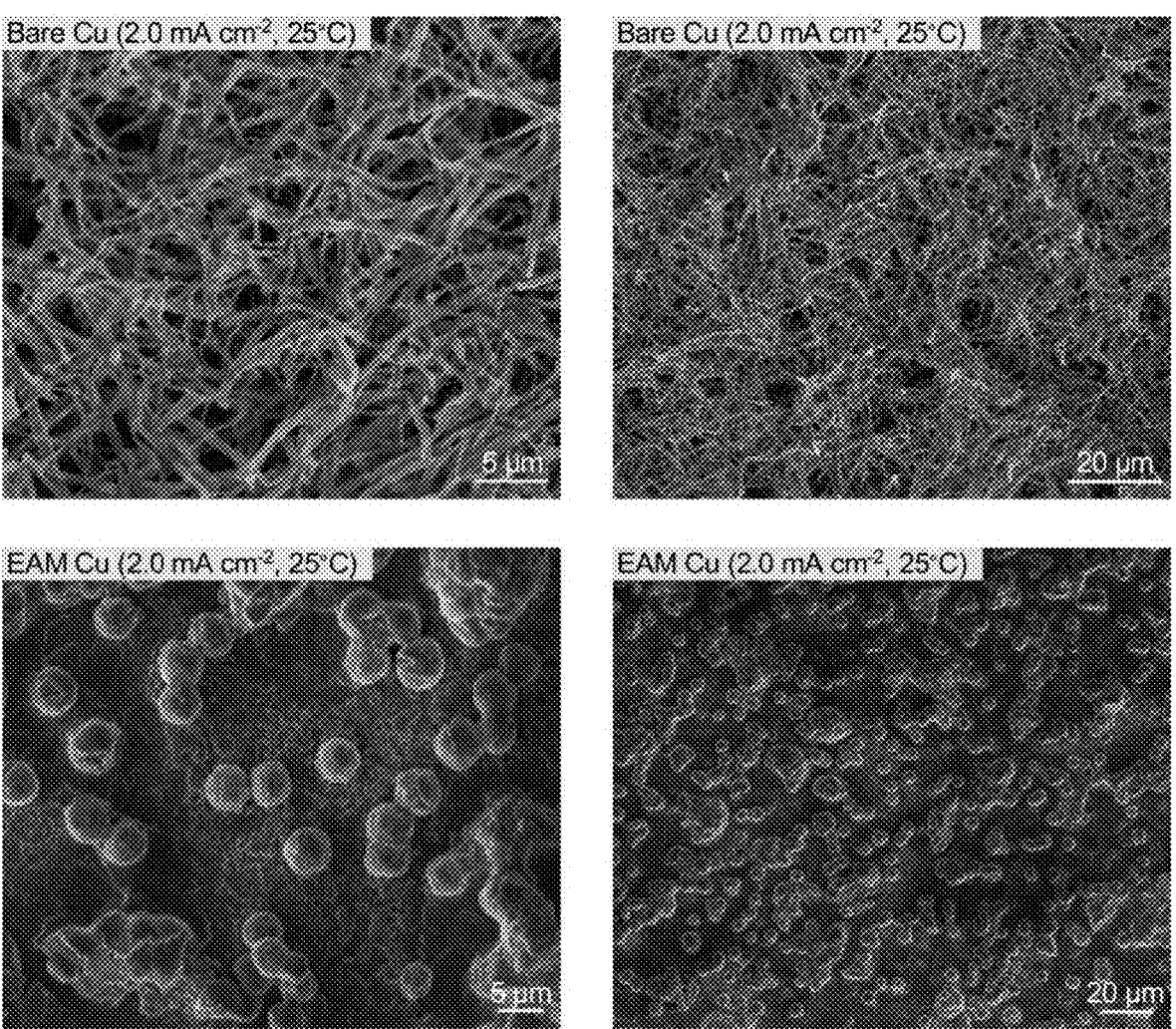
FIG. 30 shows SEM images of Li deposition on Cu foil at a low current density of 2.0 mA cm$^{-2}$ and at 25° C.

FIG. 29 shows SEM images of Li deposition on Cu foil at a low current density of 1.0 mA cm$^{-2}$ and at −15° C. Needle-shaped Li was found on the surface of bare Cu foil (Bare Cu). Island-shaped Li was seen on the surface of the EAM Cu foil (EAM Cu). The Li deposition amounts are 0.13 mAh cm$^{-2}$. It was further noted that the deposited Li does not cover the entire surface. FIG. 30 shows SEM images of Li deposition on Cu foil at a low current density of 2.0 mA cm$^{-2}$ and at 25° C. Dendritic Li was found on the surface of bare Cu foil (Bare Cu). Round-shaped Li was seen on the surface of the EAM Cu foil (EAM Cu). The Li deposition amounts are 0.13 mAh cm$^{-2}$. Noted that the deposited Li does not cover the entire surface.

The Li deposition regulated by a self-assembled monolayer of lithium benzenesulfonate ($C_6H_5$—$SO_3Li$) was also investigated, which is lithiophilic but electrochemically inactive. This layer cannot induce a uniform Li deposition (FIG. 26C), indicating that the EAM-formed LiF is important to guide Li nucleation and uniform Li growth on Cu. The use of other inactive monolayers also led to Li dendrite growth (FIGS. 31A-31G).

Figures 31A, 31B, 31C, 31D, 31E, 31F, 31G:
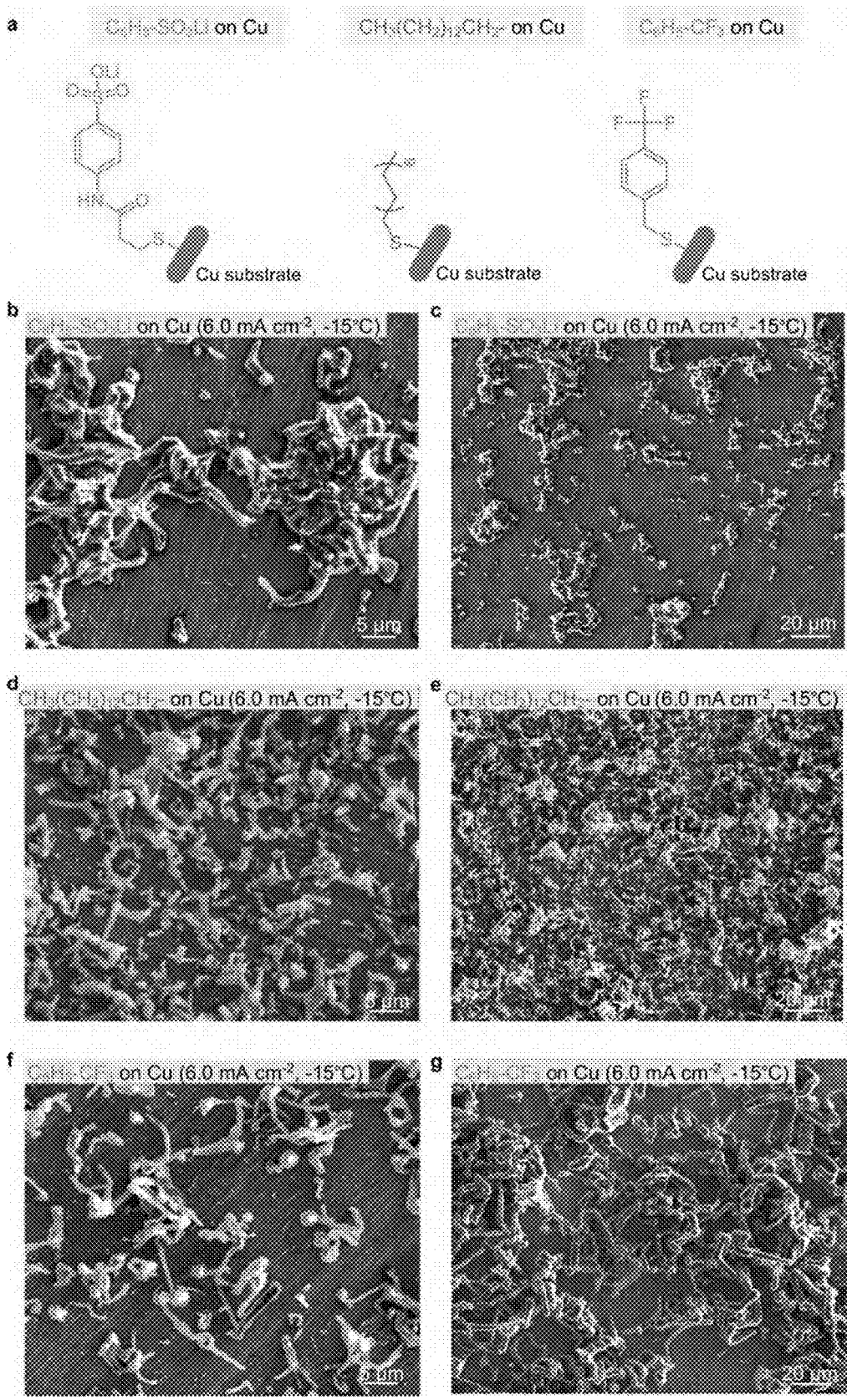
FIGS. 31A-31G show high-resolution SEM images of the Cu foil modified with different self-assembled monolayers of lithium benzenesulfonate ($C_6H_5$—$SO_3Li$, red), tetradecane ($CH_3(CH_2)_{12}CH_2$—, green), and trifluoromethyl benzene ($C_6H_5$—$CF_3$) molecules, respectively.

The Li nucleation morphology on EAM Cu compared with Cu substrates modified with the monolayers of three electrochemically inactive molecules, including lithium benzenesulfonate ($C_6H_5$—$SO_3Li$), tetradecane ($CH_3(CH_2)_{12}CH_2$—), and trifluoromethyl benzene ($C_6H_5$—$CF_3$) is shown in FIG. 31A. The $C_6H_5$—$SO_3Li$ molecule is lithiophilic. Aggregated Li nuclei were observed on the surface of $C_6H_5$—$SO_3Li$ modified Cu, displaying a dendrite-free morphology (FIGS. 31B-31C). The $CH_3(CH_2)_{12}CH_2$— molecule has no Li affinity and induces Li dendrite growth on the Cu surface (FIGS. 31D-31E). The $C_6H_5$—$CF_3$ molecule contains non-active C—F bonds, incapable of decomposing and forming LiF. Li dendrites were found on the Cu surface (FIGS. 31F-31G).

Figure 32:
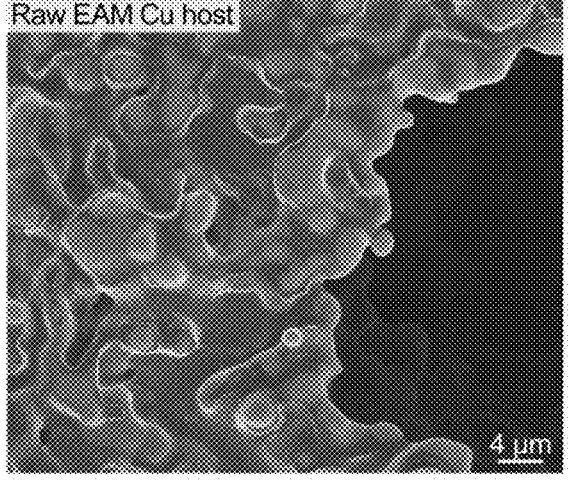
FIG. 32 shows high-resolution SEM images of the EAM Cu host before Li deposition (raw EAM Cu host) and the EAM Cu host with 6.0 mAh cm$^{-2}$ of Li (Li@EAM Cu host). The Li was uniformly deposited on the host surface. The sample was cycled for 30 cycles at a current density of 6.0 mA cm$^{-2}$ and at −15° C.
Figure 32:
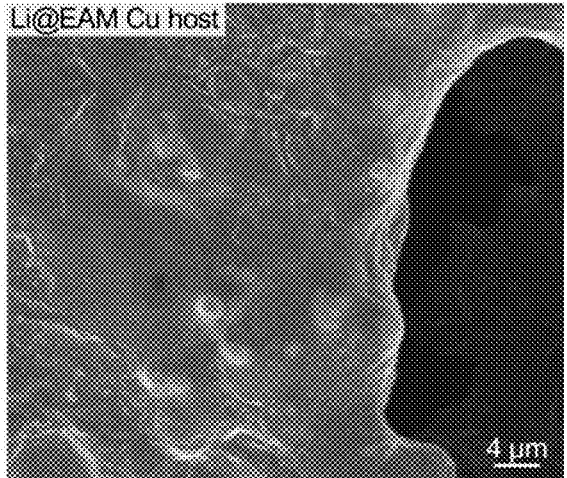
Figure 33:
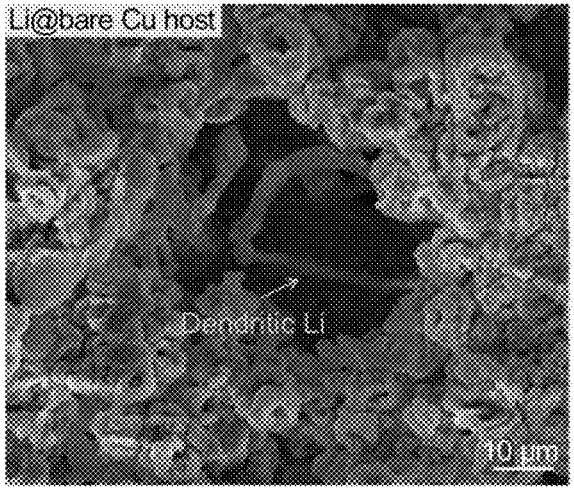
FIG. 33 shows SEM images of Li deposition (6.0 mAh cm$^{-2}$) in a bare Cu host. The sample was cycled for 30 cycles at a current density of 6.0 mA cm$_{-2}$ and at −15° C. Dendritic Li was observed.
Figure 33:
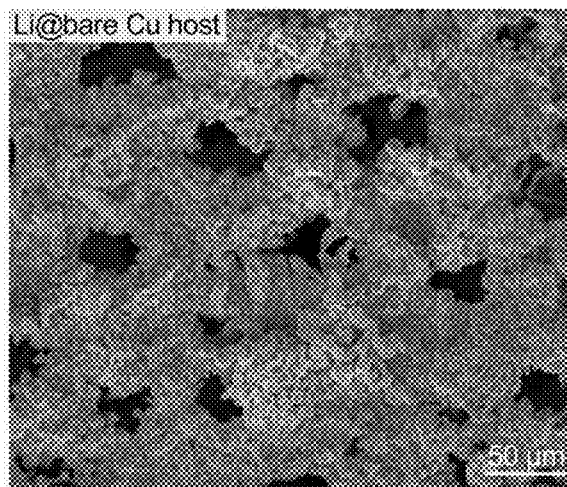
Figure 34:
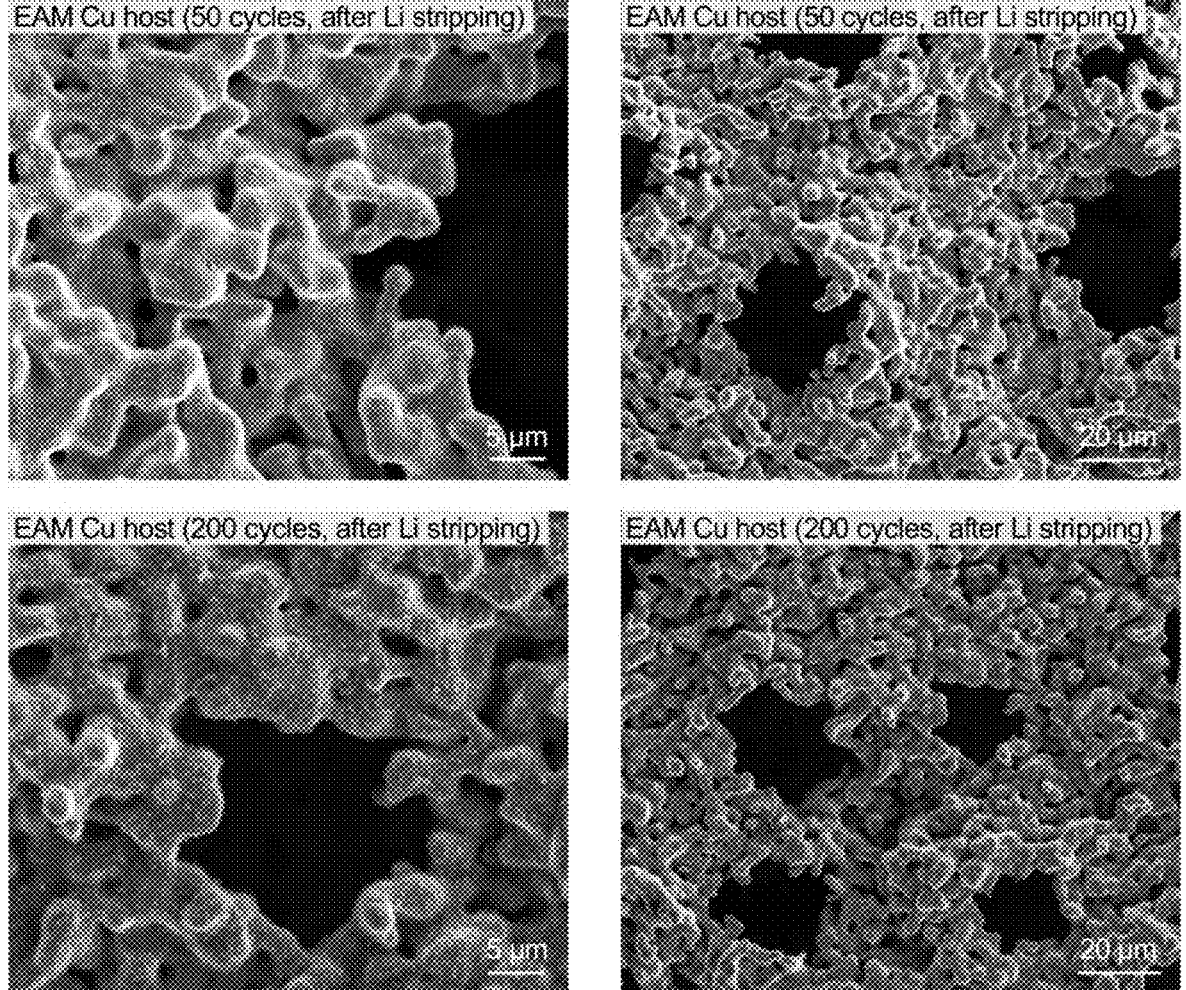
FIG. 34 shows SEM images of the EAM Cu host after Li stripping. At −15° C., Li deposition and stripping were operated at current densities of 6.0 and 1.0 mA cm$^{-2}$, respectively.
Figure 35:
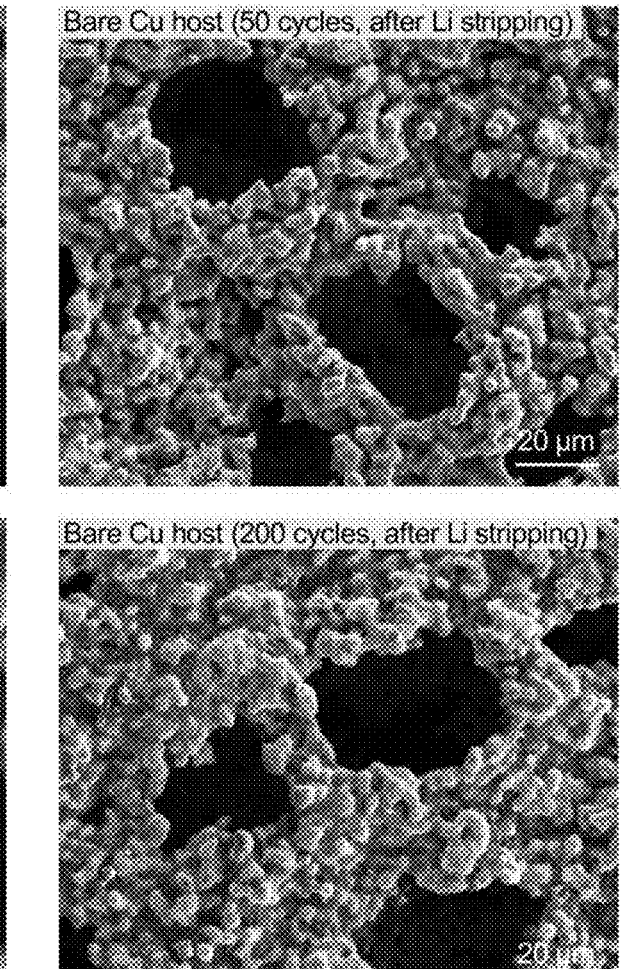
FIG. 35 shows SEM images of the bare Cu host after Li stripping. At −15° C., Li deposition and stripping were operated at current densities of 6.0 and 1.0 mA cm$^{-2}$, respectively.
Figures 36A, 36B, 36C, 36D:
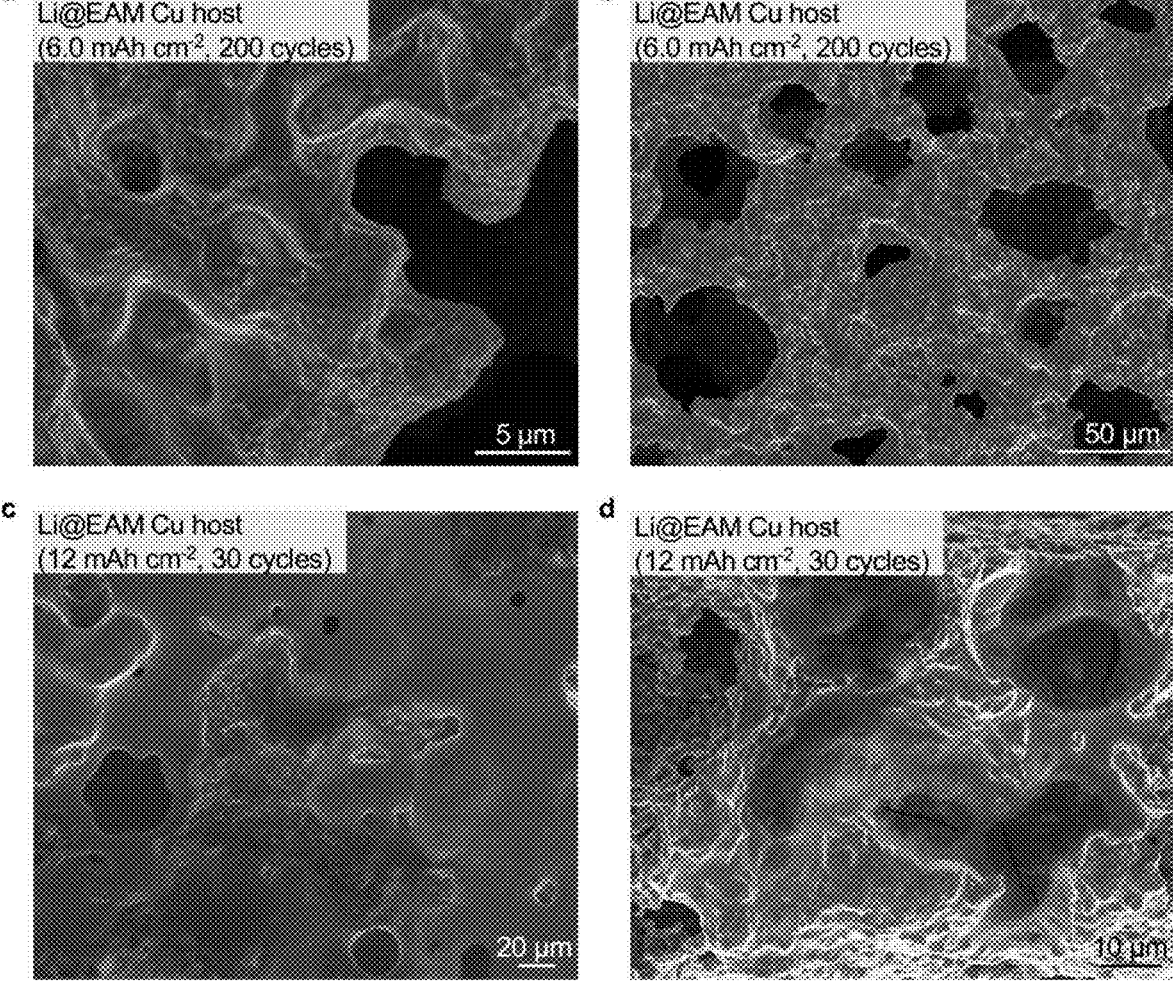
FIGS. 36A-36D show SEM images of Li@EAM Cu anodes.

Next, the EAM was bonded on a three-dimensional Cu host that possesses pores with a diameter of 45 μm (FIG. 26D). Li deposition was conducted at −15° C. with a current density of 6.0 mA cm$^{-2}$ and a capacity of 6.0 mAh cm$^{-2}$. After 30 cycles, uniformly deposited Li was observed on the EAM Cu host (FIGS. 26I and 26G and FIG. 32), while Li dendrites were found on bare Cu (FIG. 33). After Li stripping, very limited Li residues were observed on the EAM Cu host (FIG. 34), while dendritic Li residues were seen on the bare Cu host (FIG. 35). Uniform Li deposition was also realized for the Li@EAM Cu electrode after 200 cycles (FIGS. 36A-36B) and for the electrode with an elevated Li deposition amount of 12 mAh cm$^{-2}$ (FIGS. 36B-36C)

Nanostructure of the Low-Temperature SEI

To reveal the uniform Li deposition behavior, the next study was done to investigate the nanostructure of low-temperature SEI using cryo-TEM. At −15° C., the SEI formed on the bare Cu and the EAM Cu are completely different regarding the nanostructure and dominant components.

Figures 37A, 37B, 37C, 37D, 37E:
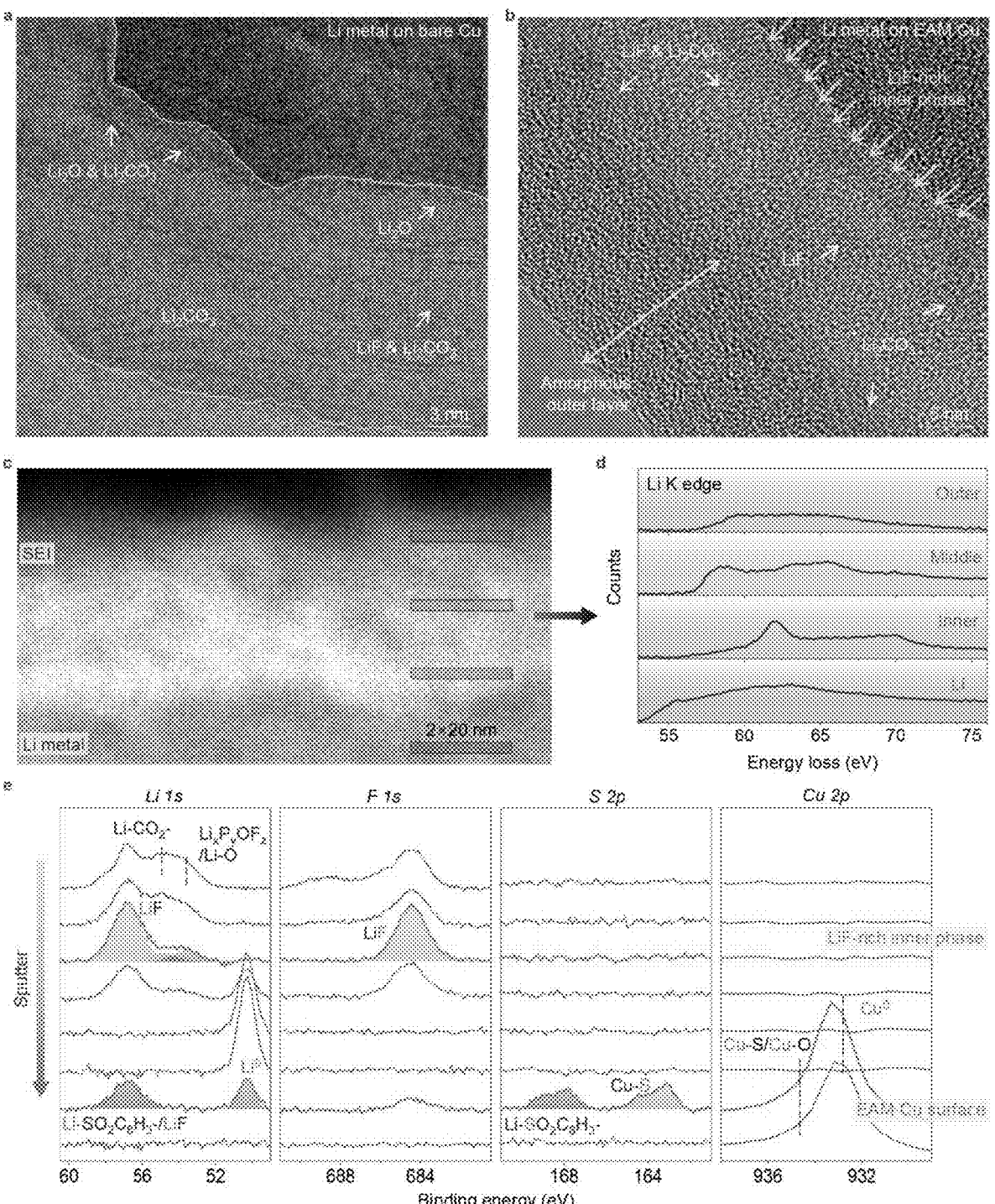
FIGS. 37A-37E show SEI nanostructure regulated by the EAM.

FIGS. 37A-37B show Cryo-TEM images of the SEI layers formed on a Li@bare Cu (FIG. 37A) and a Li@EAM Cu (FIG. 37B) after 10 cycles. Distinguished from the conventional SEI at −15° C. that is highly crystalline, the EAM-regulated SEI has a LiF-rich inner phase and an amorphous outer layer. FIGS. 37C-37D STEM image (FIG. 37C) of the interface of Li@EAM Cu and the corresponding Li K-edge spectra (FIG. 37D) of the boxed regions in FIG. 37C. FIG. 37E shows the XPS depth profiling of Li@EAM Cu after 10 cycles. A LiF-rich inner phase of SEI was identified. Curves from top to bottom represent the spectra acquired after sputtering for 0, 1, 2, 3, 6, 100, 101, and 105 min. The sputtering rate is ~10 nm min$^{-1}$ based on $SiO_2$.

FIG. 38A shows a low-magnification TEM image of needle-shaped Li seeds on a bare Cu grid. FIG. 38B shows a low-magnification TEM image of evenly seeded Li on the EAM Cu grid. The black regions are Cu grids. EAM on the TEM Cu grid was modified, and Li seeding was probed on it using cryo-TEM. The modification was performed following the same procedure described in Methods. A current of 6.0 mA cm$^{-2}$ was applied on the Cu grids for 160 s for Li nucleation on the Cu surface. The operation temperature is −15° C. Evenly seeded Li was found on the surface of the EAM Cu grid (FIG. 38B), in sharp contrast to the bare Cu grid in which needle-shaped Li seeds with a diameter of ~0.4 μm were seen (FIG. 38A).

Figures 40A, 40B, 40C, 40D, 40E, 40F, 40G, 40H:
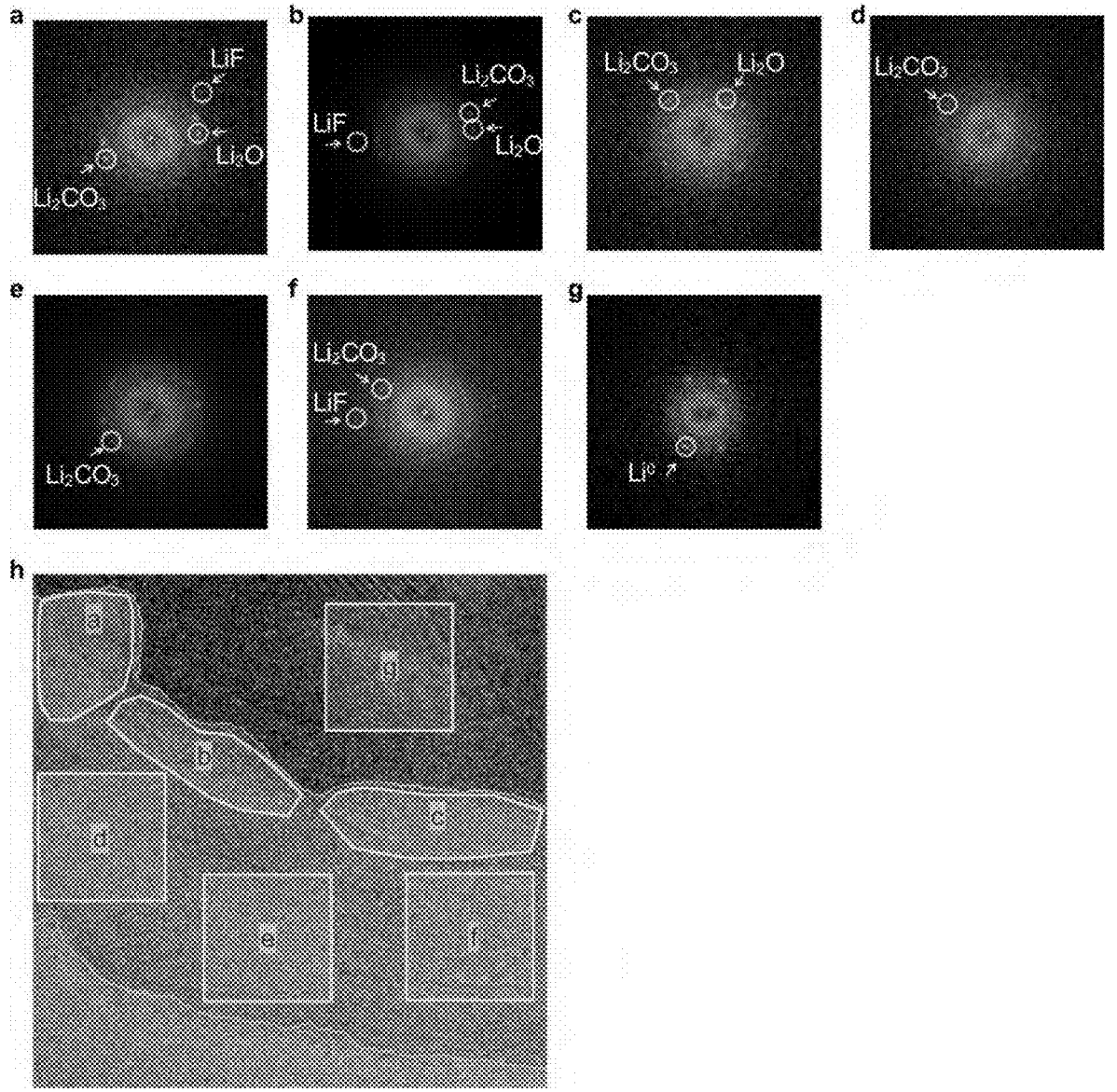
FIGS. 40A-40H show Fast Fourier transform images of the conventional low-temperature SEI formed on the bare Cu, corresponding to FIG. 37A.
Figures 41A, 41B, 41C, 41D, 41E, 41F, 41G, 41H, 41I, 41J, 41K:
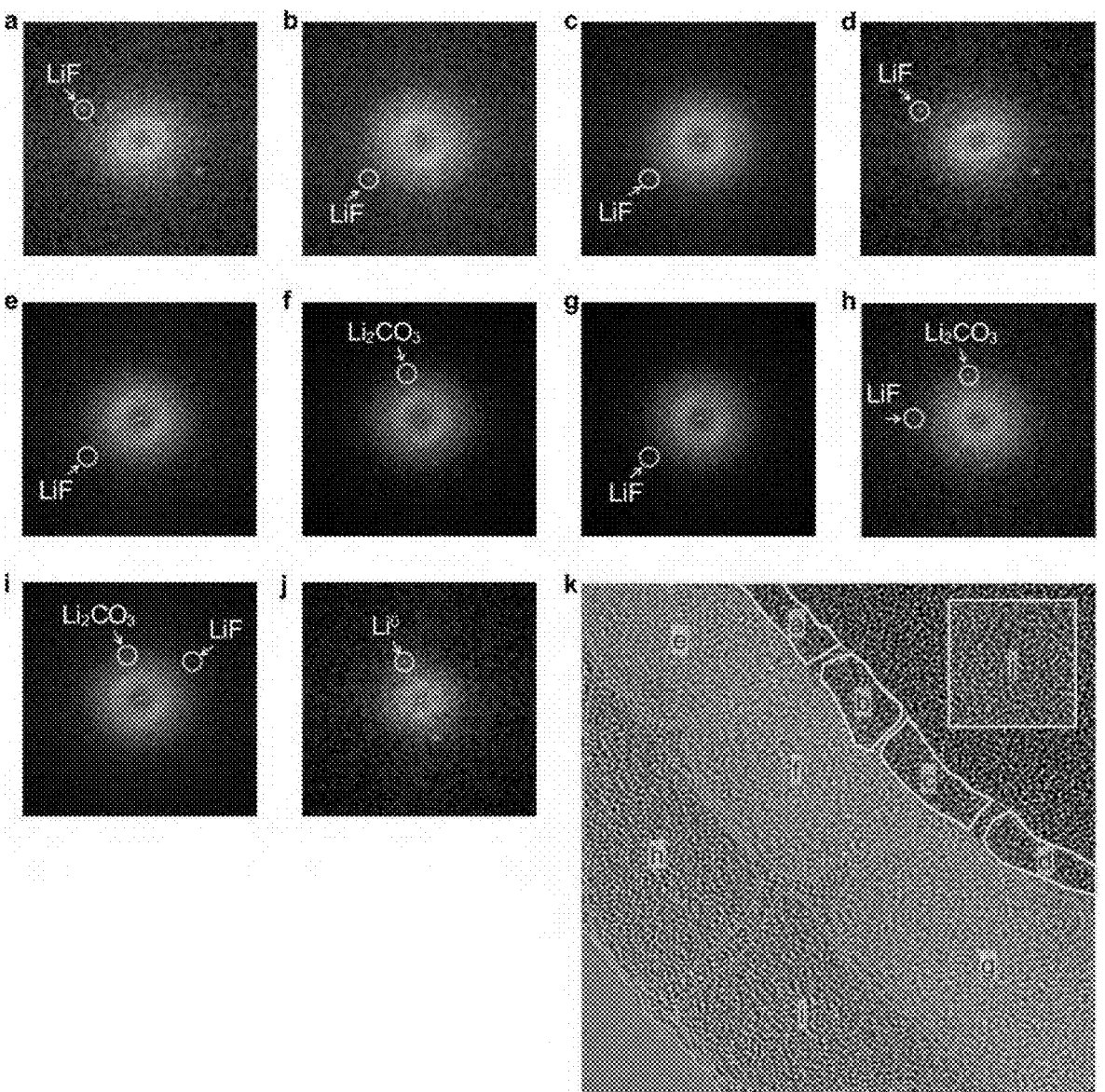
FIGS. 41A-41K show Fast Fourier transform images of the low-temperature SEI formed on the EAM Cu, corresponding to FIG. 37B.
Figure 42:
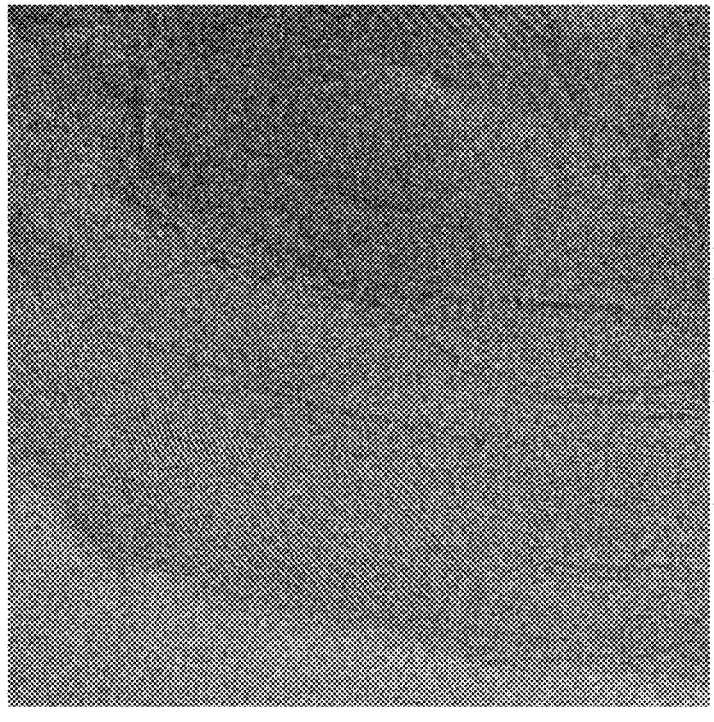
FIG. 42 shows the original TEM image of the SEI layer formed on the bare Cu grid, corresponding to FIG. 37A.
Figure 43:
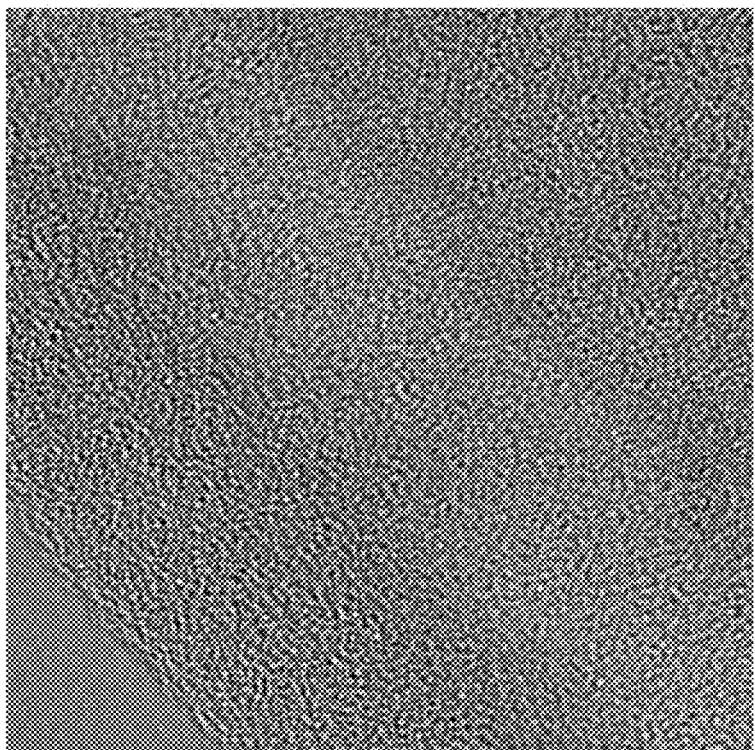
FIG. 43 shows the original TEM image of the SEI layer formed on the EAM Cu grid, corresponding to FIG. 37B.

The SEI layer formed on the bare Cu is highly crystalline (FIG. 37A and FIG. 37A), in which $Li_2CO_3$ (a lattice spacing of 0.28 nm) crystals were largely seen, and $Li_2O$ (a lattice spacing of 0.27 nm) and LiF (lattice spacings of 0.20 nm) crystals were found as well. The major salt component, $Li_2CO_3$, is generally considered as an unfavorable SEI component due to insufficient passivation. This highly crystalline SEI structure at −15° C. is completely different from that formed on bare Cu at 25° C. with more amorphous species (FIGS. 39A-39G). Surprisingly, when the EAM Cu was used, a multilayer SEI was observed, which has a LiF-rich inner phase, a highly amorphous outer layer, and an amorphous matrix embedded with $Li_2CO_3$ and LiF nanocrystals in between (FIG. 37B and FIG. 37B). The lattice spacings of the crystals were identified in the corresponding fast Fourier transform images (FIGS. 40-41). The TEM images without labels are shown in FIGS. 42-43.

Figures 44A, 44B:
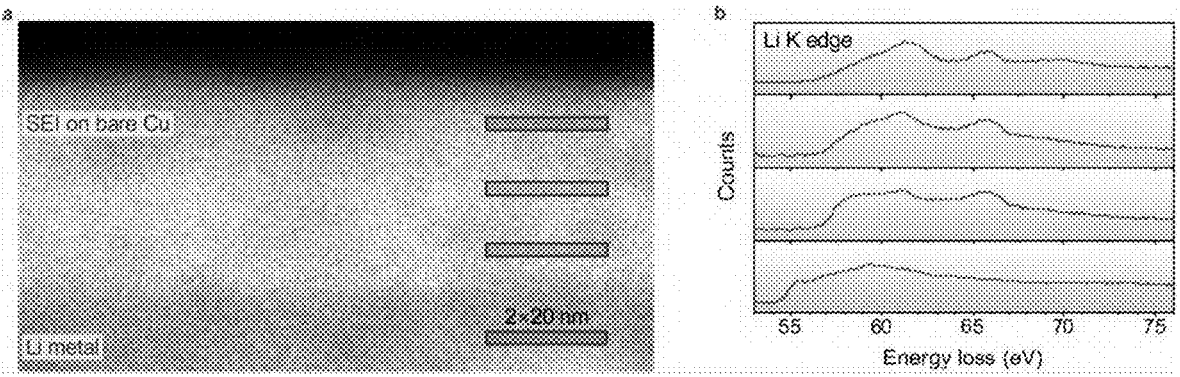
FIGS. 44A-44B show STEM image (FIG. 44A) of the interface of Li@bare Cu and the corresponding Li K-edge spectra (FIG. 44A) of the boxed regions in FIG. 44B. The SEI layer shows a uniform contrast, the shapes of SEI spectra represent a mixture of $Li_2CO_3$, $Li_2O$, and $LiF_7$.
Figures 45A, 45B, 45C, 45D, 45E, 45F, 45G:
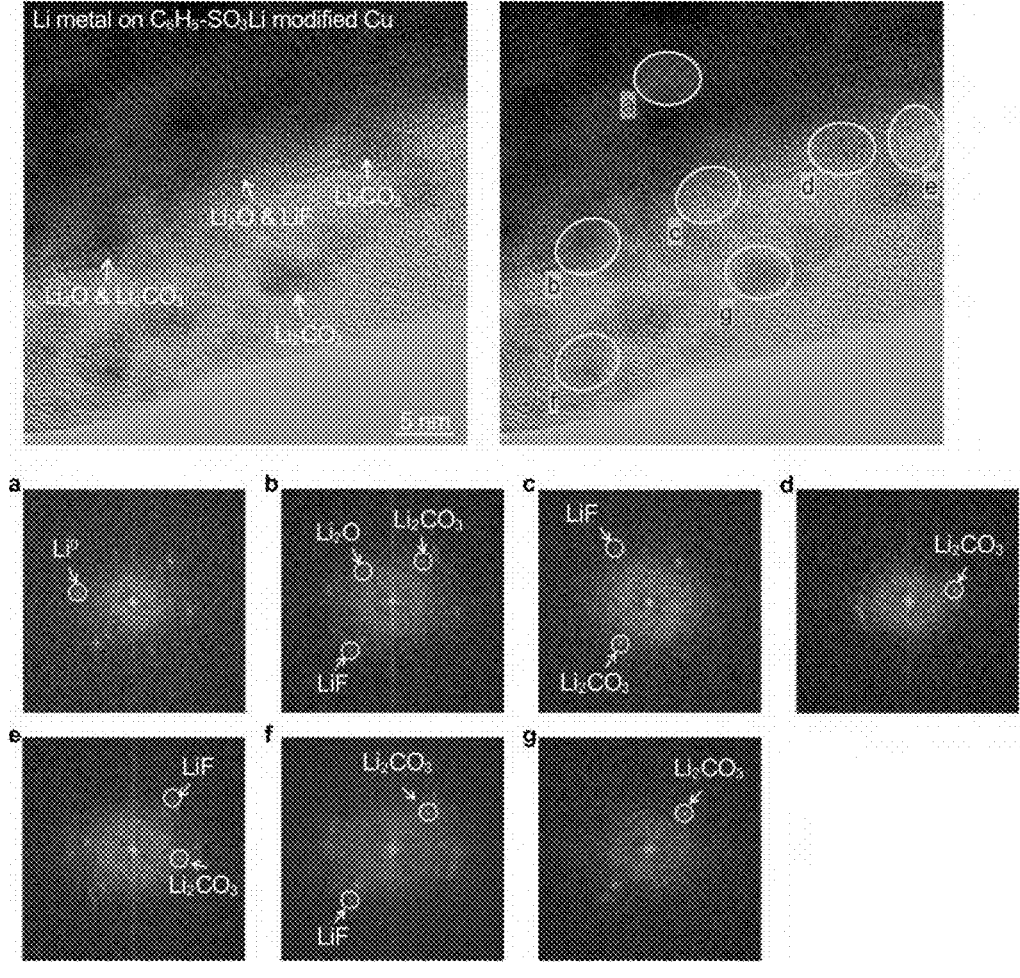
FIGS. 45A-45G show a TEM image of the SEI formed on the $C_6H_5$—$SO_3Li$ modified Cu at −15° C. No LiF-rich inner phase was seen in the SEI, when an electrochemically inactive was used.

Meanwhile, EELS was conducted to further validate the presence of the LiF-rich inner phase in the EAM-regulated SE. FIG. 37C shows a STEM image of the EAM-regulated SEI on Li. The inner phase of the SEI is brighter than in other regions, probably due to different compositions. Four regions were boxed in the image to represent Li layer (brown), inner phase of SEI (red), a middle layer of SEI (green), and outer layer of SEI (purple), respectively, and examined their composition pixel by pixel (FIG. 37D). The Li K-edge spectrum taken from the brown region has a broad peak at ~63 eV, corresponding to metallic Li. In the SEI layer, the peak shape of the inner phase region primarily corresponds to LiF44, indicating the presence of the LiF-rich inner phase. The peak shapes of the top two regions represent a mixture of $Li_2O$, $Li_2CO_3$, and $LiF_{44}$. In contrast, the same study was done on the SEI sample formed on bare Cu, finding Li2CO3-dominant spectral features without a LiF-rich inner phase (FIGS. 44A-44B).

Nanoscale depth-profiling XPS also supports our findings. A Li@EAM Cu sample was sputtered from the top surface of SEI to the Cu substrate underneath. As depicted in FIG. 37E, the top three curves represent the SEI layer, evidenced by the presence of Li salts (peaks at 54-58 eV in the Li 1s spectra). In the third curve from the top, a high concentration of LiF was found, indicating the presence of the LiF-rich inner phase. Upon sputtering, the fourth to sixth curves start to show Li metal signals (the peak at ~51 eV in the Li 1s spectra), which is the deposited Li layer. In the seventh curve, the Cu surface was reached, evidenced by the presence of Cu peaks at ~933 eV in the Cu 2p spectrum. Lithium benzenesulfonate (Li—$SO_2$—$C_6H_3$—) (peaks at ~57 eV in the Li 1s spectrum and −169 eV in the S 2p spectrum) and Cu—S (the peak at ~164 eV in the S 2p spectrum) were also found in this layer, confirming that lithium benzenesulfonate is bonded on Cu during Li deposition.

To further reveal the unique, multilayered structure of EAM-regulated SE, an assessment was also done to comparatively probe the SEI regulated by the electrochemically inactive monolayer of $C_6H_5$—$SO_3Li$. No LiF-rich inner phase in the SEI was observed (FIGS. 45A-45G). These findings indicate that EAM-derived LiF salts induce the formation of the LiF-rich inner phase in the multilayer SEI. Together, these findings verify that the use of the EAM alters the structure of the low-temperature SEI from a highly crystalline film to a multilayer with a LiF-rich inner phase.

Composition of the Low-Temperature SEI

To identify the SEI composition, XPS was performed on the cycled Li after 30 cycles (the spectra are not shown). It was found that the SEI formed on a bare Cu at 25° C. contains a high concentration of Li—CO2- (peaks at 288.8 eV in the C 1s spectrum and 54.4 eV in the Li 1s spectrum), LiF (peaks at 684.6 eV in the C 1s spectrum and 56.2 eV in the Li 1s spectrum), $ROCO_2R$ (the peak at 291.3 eV in the C 1s spectrum) derived from FEC, and $Li_xP_yOF_z$ (peaks at 136.9 eV in the P 2p spectrum and 53.1 eV in the Li 1s spectrum). The composition of this room-temperature SEI is consistent with the previous SEI characterization. When the temperature falls to −15° C., the SEI composition on bare Cu changes markedly. It was found that the atomic percentage of ROCO2R in the C-containing species was decreased to 4.1%, which is lower than that of 18.2% at 25° C. The LiF percentage was decreased from 36% (at 25° C.) to 14.5% (at −15° C.) (FIGS. 46A-46B).

Figures 46A, 46B:
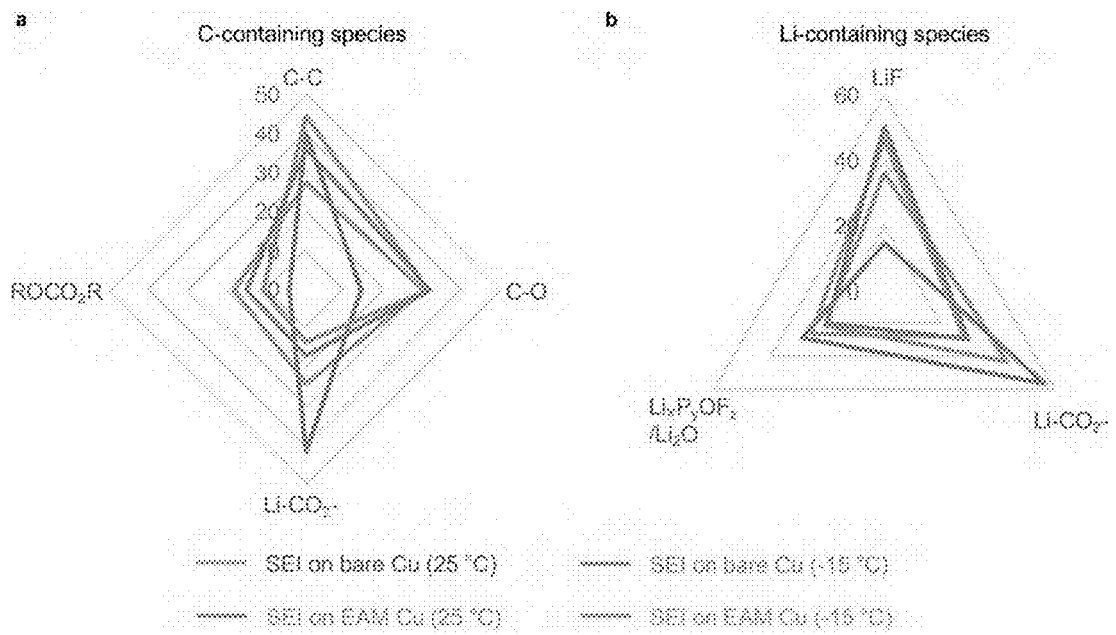
FIGS. 46A-46B show salt content analysis in the SEI based on XPS results (corresponding to FIG. 37).

The C-containing species, including C—C, C—O, Li—$CO_2$—, and $ROCO_2R$ in the SEI layers based on the C 1s spectra of SEI layers, are shown in FIG. 46A and Li-containing species contents, including LiF, Li—$CO_2$—, and $Li_xP_yOF_z/Li_2O$ in the SEI layers based on the Li 1s spectra of SEI layers, are shown in FIG. 46B. The analysis was done to the salt compositions in the SEI layers formed at different conditions to further elucidate the SEI chemistry at the low temperature. In the SEI layer formed on a bare Cu at 25° C., C—C (~27%), C—O (~30%), Li—$CO_2$— (~24%), and $ROCO_2R$ (~19%) were recorded (atomic percent). When the operation was decreased to −15, the content of $ROCO_2R$ is below 5%, indicating the restrained formation of polymeric components in the SEI layer (the blue line in FIG. 46A). The radar chart of Li-containing species shows a similar fact (FIG. 46B). The LiF formation in the SEI layer formed on the bare Cu was restricted, while the contents of Li—$CO_2$— increased significantly. The Li—$CO_2$— has become the dominant component in the SEI layer. These results are consistent with the cryo-TEM observations (FIG. 37B). Encouragingly, the SEI layer formed on the EAM Cu at −15° C. has a relatively high LiF content (the orange line in FIG. 46B), contributed by —$C_6H_3$— $(SO_2F)_2$ groups on the Cu surface. Meanwhile, the generation of $Li_xP_yOF_z$ was suppressed compared to the SEI layer formed on the bare Cu (the blue line in FIG. 46B).

Li—CO2- and LixPyOFz become the dominant salts in the low-temperature SEI. Encouragingly, the use of the EAM alters the SEI composition at −15° C. In the EAM-regulated SEI at −15° C., the percentages of $Li_xP_yOF_z$ and Li—$CO_2$— were markedly lowered; LiF percentage was increased from 14.5% to 46.8%; and ROCO2R percentage was enhanced to 10.7% (FIGS. 46A-46B). At 25° C., the EAM-regulated SEI also contains a high concentration of LiF (49.6%) (FIGS. 46A-46B), higher than that of 36% in the SEI on bare Cu at 25° C. Moreover, the composition of EAM-regulated SEI at −15° C. after 200 cycles were found to be similar to that at −15° C. after 30 cycles.

Low-Temperature Performance of Li-Metal Batteries

Figures 47A, 47B, 47C, 47D:
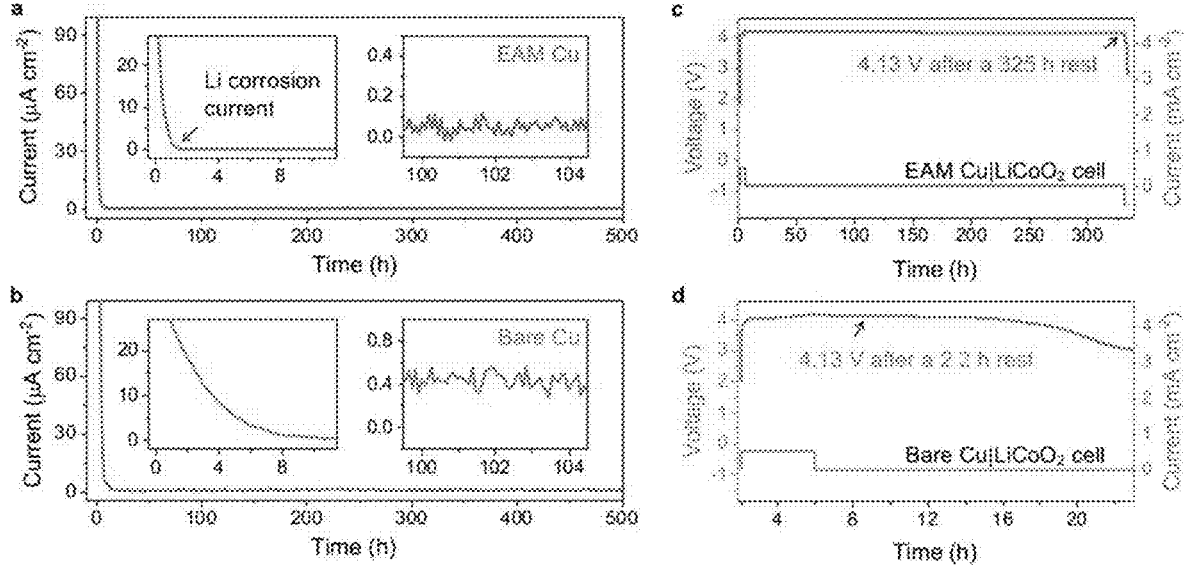
FIGS. 47A-47D show galvanic Li corrosion of Li anodes and self-discharging of Cu|LiCoO$_2$ cells.
Figures 48A, 48B, 48C, 48D:
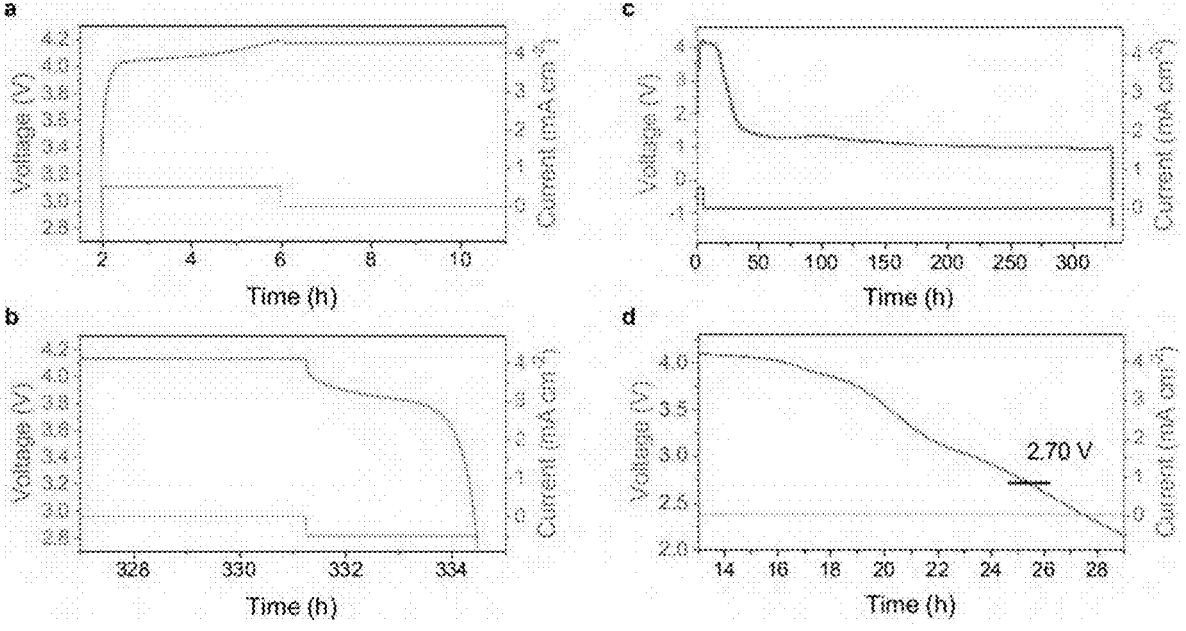
FIGS. 48A-48D show voltage versus time curves display the self-discharging of anode-free Li|LiCoO$_2$ cells incorporating the EAM Cu host (FIGS. 48A-48B) and bare Cu host (FIGS. 48C-48D).
Figures 49A, 49B:
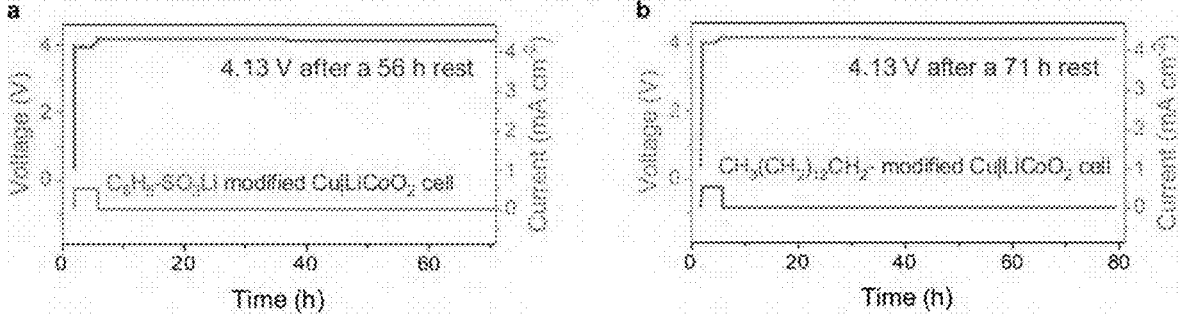
FIGS. 49A-49B show voltage versus time curves display the self-discharging of Li anode-free Cu|LiCoO$_2$ cells incorporating the $C_6H_5$—$SO_3Li$ modified Cu host (FIG. 49A) and $CH_3$—$(CH_2)_{12}CH_2$— modified Cu host (FIG. 49B).

After identifying the structure and composition of SEI, the low-temperature performance of Li-metal batteries next investigated. The EAM-regulated SEI effectively suppresses side reactions on the Li anode surface. This was evidenced by the restrained galvanic Li corrosion on Cu and the self-discharge of Li-metal batteries. FIG. 47A depicts the galvanic Li corrosion in a Li|EAM Cu host cell. The galvanic current was dropped to a stable value below 0.1 μA cm$^{−2}$ within 2 h, indicating a limited Li corrosion. In contrast, the current in the control cell was slowly reduced and stabilized at ~0.4 μA cm$^{−2}$ after 8 h (FIG. 47B). Meanwhile, a charged EAM Cu|LiCoO$_2$ cell (4.2 V) had an open-circuit voltage of 4.13 V after a 325 h rest (FIG. 47C). The cell presented a capacity retention of 80.3% in the subsequent discharge cycle (FIGS. 48A-48B). In contrast, the open-circuit voltage of the control cell rapidly dropped to 4.13 V merely after a 2.2 h rest (FIG. 47D) and had no discharge capacity after 325 h (FIGS. 48C-48D). The use of self-assembled monolayers of $C_6H_5$—$SO_3Li$ and $CH_3$—$(CH_2)_{12}CH_2$— also reduced the cell self-discharging (FIGS. 49A-49B) but is significantly less effective than the use of EAM.

Figures 50A, 50B, 50C, 50D, 50E:
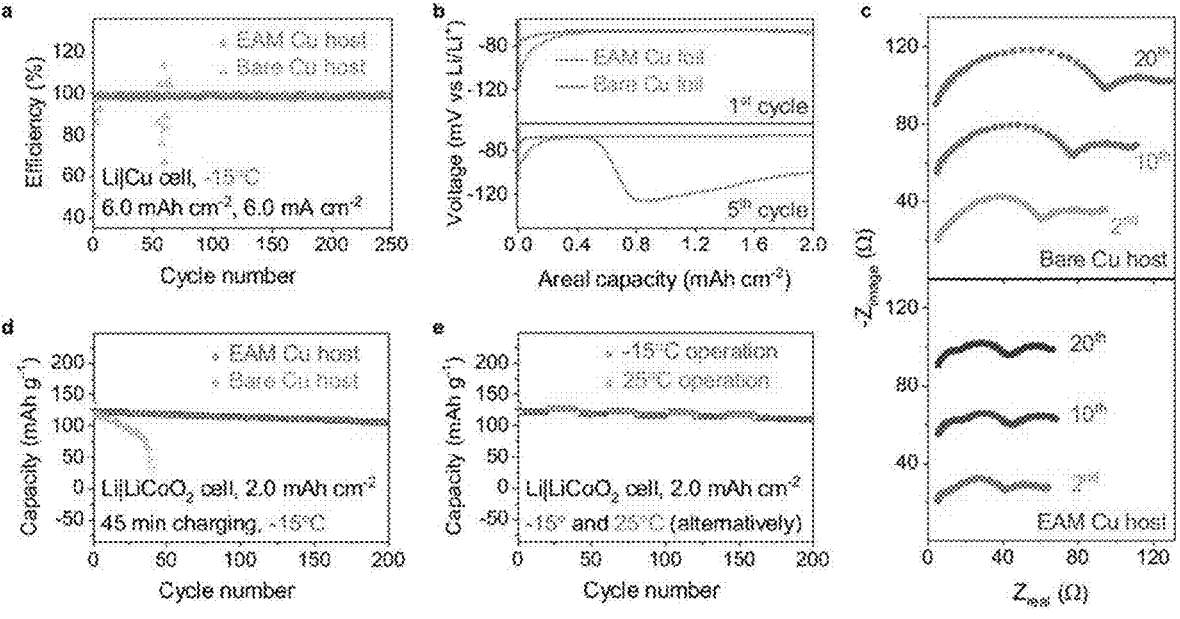
FIGS. 50A-50E show battery performance under low-temperature and high-rate-charging conditions.

The subsequent studies were done to investigate the efficiency of Li deposition on the EAM Cu host under high-current (6.0 mA cm$^{−2}$), high-capacity (6.0 mAh cm$^{−2}$), and low-temperature (−15° C.) conditions. FIGS. 50A-50B show the efficiency (FIG. 50A) and voltage profile (FIG. 50B) of Li deposition at −15° C. with a current density of 6.0 mA cm$^{−2}$. The EAM Cu enables high-efficiency Li deposition in contrast to low efficiency and severe polarization on the bare Cu. FIG. 50C shows the impedance evolution of Li|Cu cells at −15° C. FIG. 50D shows a cycling stability of Li|LiCoO$_2$ cells at −15° C. with a charge capacity of 2.0 mAh cm$^{−2}$ and a charge current density of 2.67 mA cm$^{−2}$. FIG. 50E shows cycling stability of a Li|LiCoO$_2$ cell incorporating the EAM Cu host. The temperature was repeatedly switched between −15° C. and 25° C.

Figure 51:
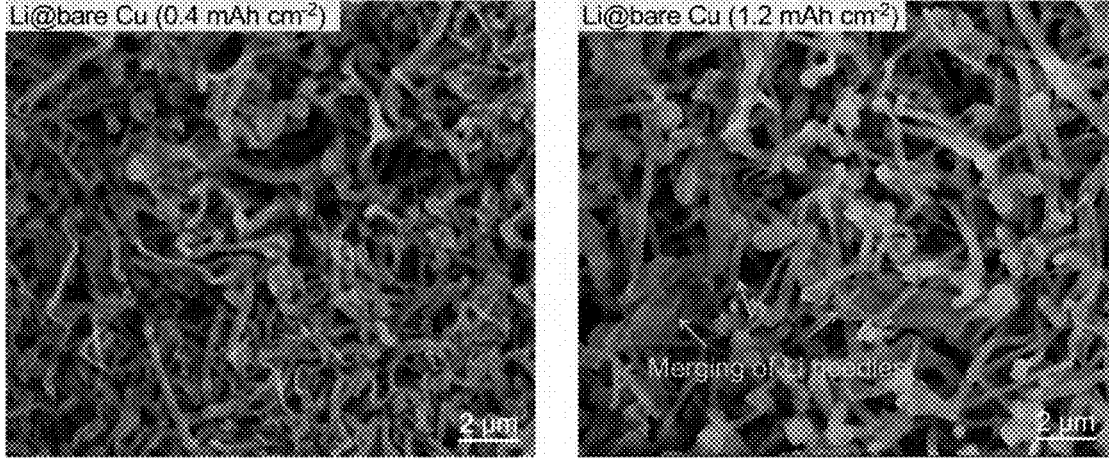
FIG. 51 shows SEM images of Li deposition on the bare Cu foil with a deposition amount of 0.4 mAh cm$^{-2}$ (left) and 1.2 mAh cm$^{-2}$ (right), respectively, which are corresponding to FIG. 47B. During the 5th cycle of Li deposition on the bare Cu foil (the grey curve in FIG. 50B), the needle-shaped Li merged along with the increase of Li deposition amount. The huge increase of Li deposition potential (from 0.4 to 0.8 mAh cm$_{-2}$) can be caused by the growth of the long and thin Li needles, and the potential fall back after that (starting from 0.8 mAh cm$_{-2}$) is because of the merging of Li needles.
Figure 52:
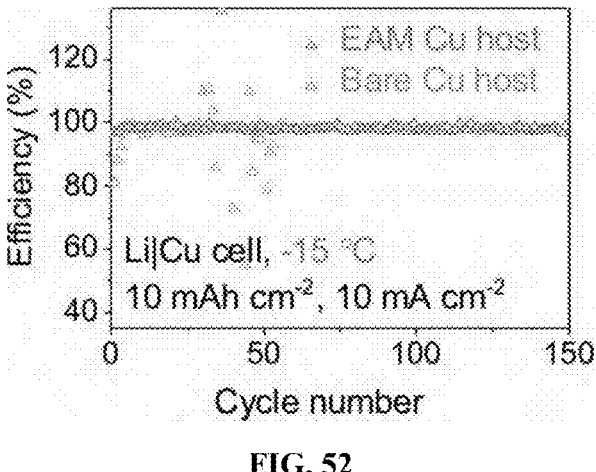
FIG. 52 shows Li deposition efficiency on the EAM Cu at −15° C. and at a current density of 10 mA cm$^{-2}$.
Figures 53A, 53B, 53C, 53D:
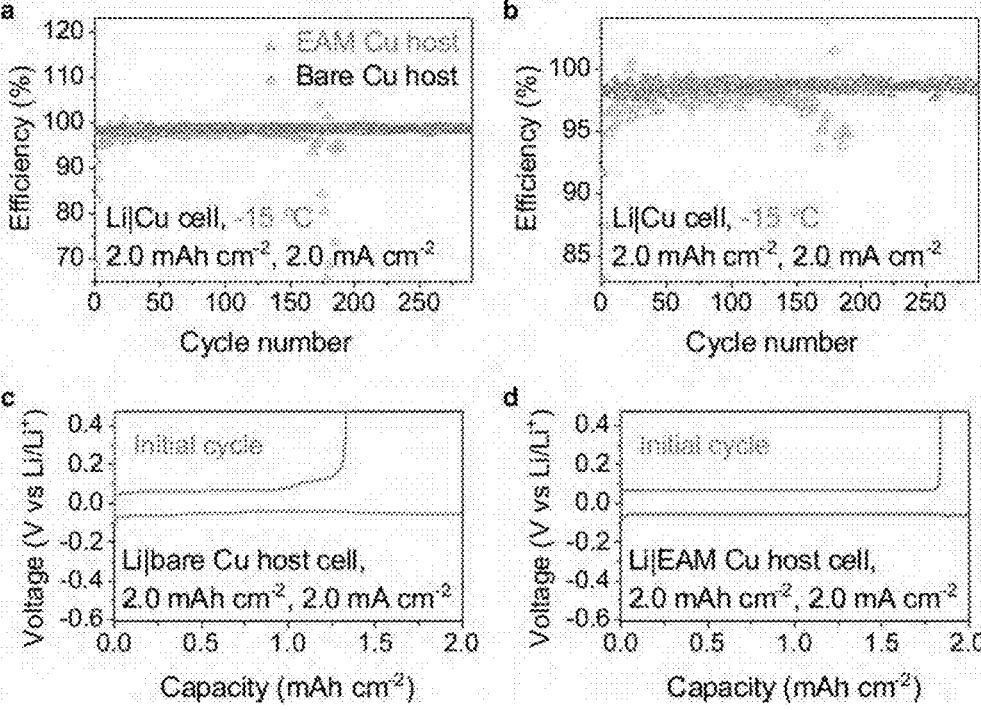
FIGS. 53A-53B show Li deposition efficiency on the Cu host at −15° C. with a capacity of 2.0 mAh cm$^{-2}$ and at a current density of 2.0 mA cm$^{-2}$.
FIGS. 53C-53D show initial-cycle voltage profiles of Li deposition on the bare Cu host (FIG. 53C) and on the EAM Cu host (FIG. 53D). With a deposition amount of 2.0 mAh cm$^{-2}$ and at a current density of 2.0 mA cm$^{-2}$, Li deposition on the EAM Cu host presented an average efficiency of 98.9% in 250 cycles (FIGS. 53A-53B). No clear polarization caused by Li dendrite growth was seen in the initial-cycle voltage profile of the EAM Cu host sample (FIG. 53D). In contrast, curved plateaus of Li plating and stripping in the initial-cycle voltage profile of the control sample were observed (FIG. 53C), indicating severe polarization caused by Li dendrite growth.
Figure 54:
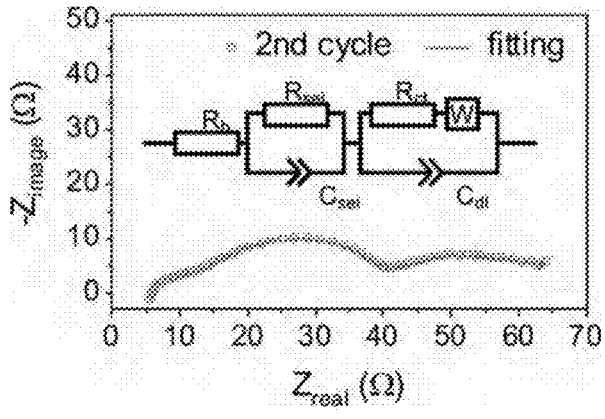
FIG. 54 shows an impedance spectrum of a Li|EAM Cu host cell after 2 cycles.

The average efficiency of 98.6% in 250 cycles was realized in comparison with a rapid short circuit of the control cell after 60 cycles (FIG. 50A). The use of the EAM Cu induced a low Li nucleation overpotential of 14 mV and a deposition potential of −66 mV (FIG. 50B). In contrast, the control cell had a high nucleation overpotential of 53 mV (FIG. 50B), and the deposition potential was increased to −125 mV along with the accumulation of Li dendrites and slowly fell back due to the merge of dendrites (FIG. 51). Stable Li deposition was also achieved at a capacity of 10 mAh cm$^{−2}$ and a current density of 10 mA cm$^{−2}$ (FIG. 52) and a low areal capacity of 2.0 mAh cm$^{−2}$ and a current density of 2.0 mA cm$^{−2}$ (FIGS. 53-53D). During Li deposition, the interfacial resistance of the Li|EAM Cu cell remained low (FIG. 50C and FIG. 54), while that of the cell was extensively increased. FIG. 54 shows the impedance spectrum of a Li|EAM Cu host cell after 2 cycles. An equivalent circuit is used as a fit model. The impedance curve contains three semicircles and a short sloping line. It was fitted by an equivalent circuit displayed in the inset. R$_b$ represents the bulk resistance of the Li|Cu cell. The resistance and capacitance of SEI were labeled as R$_{sei}$ and C$_{sei}$, respectively, which are related to the two partially overlapped semicircles at high frequency. Rct, Cdl, and W represent the charge-transfer resistance, capacitance, and Warburg impedance corresponding to Li-ion diffusion, respectively, which are related to the semi-circle at low frequency.

Figure 55:
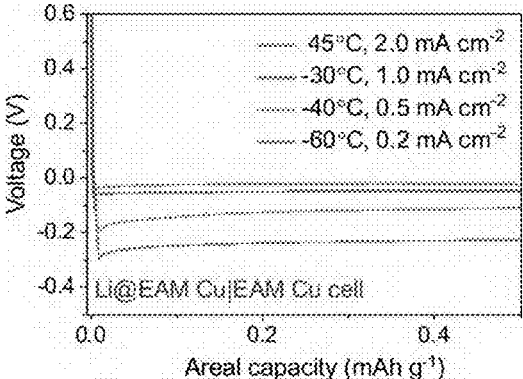
FIG. 55 shows a voltage profile of Li deposition on the EAM Cu host at different temperatures.

Moreover, Li deposition was stably conducted in a wide temperature range from −60° C. to 45° C. Low Li nucleation overpotentials were observed owing to the use of the EAM Cu host (FIG. 55). FIG. 55 shows a voltage profile of Li deposition on the EAM Cu host at −60° C., −40° C., −30° C., and 45° C., respectively. The Li@EAM Cu host (10 mAh cm$^{−2}$) electrode was used as the counter and reference electrode.

Figures 56A, 56B:
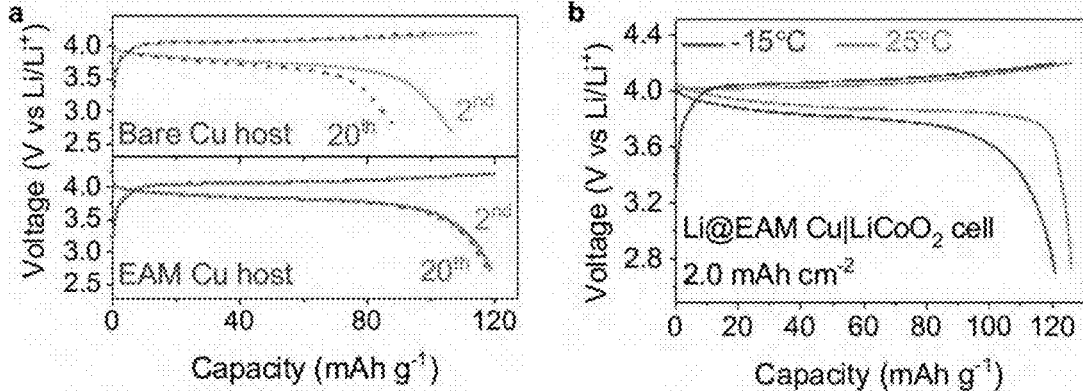
FIGS. 56A-56B show the voltage profile of Li|LiCoO$_2$ cells.
Figures 57A, 57B:
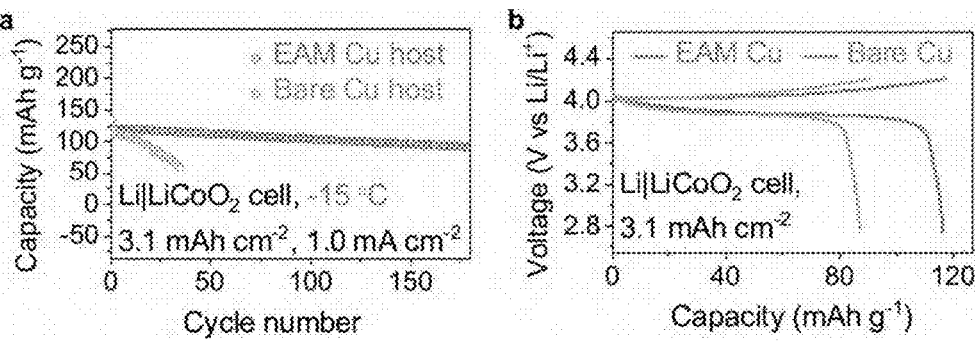
FIGS. 57A-57B show cycling stability (FIG. 57A) and voltage profile (FIG. 57B) of Li|LiCoO$_2$ cells with a higher capacity of 3.1 mAh cm$^{-2}$ and at a charge current density of 1.0 mA cm$^{-2}$.

To further demonstrate the SEI stability, Li-metal batteries were cycled at −15° C. with a recharge time of 45 min. LiCoO2 cathodes with a capacity of 2.0 mAh cm$^{−2}$ were precharged and paired to the Li@EAM Cu anodes that accommodate 10 mAh cm$^{−2}$ of Li. The Li|LiCoO$_2$ cell had a capacity retention of 87.7% in 200 cycles (FIG. 50D). The specific recharge capacity is ~123 mAh g$^{−1}$, and no clear polarization was observed (FIG. 56A). Contrastingly, the control cell rapidly faded in 40 cycles and showed increased polarization with cycling. The Li|LiCoO$_2$ cell with a high capacity of 3.1 mAh cm$^{−2}$ had a 170-cycle life at −15° C. (FIGS. 57A-57B).

Figures 58A, 58B:
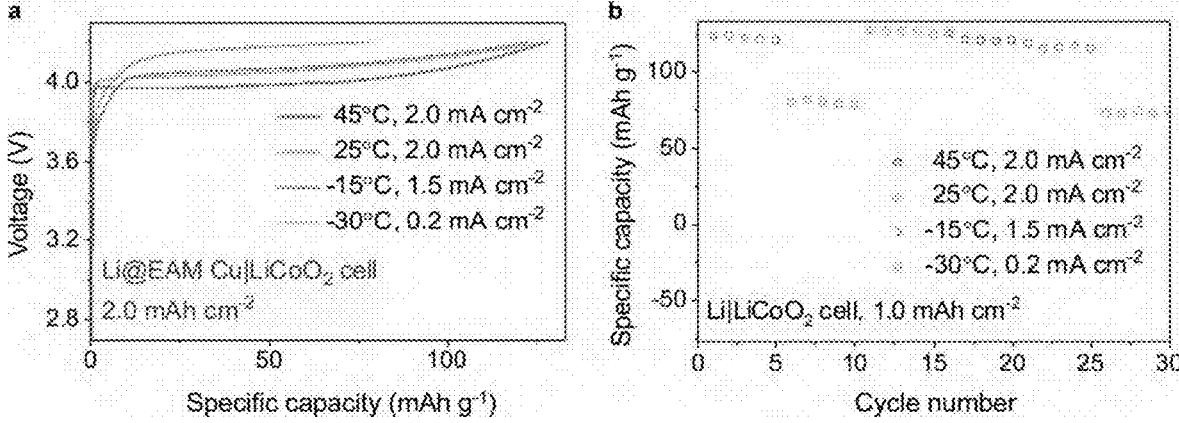
FIGS. 58A-58B show voltage profile (FIG. 58A) and cycling stability (FIG. 58B) of Li|LiCoO$_2$ cells with an areal capacity of 1.0 mAh cm$^{-2}$ charged at −30° C., −15° C., 25° C., and 45° C., respectively. The specific charge capacities at $-30°$ C., $-15°$ C., $25°$ C., and $45°$ C. are ~79, ~123, ~129, and ~128 mAh g$^{-1}$, respectively.
Figure 59:
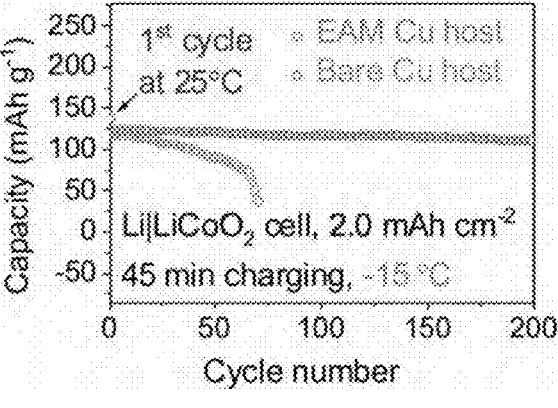
FIG. 59 shows the cycling stability of Li|LiCoO$_2$ cells activated at $25°$ C. in the 1st cycle and cycled at $-15°$ C. afterward.
Figures 60A, 60B:
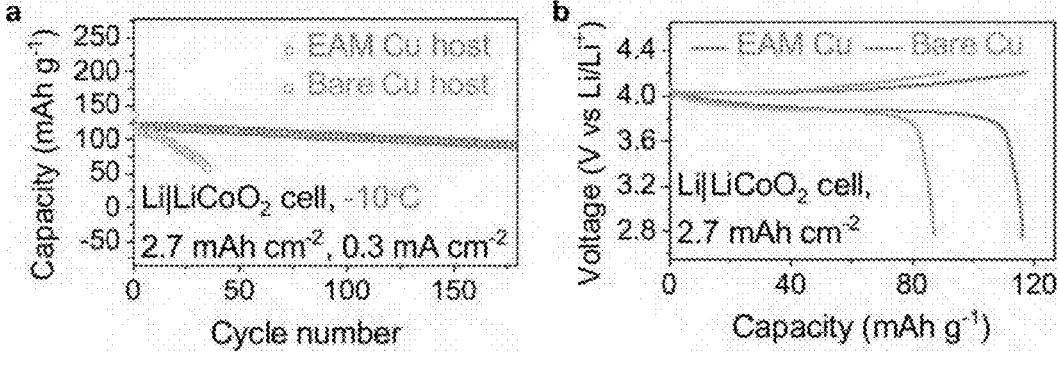
FIGS. 60A-60B show cycling stability of Li|LiCoO$_2$ cells that incorporate 1 M LiPF$_6$ in EC/EMC electrolyte at $-10°$ C. The cell with EAM Cu showed capacity retention of 75.6% in 180 cycles, while the control cell had a capacity retention of merely 50.1% in 56 cycles.

Moreover, the Li|LiCoO$_2$ cells can be stably operated in a wide temperature range. The cells showed stable reversible capacities when the temperature was gradually varied from −30° C. to 45° C. (FIGS. 58A-58B) and repeatedly switched between −15° C. and 25° C. (FIG. 50E and FIG. 56B), respectively. Li|LiCoO$_2$ cells were operated at 25° C. for 1 cycle before cycling them at −15° C. This activation process is used for commercial batteries and allows more LiF generation in the initial SEI. Unfortunately, the cycle life of the control cell was merely extended from 37 to 63 cycles (FIG. 59) due to the repeated SEI breaking and reforming. In contrast, the cell incorporating EAM showed a similar cycle of life, with the cell having no room-temperature activation (FIG. 59). These results verify the good stability of the Li metal anode SEI in a wide temperature range. Besides, the use of Li@EAM Cu anodes also improved the cycling stability of Li|LiCoO$_2$ cells incorporating an EC-based electrolyte (FIGS. 60A-60B) by providing additional LiF in the SEI. The XPS spectra taken on the Li SEI formed on the bare Cu at 25° C. showed that lithium carbonates (Li—CO$_2$—) are dominant in the SEI. The XPS spectra taken on the Li SEI formed on the bare Cu at −10° C. showed that the decomposition of EC and ECM solvents was restrained, evidenced by the reduced concentration of Li—CO$_2$—. The XPS spectra taken on the Li SEI formed on the EAM Cu at −10° C. showed that EAM contributes LiF in the SEI, and the formation of Li$_x$P$_y$OF$_z$ was suppressed.

Modeling of Low-Temperature SEI Chemistry

Figures 61A, 61B, 61C, 61D:
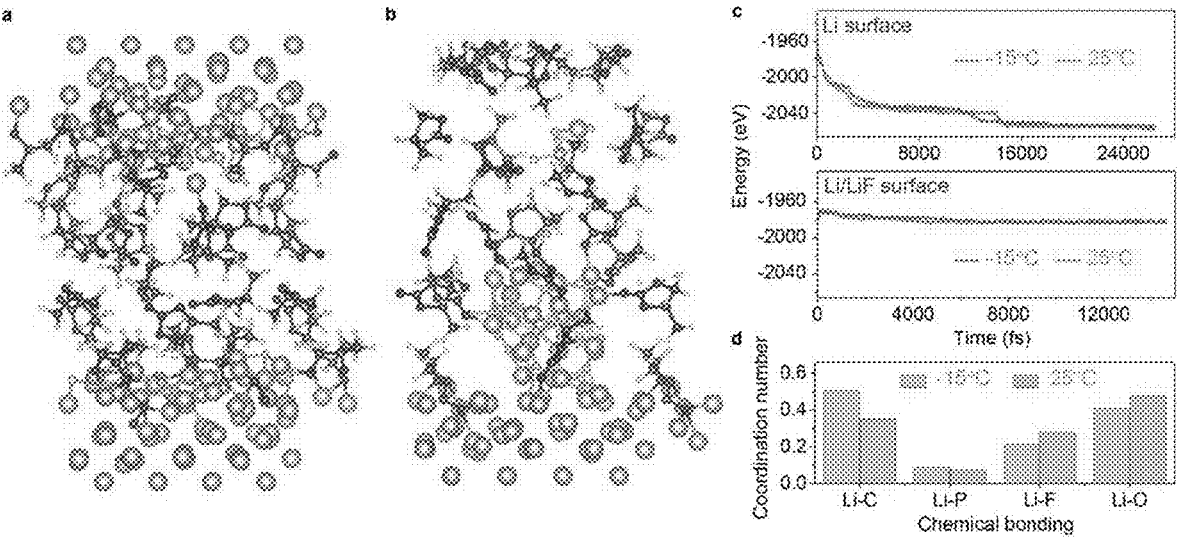
FIGS. 61A-61D show low-temperature SEI chemistry studied by modeling and quantitative NMR.
Figures 62A, 62B, 62C, 62D:
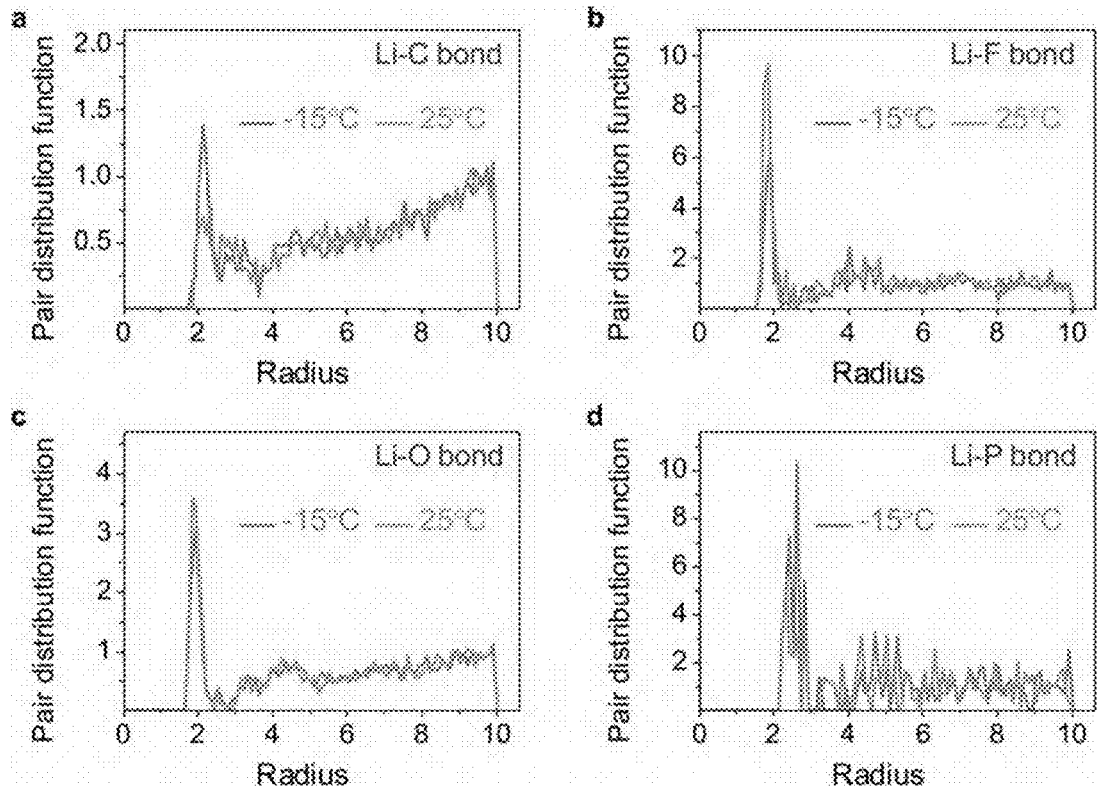
FIGS. 62A-62D show average pair distribution functions for the structures over the last picosecond of the simulation, the enhancements near the first shell (~2 A) describe the favorability of Li—C (FIG. 62A), Li—F (FIG. 62B), Li—O (FIG. 62C), and Li—P (FIG. 62D) bonds at $-15°$ C. and $25°$ C., respectively. The radial distribution function over the last picosecond of the calculation (consisting of 1000 configurations) was averaged, in which the system has already been equilibrated. The enhancement in the radial distribution functions at the first shell is highly consistent with the previous simulation results presented in FIGS. 61C-61D.

To unravel the origin of the low-temperature SEI chemistry, ab initio molecular dynamics (AIMD) simulations of the SEI formation process was performed at −15° and 25° C. FIGS. 61-61B show simulation models of the Li-electrolyte interfaces on the bare Cu (without LiF) (FIG. 61A) and on the EAM Cu (with LiF that partially covers the Li surface) (FIG. 61B). FIG. 61C show energy versus time curves present the rates of SEI formation to reach an equivalent equilibrium point at −15° C. and 25° C., respectively. FIG. 61D shows favorable SEI components at −15° C. and 25° C. based on the pair distribution function.

Two Li— electrolyte interface models were utilized. For the Li@bare Cu, Li atoms are directly contacted with electrolyte molecules (FIG. 61A). For the Li@EAM Cu, LiF molecules were added to partially cover the Li surface (FIG. 61B). First, the energetics of these two systems were monitored over time to determine the decomposition rate of the electrolyte and its influences on the SEI composition (FIG. 61C and FIGS. 62A-62D). A smaller reaction energy change of ~17 eV was observed for the Li@EAM Cu in contrast to that of ~60 eV for the Li@bare Cu, indicating effective restraint of electrolyte decomposition in the SEI formation. For the Li@bare Cu, the equilibrium energy level was reached faster (~18 ps) at −15° C., while the Li@EAM Cu system showed similar energetic evolutions at −15° C. and 25° C. This result indicates that the limited influence of the temperature on the SEI stability due to the LiF-rich inner phase in the Li@EAM Cu system.

Figures 63A, 63B, 63C, 63D, 63E, 63F, 63G, 63H:
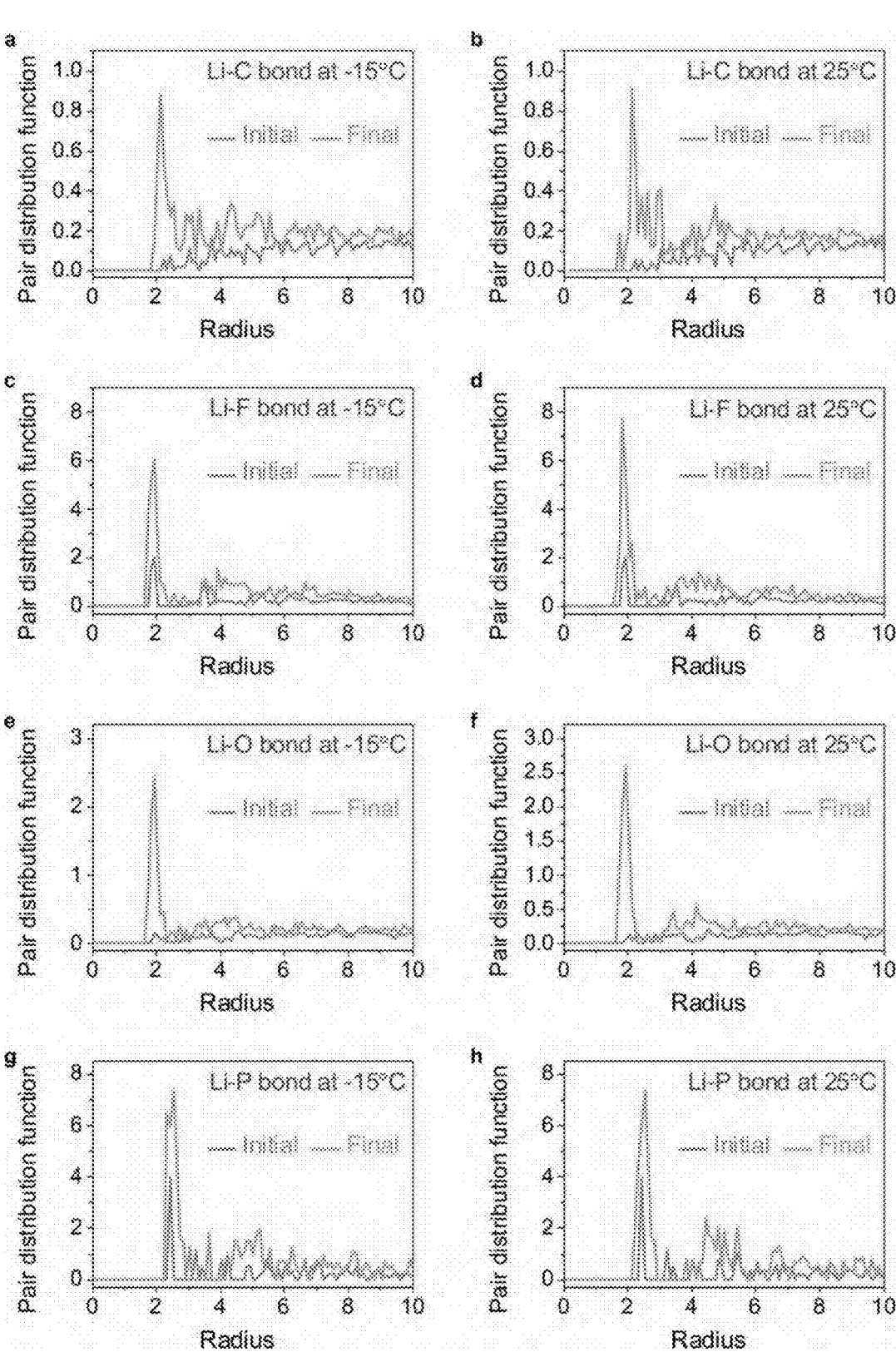
FIGS. 63A-63H show pair distribution function versus radius curves describing the favorability of Li—C (FIGS. 63A-63B), Li—F (FIGS. 63C-63D), Li—O (FIGS. 63E-63F), and Li—P (FIGS. 63G-63H) bonds at $-15°$ C. and $25°$ C., respectively. The coordination number was calculated based on the difference between the initial and final status. The initial point pair distribution function is included to help visualize the effect of temperature in the structure of the final point.

To further probe the temperature influence on the SEI structure, the favorable bonding of Li with C, O, F, and P was studied by calculating the coordination number of Li atoms in the surface as a function of distance via integrated radial distribution functions of AIMD trajectories. At −15° C., the coordination numbers of Li—C and Li—P are increased, and that of Li—F is decreased compared to those at 25° C. (FIG. 61D and FIGS. 63-64), indicating that Li atoms are bonded with more C and P atoms and less F atoms. The external pressure is applied by slightly reducing the volume of the simulation supercell. The cell pressure was included in calculations, and calculations that simulate the presence of external pressure within the NVT ensemble were provided by slightly modifying the volume of the supercell in order to represent an average external pressure of 1 atm. The pressurized system was stimulated at −15° and 25° C. for about 25 ps, and the final structures were analyzed by using radial distribution function averaged over the last picosecond of the simulation (1000 configurations). The distribution functions clearly show the enhancements, indicating that atmospheric pressure does not represent a significant factor in the SEI formation.

Without wishing to be bound by any theory, it was assumed that this is responsible for the increased content of Li—CO$_2$— and Li$_x$P$_y$OF$_z$ and reduced content of LiF in the low-temperature SEI.

Figures 64A, 64B, 64C, 64D, 65A, 65B, 65C:
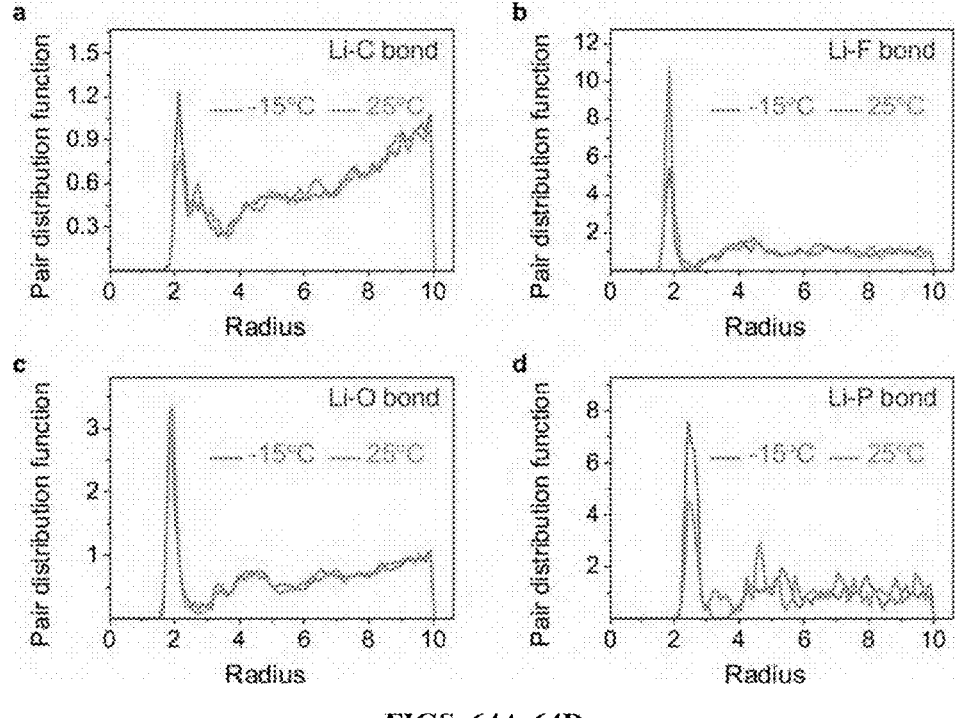
FIGS. 64A-64D show average pair distribution functions for the structures over the last picosecond of the simulation in the presence of an average external pressure of 1 atm, the enhancements near the first shell (~2 A) describe the favorability of Li—C (FIG. 64A), Li—F (FIG. 64B), Li—O (FIG. 64C), and Li—P (FIG. 64D) bonds at $-15°$ C. and $25°$ C., respectively.
FIGS. 65A-65C show retentions of LiPF$_6$, PC, and FEC with cycling, which were measured by quantitative NMR. The Li|LiCoO$_2$ cells incorporating the bare Cu at $25°$ C.
Figures 66A, 66B, 66C:
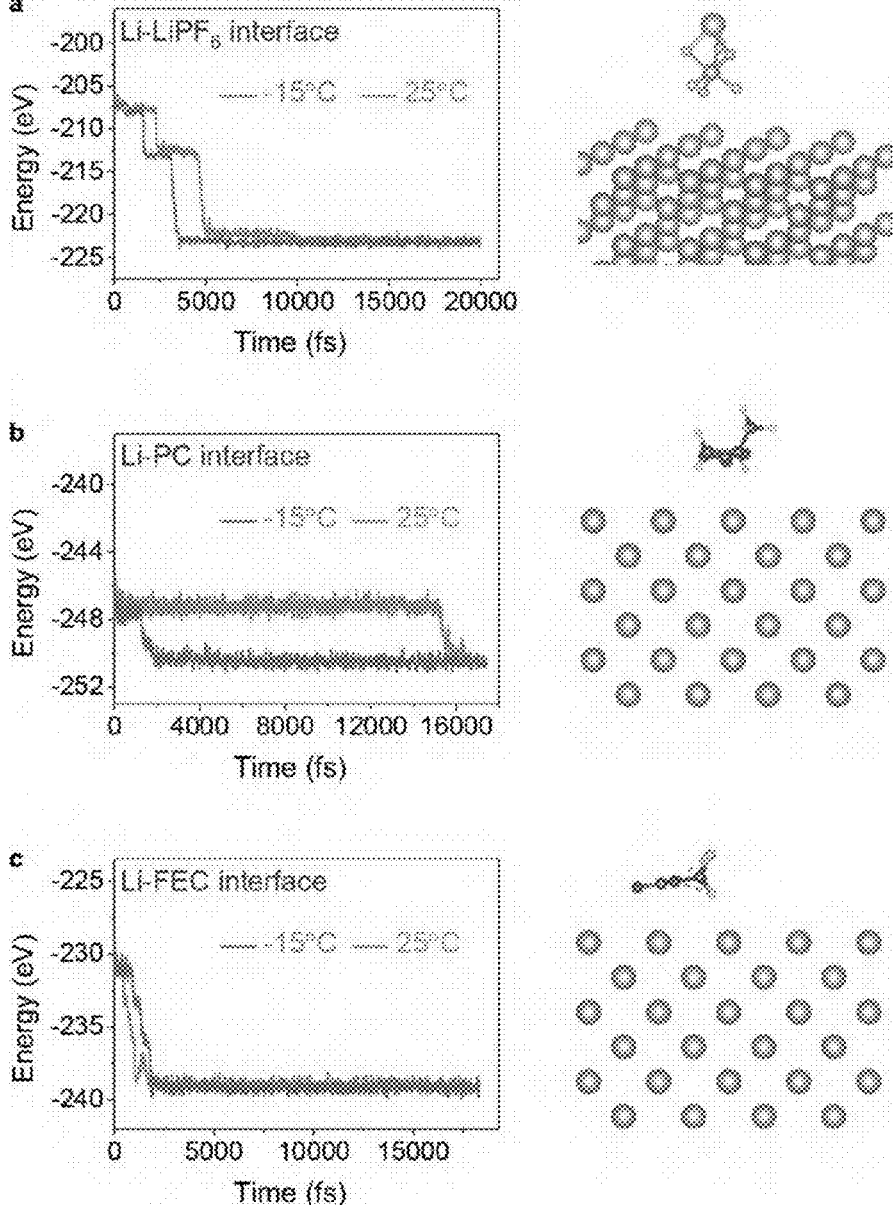
FIGS. 66A-66C show energy versus time curves present the rates of reactions between Li and LiPF$_6$, Li and PC, and Li and FEC to reach an equivalent equilibrium point at $-15°$ C. and $25°$ C., respectively.

The consumption rate of each electrolyte component was also monitored using quantitative NMR and AIMD simulation. The use of the EAM Cu reduces the electrolyte, indicating a stabilized interface of Li metal anodes (FIGS. 65-66 and Tables 1-9). The consumption rate of each electrolyte component was monitored, including propylene carbonate (PC), FEC, and lithium hexafluorophosphate (LiPF$_6$) using quantitative NMR and AIMD simulation. For the cell incorporating the Li@bare Cu at 25° C. (FIG. 65A), FEC consumed faster than PC and LiPF$_6$. At −15° C. (FIG. 65B), FEC decomposition was restrained, and the consumption of PC and LiPF6 becomes dominant, which is consistent with the simulation results (FIGS. 66A-66C). Encouragingly, the use of the EAM Cu reduces the decomposition rate of each component (FIG. 65C), indicating a stabilized interface of Li metal anodes. The raw NMR data was shown in Tables 1-9. The simulation and experiment results synergistically verify a LiF-rich SEI formed on the EAM Cu at −15° C. in comparison with a Li2CO$_3$-dominant SEI formed on the bare Cu at −15° C.

This work shows a new interfacial strategy that enables the superior performance of Li-metal batteries at −15° C. An electrochemically active monolayer was employed to alter the SEI structure and Li nucleation at low temperatures and in a carbonate electrolyte. The formed SEI has a LiF-rich inner phase, which is distinguished from the crystalline structure of the conventional low-temperature SEI. Consequently, dendrite-free Li deposition was realized; Li anodes were stably cycled in a wide temperature range from −60° C. to 45° C.; Li-metal battery cells showed long cycle lives at −15° C. with a recharge time of 45 min. The invention disclosed herein can be utilized for low-temperature rechargeable batteries.

TABLE 1

Summary of quantitative $^{19}$F NMR
experiment results of LiPF$_6$ retention with cycling.
The electrolyte samples were collected from the Li|LiCoO$_2$
cells incorporating Li@bare Cu electrodes at 25° C.
The NMR data is corresponding to the LiPF$_6$ curve in FIG. 65A.

| Electrolyte (bare Cu, 25° C.) | | δ ($^{19}$F) (ppm) of LiPF6 | Integrals of LiPF6 | LIPF6 retention (%) |
|---|---|---|---|---|
| Pristine | #1 | −71.8 and −73.3 | 64925 | 103.8 |
| | #2 | −71.8 and −73.3 | 61012 | 97.5 |
| | #3 | −71.8 and −73.3 | 61786 | 98.7 |
| 10 cycles | #1 | −71.8 and −73.3 | 47952 | 76.6 |
| | #2 | −71.8 and −73.3 | 48461 | 77.4 |
| | #3 | −71.8 and −73.3 | 50727 | 81.1 |
| 20 cycles | #1 | −71.8 and −73.3 | 44662 | 71.3 |
| | #2 | −71.8 and −73.3 | 46971 | 75.1 |
| | #3 | −71.8 and −73.3 | 47105 | 75.3 |
| 30 cycles | #1 | −71.8 and −73.3 | 41508 | 66.3 |
| | #2 | −71.8 and −73.3 | 44970 | 71.9 |
| | #3 | −71.8 and −73.3 | 44023 | 70.4 |

TABLE 2

Summary of quantitative $^1$H NMR experiment results of
FEC retention with cycling. The electrolyte samples were
collected from the Li|LiCoO$_2$ cells incorporating Li@bare Cu electrodes
at 25° C. The NMR data is corresponding to the FEC curve in FIG. 65A.

| Electrolyte (bare Cu, 25° C.) | | δ ($^1$H) (ppm) of FEC | Integrals of FEC | FEC retention (%) |
|---|---|---|---|---|
| Pristine | #1 | 6.5 and 6.6 | 301444 | 102.8 |
| | #2 | 6.5 and 6.6 | 291768 | 99.5 |
| | #3 | 6.5 and 6.6 | 286339 | 97.7 |
| 10 cycles | #1 | 6.5 and 6.6 | 199873 | 68.2 |
| | #2 | 6.5 and 6.6 | 213561 | 72.8 |
| | #3 | 6.5 and 6.6 | 198977 | 67.9 |
| 20 cycles | #1 | 6.5 and 6.6 | 170388 | 58.1 |
| | #2 | 6.5 and 6.6 | 165291 | 56.4 |
| | #3 | 6.5 and 6.6 | 182692 | 62.3 |
| 30 cycles | #1 | 6.5 and 6.6 | 138659 | 47.3 |
| | #2 | 6.5 and 6.6 | 134187 | 45.8 |
| | #3 | 6.5 and 6.6 | 152653 | 52.1 |

TABLE 3

Summary of quantitative $^2$H NMR experiment results of
PC (deuterated) retention with cycling. The electrolyte samples were
collected from the Li|LiCoO$_2$ cells incorporating Li@bare Cu electrodes
at 25° C. The NMR data is corresponding to the PC curve in FIG. 65A.

| Electrolyte (bare Cu, 25° C.) | | δ ($^2$H) (ppm) of PC | Integrals of PC | PC retention (%) |
|---|---|---|---|---|
| Pristine | #1 | 1.44 and 1.45 | 7606584 | 103.4 |
| | #2 | 1.44 and 1.45 | 7243896 | 98.4 |
| | #3 | 1.44 and 1.45 | 7219104 | 98.1 |
| 10 cycles | #1 | 1.44 and 1.45 | 6223440 | 84.6 |
| | #2 | 1.44 and 1.45 | 6323160 | 86.0 |
| | #3 | 1.44 and 1.45 | 6536520 | 88.9 |
| 20 cycles | #1 | 1.44 and 1.45 | 6040248 | 82.1 |
| | #2 | 1.44 and 1.45 | 5682360 | 77.2 |
| | #3 | 1.44 and 1.45 | 5997096 | 81.5 |
| 30 cycles | #1 | 1.44 and 1.45 | 5417760 | 73.6 |
| | #2 | 1.44 and 1.45 | 5453160 | 74.1 |
| | #3 | 1.44 and 1.45 | 5785656 | 78.6 |

TABLE 4

Summary of quantitative $^{19}$F NMR experiment
results of LiPF6 retention with cycling. The
electrolyte samples were collected from the Li|LiCoO$_2$
cells incorporating Li@bare Cu electrodes at −15° C.
The NMR data is corresponding to the LiPF6 curve in FIG. 65B.

| Electrolyte (bare Cu, −15° C.) | | δ ($^{19}$F) (ppm) of LIPF6 | Integrals of LiPF6 | LIPF6 retention (%) |
|---|---|---|---|---|
| Pristine | #1 | −71.8 and −73.3 | 65973 | 97.3 |
| | #2 | −71.8 and −73.3 | 69523 | 102.6 |
| | #3 | −71.8 and −73.3 | 67818 | 100.1 |
| 10 cycles | #1 | −71.8 and −73.3 | 51533 | 76.0 |
| | #2 | −71.8 and −73.3 | 54178 | 79.9 |
| | #3 | −71.8 and −73.3 | 50452 | 74.4 |
| 20 cycles | #1 | −71.8 and −73.3 | 47255 | 69.7 |
| | #2 | −71.8 and −73.3 | 50947 | 75.2 |
| | #3 | −71.8 and −73.3 | 45688 | 67.4 |
| 30 cycles | #1 | −71.8 and −73.3 | 44426 | 65.6 |
| | #2 | −71.8 and −73.3 | 47972 | 70.8 |
| | #3 | −71.8 and −73.3 | 44380 | 65.5 |

TABLE 5

Summary of quantitative $^1$H NMR experiment results of
FEC retention with cycling. The electrolyte samples were
collected from the Li|LiCoO$_2$ cells incorporating Li@bare Cu electrodes
at −15° C. The NMR data is corresponding to the FEC curve in FIG. 65B.

| Electrolyte (bare Cu, −15° C.) | | δ ($^1$H) (ppm) of FEC | Integrals of FEC | FEC retention (%) |
|---|---|---|---|---|
| Pristine | #1 | 6.5 and 6.6 | 296933 | 99.0 |
| | #2 | 6.5 and 6.6 | 308560 | 102.9 |
| | #3 | 6.5 and 6.6 | 294524 | 98.2 |
| 10 cycles | #1 | 6.5 and 6.6 | 240761 | 80.3 |
| | #2 | 6.5 and 6.6 | 258530 | 86.2 |
| | #3 | 6.5 and 6.6 | 251083 | 83.7 |
| 20 cycles | #1 | 6.5 and 6.6 | 226813 | 75.6 |
| | #2 | 6.5 and 6.6 | 237294 | 79.1 |
| | #3 | 6.5 and 6.6 | 242662 | 80.9 |
| 30 cycles | #1 | 6.5 and 6.6 | 41508 | 95.4 |
| | #2 | 6.5 and 6.6 | 44971 | 103.4 |
| | #3 | 6.5 and 6.6 | 44023 | 101.2 |

TABLE 6

Summary of quantitative $^2$H NMR experiment results of
PC (deuterated) retention with cycling. The electrolyte samples were
collected from the Li|LiCoO$_2$ cells incorporating Li@bare Cu electrodes
at −15° C. The NMR data is corresponding to the PC curve in FIG. 65B.

| Electrolyte (bare Cu, −15° C.) | | δ ($^2$H) (ppm) of PC | Integrals of PC | PC retention (%) |
|---|---|---|---|---|
| Pristine | #1 | 1.44 and 1.45 | 6891230 | 97.8 |
| | #2 | 1.44 and 1.45 | 7265661 | 102.9 |
| | #3 | 1.44 and 1.45 | 7008133 | 99.3 |
| 10 cycles | #1 | 1.44 and 1.45 | 5039081 | 71.4 |
| | #2 | 1.44 and 1.45 | 5406798 | 76.6 |
| | #3 | 1.44 and 1.45 | 5480422 | 77.7 |
| 20 cycles | #1 | 1.44 and 1.45 | 4602360 | 65.2 |
| | #2 | 1.44 and 1.45 | 4975831 | 70.5 |
| | #3 | 1.44 and 1.45 | 4950677 | 70.2 |
| 30 cycles | #1 | 1.44 and 1.45 | 4497833 | 63.8 |
| | #2 | 1.44 and 1.45 | 3977672 | 56.4 |
| | #3 | 1.44 and 1.45 | 4465372 | 63.3 |

TABLE 7

Summary of quantitative $^{19}$F NMR experiment
results of LiPF$_6$ retention with cycling. The
electrolyte samples were collected from the Li|LiCoO$_2$
cells incorporating Li@EAM Cu electrodes at −15° C.
The NMR data is corresponding to the LiPF$_6$ curve in FIG. 65C.

| Electrolyte (EAM Cu, −15° C.) | | δ ($^{19}$F) (ppm) of LiPF6 | Integrals of LIPF6 | LiPF6 retention (%) |
|---|---|---|---|---|
| Pristine | #1 | −71.8 and −73.3 | 66780 | 100.6 |
| | #2 | −71.8 and −73.3 | 67533 | 101.8 |
| | #3 | −71.8 and −73.3 | 62197 | 97.6 |
| 10 cycles | #1 | −71.8 and −73.3 | 54510 | 82.1 |
| | #2 | −71.8 and −73.3 | 52662 | 79.3 |
| | #3 | −71.8 and −73.3 | 56818 | 85.6 |
| 20 cycles | #1 | −71.8 and −73.3 | 51438 | 77.5 |
| | #2 | −71.8 and −73.3 | 51970 | 78.3 |
| | #3 | −71.8 and −73.3 | 48566 | 73.2 |
| 30 cycles | #1 | −71.8 and −73.3 | 47713 | 71.9 |
| | #2 | −71.8 and −73.3 | 46577 | 70.2 |
| | #3 | −71.8 and −73.3 | 50923 | 76.7 |
| 40 cycles | #1 | −71.8 and −73.3 | 45131 | 68.0 |
| | #2 | −71.8 and −73.3 | 49377 | 74.4 |
| | #3 | −71.8 and −73.3 | 48520 | 73.1 |
| 50 cycles | #1 | −71.8 and −73.3 | 45457 | 68.5 |
| | #2 | −71.8 and −73.3 | 45457 | 67.3 |
| | #3 | −71.8 and −73.3 | 48961 | 73.8 |

TABLE 8

Summary of quantitative $^1$H NMR experiment
results of FEC retention with cycling. The electrolyte
samples were collected from the Li|LiCoO$_2$ cells
incorporating Li@EAM Cu electrodes at −15° C. The
NMR data is corresponding to the FEC curve in FIG. 65C.

| Electrolyte (EAM Cu, −15° C.) | | δ ($^1$H) (ppm) of FEC | Integrals of FEC | FEC retention (%) |
|---|---|---|---|---|
| Pristine | #1 | 6.5 and 6.6 | 286653 | 103.0 |
| | #2 | 6.5 and 6.6 | 275902 | 99.1 |
| | #3 | 6.5 and 6.6 | 272359 | 97.9 |
| 10 cycles | #1 | 6.5 and 6.6 | 244578 | 87.9 |
| | #2 | 6.5 and 6.6 | 256781 | 92.3 |
| | #3 | 6.5 and 6.6 | 239052 | 85.9 |
| 20 cycles | #1 | 6.5 and 6.6 | 232143 | 83.4 |
| | #2 | 6.5 and 6.6 | 233382 | 83.9 |
| | #3 | 6.5 and 6.6 | 247005 | 88.8 |
| 30 cycles | #1 | 6.5 and 6.6 | 222654 | 80.0 |
| | #2 | 6.5 and 6.6 | 237305 | 85.3 |
| | #3 | 6.5 and 6.6 | 218574 | 78.5 |
| 40 cycles | #1 | 6.5 and 6.6 | 225736 | 81.1 |
| | #2 | 6.5 and 6.6 | 207121 | 74.4 |
| | #3 | 6.5 and 6.6 | 216056 | 77.6 |
| 50 cycles | #1 | 6.5 and 6.6 | 205188 | 73.7 |
| | #2 | 6.5 and 6.6 | 223064 | 80.2 |
| | #3 | 6.5 and 6.6 | 204906 | 73.6 |

TABLE 9

Summary of quantitative $^2$H NMR experiment results of e
PC (deuterated) retention with cycling. The electrolyte samples wer
collected from the Li|LiCoO$_2$ cells incorporating Li@EAM Cu electrodes
at −15° C. The NMR data is corresponding to the PC curve in FIG. 65C.

| Electrolyte (EAM Cu, −15° C.) | | δ ($^2$H) (ppm) of PC | Integrals of PC | PC retention (%) |
|---|---|---|---|---|
| Pristine | #1 | 1.44 and 1.45 | 7039588 | 100.5 |
| | #2 | 1.44 and 1.45 | 7155437 | 102.2 |
| | #3 | 1.44 and 1.45 | 6815392 | 97.3 |
| 10 cycles | #1 | 1.44 and 1.45 | 5850853 | 83.5 |
| | #2 | 1.44 and 1.45 | 5589681 | 79.8 |
| | #3 | 1.44 and 1.45 | 5996269 | 85.6 |
| 20 cycles | #1 | 1.44 and 1.45 | 5365890 | 76.6 |
| | #2 | 1.44 and 1.45 | 5497622 | 78.5 |
| | #3 | 1.44 and 1.45 | 5731433 | 81.8 |
| 30 cycles | #1 | 1.44 and 1.45 | 5135801 | 73.3 |
| | #2 | 1.44 and 1.45 | 5231465 | 74.7 |
| | #3 | 1.44 and 1.45 | 5597442 | 79.9 |
| 40 cycles | #1 | 1.44 and 1.45 | 4970621 | 71.0 |
| | #2 | 1.44 and 1.45 | 5324377 | 76.1 |
| | #3 | 1.44 and 1.45 | 5043376 | 71.9 |
| 50 cycles | #1 | 1.44 and 1.45 | 4697027 | 67.1 |
| | #2 | 1.44 and 1.45 | 4956730 | 70.8 |
| | #3 | 1.44 and 1.45 | 5224927 | 74.6 |

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods, in addition to those shown and described herein, are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less; however, other combinations of steps, elements, components, and constituents are included, even though not explicitly stated.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove and that many modifications and other embodiments are intended to be included within the scope of the appended claims. Moreover, although specific terms are employed herein, as well as in the claims which follow, they are used only in a generic and descriptive sense and not for the purposes of limiting the described invention nor the claims which follow.

Unless defined otherwise, all technical and scientific terms used herein have the same meanings as commonly understood by one of skill in the art to which the disclosed invention belongs. Publications cited herein and the materials for which they are cited are specifically incorporated by reference.

The claims are not intended to include, and should not be interpreted to include, means-plus- or step-plus-function limitations, unless such a limitation is explicitly recited in a given claim using the phrase(s) "means for" or "step for," respectively.

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

ASPECTS

In view of the described electrodes, batteries and methods and variations thereof, herein below are described certain more particularly described aspects of the inventions. The particularly recited aspects should not, however, be interpreted to have any limiting effect on any different claims containing different or more general teachings described herein, or that the "particular" aspects are somehow limited in some way other than the inherent meanings of the language and formulas literally used therein.

Aspect 1: An electrochemical cell comprising: a) an active anode metal electrochemically deposited on a host material functionalized with one or more electrochemically active groups, wherein the active anode metal comprises an electrochemically active surface; b) an electrolyte; and c) a solid electrolyte interphase layer disposed on the electrochemically active surface of the active anode metal and comprising a first metal salt, wherein the first metal salt is a first reaction product of an electrochemical decomposition of at least a portion of one or more electrochemically active groups; wherein a metal cation in the first metal salt and the active anode metal comprise the same metal; and wherein the electrochemical cell is substantially stable for 200-600 plating/stripping cycles at a temperature from about −60° C. to about 45° C.

Aspect 2: The electrochemical cell of Aspect 1, wherein the functionalization comprises an electrochemically active monolayer.

Aspect 3: The electrochemical cell of Aspect 2, wherein the electrochemically active monolayer comprises a self-assembled monolayer.

Aspect 4: The electrochemical cell of Aspect 2 or 3, wherein the monolayer comprises one or more sulfonyl fluoride groups configured electrochemically decompose.

Aspect 5: The electrochemical cell of Aspect 4, wherein the monolayer comprises benzedisulfonyl fluoride.

Aspect 6: The electrochemical cell of any one of Aspects 1-5, wherein the host material comprises copper.

Aspect 7: The electrochemical cell of Aspect 5, wherein the copper is present as a foil or grid.

Aspect 8: The electrochemical cell of Aspect 1, wherein the host material comprises a carbon-based material.

Aspect 9: The electrochemical cell of Aspect 8, wherein the carbon-based material is functionalized with one or more sulfonyl fluoride groups.

Aspect 10: The electrochemical cell of Aspect 8 or 9, wherein the carbon-based material comprises a reduced graphene oxide aerogel.

Aspect 11: The electrochemical cell of Aspect 10, wherein the reduced graphene oxide aerogel is functionalized with benzenesulfonyl fluoride.

Aspect 12: The electrochemical cell of any one of Aspects 1-11, wherein the electrochemically active surface of the active anode metal is substantially free of dendrites.

Aspect 13: The electrochemical cell of any one of Aspects 4-7 and 9-13, wherein the first metal salt is a metal fluoride salt.

Aspect 14: The electrochemical cell of any one of Aspects 1-13, wherein the functionalized host material further comprises a second reaction product of the electrochemical decomposition of at least a portion of one or more electrochemically active groups, wherein the second reaction product comprises a metalophilic anion.

Aspect 15: The electrochemical cell of any one of Aspect 14, wherein the metalophilic anion comprises benzenesulfonate.

Aspect 16: The electrochemical cell of any one of Aspects 1-15, wherein the active anode metal is electrochemically deposited at a current density of about 0.1 mA cm$^{-2}$ to about 15 mA cm$^{-2}$.

Aspect 17: The electrochemical cell of Aspect 16, wherein the active anode metal is electrochemically deposited at a temperature form about −60° C. to about 45° C.

Aspect 18: The electrochemical cell of any one of Aspects 1-17, wherein the solid electrolyte interphase layer comprises one or more layers.

Aspect 19: The electrochemical cell of Aspect 18, wherein the one or more layers of the solid electrolyte interphase layer comprise an inner metal fluoride-rich inner phase, an amorphous outer layer, and an amorphous intermediate layer.

Aspect 20: The electrochemical cell of Aspect 19, wherein the metal fluoride is embedded in the amorphous intermediate layer.

Aspect 21: The electrochemical cell of Aspect 20, wherein the metal fluoride is present in the intermediate layer comprises nanocrystals.

Aspect 22: The electrochemical cell of any one of Aspects 18-21, wherein the one or more layers further comprise one or more metal salts having an anion different from fluoride.

Aspect 23: The electrochemical cell of any one of Aspects 1-22, wherein the first metal salt is present in an amount from about 10 wt % to about 60 wt %.

Aspect 24: The electrochemical cell of any one of Aspects 1-23, wherein a composition of the solid electrolyte interphase layer does not substantially change for about 600 cycles conducted at a temperature from about −60° C. to about 45° C.

Aspect 25: The electrochemical cell of any one of Aspects 1-24, wherein the solid electrolyte layer has a thickness from about 50 nm to about 200 nm.

Aspect 26: The electrochemical cell of any one of Aspects 1-25, wherein the active anode metal and the cation of the first metal salt comprises lithium, sodium, or zinc.

Aspect 27: A battery comprising the electrochemical cell of any one of Aspects 1-26 and a cathode material.

Aspect 28: The battery of Aspect 27 is configured to provide substantially stable operation for 200-600 plating/stripping cycles at a temperature from about −60° C. to about 45° C.

Aspect 29: The battery of Aspect 27 or 28 exhibits capacity retention greater than 80%.

Aspect 30: The battery of any one of Aspects 27-29, wherein the battery exhibits an electrolyte-to-capacity ratio of less than about 15 μL mAh$^{-1}$.

Aspect 31: The battery of any one of Aspects 27-30, wherein the battery exhibits a coulombic efficiency for a metal deposition greater than about 95% when measured at a predetermined current density.

Aspect 32: The battery of Aspect 31, wherein the predetermined current density is from about 0.1 mAh cm$^{-2}$ to about 15 mAh cm$^{-2}$.

Aspect 33: A method of forming an electrochemical cell comprising: providing a host material functionalized with one or more electrochemically active groups; providing an electrolyte; and electrochemically depositing the active anode metal on the host material to form the active anode metal comprising an electrochemically active surface; forming a solid electrolyte interphase layer disposed on the electrochemically active surface of the active anode metal and comprising a first metal salt, wherein the first metal salt is a first reaction product of an electrochemical decomposition of at least a portion of one or more electrochemically active groups; wherein the metal cation in the first metal salt and the active anode metal comprise the same metal; and wherein the electrochemical cell is substantially stable for 200-600 plating/stripping cycles at a temperature from about −60° C. to about 45° C.

Aspect 34: The method of Aspect 33, wherein the functionalization comprises an electrochemically active monolayer.

Aspect 35: The method of Aspect 34, wherein the electrochemically active monolayer comprises a self-assembled monolayer.

Aspect 36: The method of any one of Aspects 33-35, wherein the monolayer comprises one or more sulfonyl fluoride groups.

Aspect 37: The method of Aspect 36, wherein the monolayer comprises benzedisulfonyl fluoride.

Aspect 38: The method of any one of Aspects 33-37, wherein the host material comprises copper.

Aspect 39: The method of Aspect 38, wherein the copper is present as a foil or a grid.

Aspect 40: The method of any one of Aspects 33-39, wherein the host material is functionalized by reacting the host with a composition configured to form an electrochemically active monolayer.

Aspect 41: The method of Aspect 33, wherein the host material comprises a carbon-based material.

Aspect 42: The method of Aspect 41, wherein the carbon-based material is functionalized with one or more sulfonyl fluoride groups.

Aspect 43: The method of Aspect 41 or 42, wherein the carbon-based material comprises a reduced graphene oxide aerogel.

Aspect 44: The method of Aspect 43, wherein the reduced graphene oxide aerogel is functionalized with benzenesulfonyl fluoride.

Aspect 45: The method of any one of Aspects 41-44, wherein the carbon-based material is functionalized by reacting with a composition configured to bond one or more electrochemically active groups to the carbon-based material.

Aspect 46: The method of any one of Aspects 33-45, wherein the electrochemically active surface of the active anode metal is substantially free of dendrites.

Aspect 47: The method of any one of Aspects 38-40 and 42-46, wherein the first metal salt is a metal fluoride salt.

Aspect 48: The method of any one of Aspects 33-47, wherein the functionalized host material further comprises a second reaction product of the electrochemical decomposition of at least a portion of one or more electrochemically active groups, wherein the second reaction product comprises a metalophilic anion.

Aspect 49: The method of Aspect 48, wherein the metalophilic anion comprises benzenesulfonate.

Aspect 50: The method of any one of Aspects 33-49, wherein the active anode metal is electrochemically deposited at a current density of about 0.1 mA cm$^{-2}$ to about 15 mA cm$^{-2}$.

Aspect 51: The method of Aspect 50, wherein the active anode metal is electrochemically deposited at a temperature form about –60° C. to about 45° C.

Aspect 52: The method of any one of Aspects 33-51, wherein the solid electrolyte interphase layer comprises one or more layers.

Aspect 53: The method of Aspect 52, wherein the one or more layer of the solid electrolyte interphase layer comprises a metal fluoride-rich inner phase, an amorphous outer layer, and an amorphous intermediate layer.

Aspect 54: The method of Aspect 53, wherein the metal fluoride is embedded in the amorphous intermediate layer.

Aspect 55: The method of Aspect 54, wherein the metal fluoride is present in the intermediate layer comprises nanocrystals.

Aspect 56: The method of any one of Aspects 52-55, wherein the one or more layers further comprise one or more metal salts having an anion different from fluoride.

Aspect 57: The method of any one of Aspects 33-56, wherein the first metal salt is present in an amount from about 10 wt % to about 60 wt %.

Aspect 58: The method of any one of Aspects 33-57, wherein a composition of the solid electrolyte interphase layer does not substantially change for about 600 cycles conducted at a temperature from about –60° C. to about 45° C.

Aspect 59: The method of any one of Aspects 33-58, wherein the solid electrolyte layer has a thickness from about 50 nm to about 200 nm.

Aspect 60: The method of any one of Aspects 33-59, wherein the active anode metal and the cation of the first metal salt comprises lithium, sodium, or zinc.

Aspect 61: A method of forming a battery comprising providing the electrochemical cell of any one of Aspects 1-26 and providing a cathode material.

Aspect 62: The method of Aspect 61, wherein the battery is configured to provide substantially stable operation for 200-600 plating/stripping cycles at a temperature from about –60° C. to about 45° C.

Aspect 63: The method of Aspect 61 or 62, wherein the battery exhibits capacity retention greater than 80%.

Aspect 64: The method of any one of Aspects 61-63, wherein the battery exhibits an electrolyte-to-capacity ratio of less than about 15 μL mAh-1. %.

Aspect 65: The method of any one of Aspects 61-64, wherein the battery exhibits a coulombic efficiency for a metal deposition greater than about 95% when measured at a predetermined current density.

Aspect 66: The method of Aspect 65, wherein the predetermined current density is from about 0.1 mAh cm$^{-2}$ to about 15 mAh cm$^{-2}$.

REFERENCES

1. Tarascon J M, Armand M (2001) Issues and challenges facing rechargeable lithium batteries. Nature 414 (6861):359-67.
2. Choi J W, Aurbach D (2016) Promise and reality of post-lithium-ion batteries with high energy densities. Nat Rev Mater 1(4):16013.
3. Kim H, et al. (2013) Metallic anodes for next generation secondary batteries. Chem Soc Rev 42(23):9011-34.
4. Xu W, et al. (2014) Lithium metal anodes for rechargeable batteries. Energy Environ Sci 7(2):513-537.
5. Lin D, Liu Y, Cui Y (2017) Reviving the lithium metal anode for high-energy batteries. Nat Nanotechnol 12(3):194-206.
6. Cheng X B, Zhang R, Zhao C Z, Zhang Q (2017) Toward Safe Lithium Metal Anode in Rechargeable Batteries: A Review. Chem Rev 117(15):10403-10473.
7. Yan K, et al. (2016) Selective deposition and stable encapsulation of lithium through heterogeneous seeded growth. Nat Energy 1(3):16010.
8. Peled E, Menkin S (2017) Review—SEI: Past, Present and Future. J Electrochem Soc 164(7):A1703-A1719.
9. Wei S, Choudhury S, Tu Z, Zhang K, Archer L A (2018) Electrochemical Interphases for High-Energy Storage Using Reactive Metal Anodes. Acc Chem Res 51(1):80-88.
10. Li S, et al. (2018) Developing High-Performance Lithium Metal Anode in Liquid Electrolytes: Challenges and Progress. Adv Mater 30(17):1-29.
11. Aurbach D (2000) Review of selected electrode-solution interactions which determine the performance of Li and Li ion batteries. J Power Sources 89(2):206-218.
12. Gao Y, et al. (2018) Salt-Based Organic-Inorganic Nanocomposites: Towards A Stable Lithium Metal/Li 10 GeP 2 S 12 Solid Electrolyte Interface. Angew Chemie Int Ed 57(41):13608-13612.
13. Gao Y, et al. (2019) Polymer-inorganic solid-electrolyte interphase for stable lithium metal batteries under lean electrolyte conditions. Nat Mater 18(4):384-389.
14. Li N-W, Yin Y-X, Yang C-P, Guo Y-G (2016) An Artificial Solid Electrolyte Interphase Layer for Stable Lithium Metal Anodes. Adv Mater 28(9):1853-1858.

15. Tu Z, et al. (2017) Designing Artificial Solid-Electrolyte Interphases for Single-Ion and High-Efficiency Transport in Batteries. Joule 1(2):394-406.

16. Liang X, et al. (2017) A facile surface chemistry route to a stabilized lithium metal anode. Nat Energy 6(July): 17119.

17. Gao Y, et al. (2017) Interfacial Chemistry Regulation via a Skin-Grafting Strategy Enables High-Performance Lithium-Metal Batteries. J Am Chem Soc 139 (43):15288-15291.

18. Qian J, et al. (2015) High rate and stable cycling of lithium metal anode. Nat Commun 6:6362.

19. Lu Y, Korf K, Kambe Y, Tu Z, Archer L A (2014) Ionic-liquid-nanoparticle hybrid electrolytes: Applications in lithium metal batteries. Angew Chemie—Int Ed 53(2):488-492.

20. Suo L, et al. (2018) Fluorine-donating electrolytes enable highly reversible 5-V-class Li metal batteries. Proc Natl Acad Sci:201712895.

21. Fan X, et al. (2018) Non-flammable electrolyte enables Li-metal batteries with aggressive cathode chemistries. Nat Nanotechnol 13(8):715-722.

22. Chen S, et al. (2018) High-Voltage Lithium-Metal Batteries Enabled by Localized High-Concentration Electrolytes. Adv Mater 1706102:1-7.

23. Jiao S, et al. (2018) Stable cycling of high-voltage lithium metal batteries in ether electrolytes. Nat Energy:1-8.

24. Zhang Q, et al. (2017) An anion-immobilized composite electrolyte for dendrite-free lithium metal anodes. Proc Natl Acad Sci 114(42):11069-11074.

25. Zhang H, et al. (2018) Electrolyte Additives for Lithium Metal Anodes and Rechargeable Lithium Metal Batteries: Progress and Perspectives. Angew Chemie Int Ed 57(46):15002-15027.

26. Salitra G, et al. (2018) High-Performance Cells Containing Lithium Metal Anodes, LiNi 0.6 Co 0.2 Mn 0.2 O 2 (NCM 622) Cathodes, and Fluoroethylene Carbonate-Based Electrolyte Solution with Practical Loading. ACS Appl Mater Interfaces 10(23):19773-19782.

27. Lu Y, Tu Z, Archer L A (2014) Stable lithium electrodeposition in liquid and nanoporous solid electrolytes. Nat Mater 13(10):961-969.

28. Shkrob I A, Marin T W, Zhu Y, Abraham D P (2014) Why bis(fluorosulfonyl)imide is a "magic anion" for electrochemistry. J Phys Chem C 118(34):19661-19671.

29. Warren A, et al. (2018) Confining electrodeposition of metals in structured electrolytes. Proc Natl Acad Sci 115(26):6620-6625.

30. Chen S, et al. (2016) Functional Organosulfide Electrolyte Promotes an Alternate Reaction Pathway to Achieve High Performance in Lithium-Sulfur Batteries. Angew Chemie Int Ed 55(13):4231-4235.

31. Khurana R, Schaefer J L, Archer L A, Coates G W (2014) Suppression of lithium dendrite growth using cross-linked polyethylene/poly(ethylene oxide) electrolytes: A new approach for practical lithium-metal polymer batteries. J Am Chem Soc 136(20):7395-7402.

32. Tung S-O, Ho S, Yang M, Zhang R, Kotov N A (2015) A dendrite-suppressing composite ion conductor from aramid nanofibres. Nat Commun 6:6152.

33. Liu K, et al. (2017) Lithium Metal Anodes with an Adaptive "Solid-Liquid" Interfacial Protective Layer. J Am Chem Soc 139(13):4815-4820.

34. Lopez J, et al. (2018) Effects of Polymer Coatings on Electrodeposited Lithium Metal. J Am Chem Soc 140 (37):11735-11744.

35. Mukherjee R, et al. (2014) Defect-induced plating of lithium metal within porous graphene networks. Nat Commun 5:1-10.

36. Yang C-P, Yin Y-X, Zhang S-F, Li N-W, Guo Y-G (2015) Accommodating lithium into 3D current collectors with a submicron skeleton towards long-life lithium metal anodes. Nat Commun 6(May):8058.

37. Lin D, et al. (2017) Three-dimensional stable lithium metal anode with nanoscale lithium islands embedded in ionically conductive solid matrix. Proc Natl Acad Sci 114(18):4613-4618.

38. Zhang Y, et al. (2017) High-capacity, low-tortuosity, and channel-guided lithium metal anode. Proc Natl Acad Sci 114(14):3584-3589.

39. Wang T, Villegas Salvatierra R, Jalilov A S, Tian J, Tour J M (2017) Ultrafast Charging High Capacity Asphalt-Lithium Metal Batteries. ACS Nano 11(11): 10761-10767.

40. Liang Z, et al. (2016) Composite lithium metal anode by melt infusion of lithium into a 3D conducting scaffold with lithiophilic coating. Proc Natl Acad Sci 113(11):2862-2867.

41. Ye H, et al. (2017) Stable Li Plating/Stripping Electrochemistry Realized by a Hybrid Li Reservoir in Spherical Carbon Granules with 3D Conducting Skeletons. J Am Chem Soc 139(16):5916-5922.

42. Li G, et al. (2018) Stable metal battery anodes enabled by polyethylenimine sponge hosts by way of electrokinetic effects. Nat Energy 3(12):1076-1083.

43. Zhang R, et al. (2017) Lithiophilic Sites in Doped Graphene Guide Uniform Lithium Nucleation for Dendrite-Free Lithium Metal Anodes. Angew Chemie Int Ed 56(27):7764-7768.

44. Pei A, et al. (2018) Lithium metal stripping beneath the solid electrolyte interphase. Proc Natl Acad Sci 115(34):8529-8534.

45. Han Z, et al. (2013) Ammonia solution strengthened three-dimensional macro-porous graphene aerogel. Nanoscale 5(12):5462-5467.

46. Bekyarova E, et al. (2009) Chemical Modification of Epitaxial Graphene: Spontaneous Grafting of Aryl Groups. J Am Chem Soc 131(4):1336-1337.

47. Belmont J A, Amici R M, Galloway C P (1998) Reaction of carbon black with diazonium salts, resultant carbon black products and their uses. U.S. Pat. No. 5,851,280, 48. Zhang S S, Xu K, Allen J L, Jow T R (2002) Effect of propylene carbonate on the low temperature performance of Li-ion cells. J Power Sources 110(1):216-221.

49. Tippmann S, Walper D, Balboa L, Spier B, Bessler W G (2014) Low-temperature charging of lithium-ion cells part I: Electrochemical modeling and experimental investigation of degradation behavior. J Power Sources 252:305-316.

50. Gao Y, et al. (2017) General Method of Manipulating Formation, Composition, and Morphology of Solid-Electrolyte Interphases for Stable Li-Alloy Anodes. J Am Chem Soc 139(48):17359-17367.

51. Zhang S S, Xu K, Jow T R (2002) A new approach toward improved low temperature performance of Li-ion battery. Electrochem Commun 4(11):928-932.

52. Kresse G, Furthmüller J (1996) Efficient iterative schemes for ab initio total-energy calculations using a plane-wave basis set. Phys Rev B—Condens Matter Mater Phys 54(16):11169-11186.

53. Blöchl P E (1994) Projector augmented-wave method. Phys Rev B 50(24):17953-17979.

54. Perdew J P, Burke K, Ernzerhof M (1996) Generalized Gradient Approximation Made Simple. Phys Rev Lett 77(18):3865-3868.

55. Grimme S, Antony J, Ehrlich S, Krieg H (2010) A consistent and accurate ab initio parametrization of density functional dispersion correction (DFT-D) for the 94 elements H-Pu. J Chem Phys 132(15):154104.

56. Ferguson G N, et al. (2008) 2-Aminothieno-pyridazines as Novel Adenosine A 1 Receptor Allosteric Modulators and Antagonists. 6165-6172.

57. Englert J M, et al. (2011) Covalent bulk functionalization of graphene. Nat Chem 3(4):279-286.

58. Fleutot S, et al. (2011) Experimental (X-Ray Photoelectron Spectroscopy) and theoretical studies of benzene based organics intercalated into layered double hydroxide. Solid State Sci 13(9):1676-1686.

59. Tarascon, J. M. & Armand, M. Issues and challenges facing rechargeable lithium batteries. Nature 414, 359-67 (2001).

60. Choi, J. W. & Aurbach, D. Promise and reality of post-lithium-ion batteries with high energy densities. Nat. Rev. Mater. 1, 16013 (2016).

61. Nagasubramanian, G. Electrical characteristics of 18650 Li-ion cells at low temperatures. J. Appl. Electrochem. 31, 99-104 (2001).

62. Zhang, S. S., Xu, K. & Jow, T. R. The low temperature performance of Li— ion batteries. J. Power Sources 115, 137-140 (2003).

63. Lin, H.-p. et al. Low-Temperature Behavior of Li-Ion Cells. Electrochem. Solid-State Lett. 4, A71 (2002).

64. Petzl, M., Kasper, M. & Danzer, M. A. Lithium plating in a commercial lithium-ion battery—A low-temperature aging study. J. Power Sources 275, 799-807 (2015).

65. Fleischhammer, M., Waldmann, T., Bisle, G., Hogg, B. I. & Wohlfahrt-Mehrens, M. Interaction of cyclic ageing at high-rate and low temperatures and safety in lithium-ion batteries. J. Power Sources 274, 432-439 (2015).

66. Ratnakumar, B. V. et al. Lithium ion batteries for Mars exploration missions.

67. Electrochim. Acta 45, 1513-1517 (2000).

68. Rodrigues, M.-T. F. et al. A materials perspective on Li-ion batteries at extreme temperatures. Nat. Energy 2, 1-14 (2017).

69. Wang, C., Appleby, A. J. & Little, F. E. Low-Temperature Characterization of Lithium-Ion Carbon Anodes via Microperturbation Measurement. J. Electrochem. Soc. 149, A754 (2002).

70. Zhang, S. S., Xu, K. & Jow, T. R. A new approach toward improved low temperature performance of Li-ion battery. Electrochem. commun. 4, 928-932 (2002).

71. Smart, M. C. et al. Improved performance of lithium-ion cells with the use of fluorinated carbonate-based electrolytes. J. Power Sources 119-121, 359-367 (2003).

72. Smart, M. C. Irreversible Capacities of Graphite in Low-Temperature Electrolytes for Lithium-Ion Batteries. J. Electrochem. Soc. 146, 3963 (1999).

73. Lin, D., Liu, Y. & Cui, Y. Reviving the lithium metal anode for high-energy batteries. Nat. Nanotechnol. 12, 194-206 (2017).

74. Aurbach, D. Review of selected electrode-solution interactions which determine the performance of Li and Li ion batteries. J. Power Sources 89, 206-218 (2000).

75. Peled, E. & Menkin, S. Review—SEI: Past, Present and Future. J. Electrochem. Soc. 164, A1703-A1719 (2017).

76. Scrosati, B. & Garche, J. Lithium batteries: Status, prospects and future. J. Power Sources 195, 2419-2430 (2010).

77. Xu, W. et al. Lithium metal anodes for rechargeable batteries. Energy Environ. Sci. 7, 513-537 (2014).

78. Tung, S.-O., Ho, S., Yang, M., Zhang, R. & Kotov, N. A. A dendrite-suppressing composite ion conductor from aramid nanofibres. Nat. Commun. 6, 6152 (2015).

79. Choudhury, S., Mangal, R., Agrawal, A. & Archer, L. A. A highly reversible room-temperature lithium metal battery based on crosslinked hairy nanoparticles. Nat. Commun. 6, 10101 (2015).

80. Liu, K. et al. Lithium Metal Anodes with an Adaptive "Solid-Liquid" Interfacial Protective Layer. J. Am. Chem. Soc. 139, 4815-4820 (2017).

81. Kim, M. S. et al. Langmuir-Blodgett artificial solid-electrolyte interphases for practical lithium metal batteries. Nat. Energy 3, 889-898 (2018).

82. Gao, Y. et al. Interfacial Chemistry Regulation via a Skin-Grafting Strategy Enables High-Performance Lithium-Metal Batteries. J. Am. Chem. Soc. 139, 15288-15291 (2017).

83. Gao, Y. et al. Polymer-inorganic solid-electrolyte interphase for stable lithium metal batteries under lean electrolyte conditions. Nat. Mater. 18, 384-389 (2019).

84. Liang, X. et al. A facile surface chemistry route to a stabilized lithium metal anode. Nat. Energy 6, 17119 (2017).

85. Dudney, N. J. Addition of a thin-film inorganic solid electrolyte (Lipon) as a protective film in lithium batteries with a liquid electrolyte. J. Power Sources 89, 176-179 (2000).

86. Qian, J. et al. High rate and stable cycling of lithium metal anode. Nat. Commun. 6, 6362 (2015).

87. Basile, A., Bhatt, A. I. & O'Mullane, A. P. Stabilizing lithium metal using ionic liquids for long-lived batteries. Nat. Commun. 7, 1-11 (2016).

88. Zeng, Z. et al. Non-flammable electrolytes with high salt-to-solvent ratios for Li-ion and Li-metal batteries. Nat. Energy 3, 674-681 (2018).

89. Fan, X. et al. Non-flammable electrolyte enables Li-metal batteries with aggressive cathode chemistries. Nat. Nanotechnol. 13, 715-722 (2018).

90. Wei, S. et al. Stabilizing electrochemical interfaces in viscoelastic liquid electrolytes. Sci. Adv. 4, 1-9 (2018).

91. Ding, F. et al. Dendrite-free lithium deposition via self-healing electrostatic shield mechanism. J. Am. Chem. Soc. 135, 4450-4456 (2013).

92. Lin, D. et al. Layered reduced graphene oxide with nanoscale interlayer gaps as a stable host for lithium metal anodes. Nat. Nanotechnol. 11, 626-632 (2016).

93. Yang, C.-P., Yin, Y.-X., Zhang, S.-F., Li, N.-W. & Guo, Y.-G. Accommodating lithium into 3D current collectors with a submicron skeleton towards long-life lithium metal anodes. Nat. Commun. 6, 8058 (2015).

94. Li, G. et al. Stable metal battery anodes enabled by polyethylenimine sponge hosts by way of electrokinetic effects. Nat. Energy 3, 1076-1083 (2018).

95. Zhang, R. et al. Lithiophilic Sites in Doped Graphene Guide Uniform Lithium Nucleation for Dendrite-Free Lithium Metal Anodes. Angew. Chemie Int. Ed. 56, 7764-7768 (2017).

96. Rustomji, C. S. et al. Liquefied gas electrolytes for electrochemical energy storage devices. Science 356, eaal4263 (2017).

97. Yang, Y. et al. High-Efficiency Lithium-Metal Anode Enabled by Liquefied Gas Electrolytes. Joule 1-15 (2019). doi:10.1016/j.joule.2019.06.008

98. Plichta, E. J. & Behl, W. K. A low-temperature electrolyte for lithium and lithium-ion batteries. J. Power Sources 88, 192-196 (2000).

99. Uvdal, K., Bodö, P. & Liedberg, B. I-cysteine adsorbed on gold and copper: An X-ray photoelectron spectroscopy study. J. Colloid Interface Sci. 149, 162-173 (1992).

100. Caprioli, F., Decker, F., Marrani, A. G., Beccari, M. & Castro, V. Di. Copper protection by self-assembled monolayers of aromatic thiols in alkaline solutions. Phys. Chem. Chem. Phys. 12, 9230-9238 (2010).

101. Mandler, D. & Turyan, I. Applications of self-assembled monolayers in electroanalytical chemistry. Electroanalysis 8, 207-213 (1996).

102. Li, Y. et al. Atomic structure of sensitive battery materials and interfaces revealed by cryo-electron microscopy. Science 358, 506-510 (2017).

103. Wang, F. et al. Chemical Distribution and Bonding of Lithium in Intercalated Graphite: Identification with Optimized Electron Energy Loss Spectroscopy. ACS Nano 5, 1190-1197 (2011).

104. Ding, F. et al. Effects of Carbonate Solvents and Lithium Salts on Morphology and Coulombic Efficiency of Lithium Electrode. J. Electrochem. Soc. 160, A1894-A1901 (2013).

105. Lin, D. et al. Fast galvanic lithium corrosion involving a Kirkendall-type mechanism. Nat. Chem. 11, 382-389 (2019).

106. Kresse, G. & Furthmüller, J. Efficient iterative schemes for ab initio total-energy calculations using a plane-wave basis set. Phys. Rev. B—Condens. Matter Mater. Phys. 54, 11169-11186 (1996).

107. Kresse, G. & Joubert, D. From ultrasoft pseudopotentials to the projector augmented-wave method. Phys. Rev. B 59, 1758-1775 (1999).

108. Perdew, J. P., Burke, K. & Ernzerhof, M. Generalized Gradient Approximation Made Simple. Phys. Rev. Lett. 77, 3865-3868 (1996).

109. William G. Hoover. Canonical dynamics: Equilibrium phase-space distributions William. Phys. Rev. A 31, 1695-1697 (1985).

110. Jung, W. et al. An efficient reduced graphene-oxide filter for PM 2.5 removal. J. Mater. Chem. A 6, 16975-16982 (2018).

111. Choi, D. Y. et al. Al-Coated Conductive Fiber Filters for High-Efficiency Electrostatic Filtration: Effects of Electrical and Fiber Structural Properties. Sci. Rep. 8, 1-10 (2018).

112. Shervedani, R. K. & Mozaffari, S. A. Copper(II) nanosensor based on a gold cysteamine self-assembled monolayer functionalized with salicylaldehyde. Anal. Chem. 78, 4957-4963 (2006).

113. Song, P. et al. Insight in cysteamine adsorption behaviors on the copper surface by electrochemistry and Raman spectroscopy. Electrochim. Acta 89, 503-509 (2013).

114. Uvdal, K., Bodö, P. & Liedberg, B. I-cysteine adsorbed on gold and copper: An X-ray photoelectron spectroscopy study. J. Colloid Interface Sci. 149, 162-173 (1992).

115. Gao, Y. et al. Polymer-inorganic solid-electrolyte interphase for stable lithium metal batteries under lean electrolyte conditions. Nat. Mater. 18, 384-389 (2019).

116. Wang, F. et al. Chemical Distribution and Bonding of Lithium in Intercalated Graphite: Identification with Optimized Electron Energy Loss Spectroscopy. ACS Nano 5, 1190-1197 (2011).

117. Dokko, K., Nakata, N. & Kanamura, K. High rate discharge capability of single particle electrode of LiCoO2. J. Power Sources 189, 783-785 (2009).

118. Lord, H. L., Zhan, W. & Pawliszyn, J. Fundamentals and Applications of Needle Trap Devices. in Comprehensive Sampling and Sample Preparation 2, 677-697 (Elsevier, 2012).

What is claimed is:

1. An electrochemical cell comprising:

a) an active anode metal electrochemically uniformly deposited at a temperature of −60° C. to 45° C. on a functionalized host material, wherein the host material is functionalized with one or more electrochemically active groups comprising one or more sulfonyl fluoride groups, wherein the functionalized host regulates the active anode metal deposition by creating active anode metal nucleating sites, wherein the active anode metal nucleation sites are formed by electrochemical decomposition of the one or more sulfonyl fluoride groups during the active anode metal electrochemical deposition; and wherein the active anode metal comprises an electrochemically active surface;

b) an electrolyte;

c) a solid electrolyte interphase layer having a thickness from 50 nm to 200 nm and disposed on the electrochemically active surface of the active anode metal and comprising a metal salt, wherein the at least a portion of the metal salt comprises a fluoride anion resulting from the electrochemical decomposition of at least a portion of the one or more sulfonyl fluoride groups, and wherein the solid electrolyte interphase layer has a chemical composition that is different from a chemical composition of a solid electrolyte interphase layer formed on a substantially identical host material without functionalization;

wherein a metal cation in the metal salt and the active anode metal comprise the same metal; and wherein the electrochemical cell is substantially stable for 200 to 600 plating/stripping cycles at a temperature from −60° C. to 45° C.

2. The electrochemical cell of claim 1, wherein the functionalization of the host material is present as a monolayer, and wherein the one or more sulfonyl fluoride groups of the functionalized host material comprise benzenesulfonyl fluoride.

3. The electrochemical cell of claim 2, wherein the functionalized host material comprises copper.

4. The electrochemical cell of claim 1, wherein functionalized the host material comprises a carbon-based material.

5. The electrochemical cell of claim 4, wherein the carbon-based material comprises a reduced graphene oxide aerogel.

6. The electrochemical cell of claim 5, wherein the reduced graphene oxide aerogel is functionalized with benzenesulfonyl fluoride.

7. The electrochemical cell of claim 1, wherein the metal salt is a metal fluoride salt present in an amount from 10 wt % to 60 wt %.

8. The electrochemical cell of any one of claim 1, wherein the active anode metal nucleation sites comprise benzenesulfonate.

9. The electrochemical cell of claim 1, wherein the solid electrolyte interphase layer comprises one or more layers.

10. The electrochemical cell of claim 9, wherein the solid electrolyte interphase layer comprises an inner metal fluoride-rich inner phase, an amorphous outer layer, and an amorphous intermediate layer.

11. The electrochemical cell of claim 10, wherein the metal fluoride is embedded in the amorphous intermediate layer.

12. The electrochemical cell of claim 11, wherein the amorphous intermediate layer comprises metal fluoride nanocrystals.

13. The electrochemical cell of claim 9, wherein the one or more layers further comprise one or more metal salts having an anion different from fluoride.

14. The electrochemical cell of claim 1, wherein a composition of the solid electrolyte interphase layer does not substantially change for 600 cycles conducted at a temperature from −60° C. to 45° C.

15. The electrochemical cell of claim 1, wherein the active anode metal and the metal cation of the metal salt comprises lithium, sodium, or zinc.

16. A battery comprising the electrochemical cell of claim 1 and a cathode material.

17. The battery of claim 16, wherein the battery is configured to provide a substantially stable operation for 200-600 plating/stripping cycles at a temperature from −60° C. to 45° C.

18. The battery of claim 16 exhibits a capacity retention greater than 80%.

19. The battery of claim 16, wherein the battery exhibits an electrolyte-to-capacity ratio of less than 15 µL mAh$^{-1}$.

20. The battery of claim 16, wherein the battery exhibits a coulombic efficiency for a metal deposition greater than 95% when measured at a predetermined current density from 0.1 mAh cm$^{-2}$ to 15 mAh cm$^{-2}$.

* * * * *